(12) United States Patent
Finlayson et al.

(10) Patent No.: US 11,893,795 B2
(45) Date of Patent: Feb. 6, 2024

(54) INTERACTING WITH VISITORS OF A CONNECTED HOME ENVIRONMENT

(71) Applicant: Google LLC, Mountain View, CA (US)

(72) Inventors: William Alexander Finlayson, San Mateo, CA (US); Liana Kong, Redwood City, CA (US); John Jordan Nold, Longmont, CO (US); Sahana Mysore, Menlo Park, CA (US); Ruiyi Song, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 333 days.

(21) Appl. No.: 17/116,662

(22) Filed: Dec. 9, 2020

(65) Prior Publication Data

US 2021/0174095 A1 Jun. 10, 2021

Related U.S. Application Data

(60) Provisional application No. 62/945,724, filed on Dec. 9, 2019.

(51) Int. Cl.
*G06V 20/52* (2022.01)
*G08B 13/196* (2006.01)
(Continued)

(52) U.S. Cl.
CPC .............. *G06V 20/52* (2022.01); *G06F 3/165* (2013.01); *G06V 20/41* (2022.01); *G06V 40/10* (2022.01); *G06V 40/20* (2022.01); *G08B 13/196* (2013.01)

(58) Field of Classification Search
CPC ........ G06V 20/52; G06V 20/41; G06V 40/10; G06V 40/20; G06V 40/172; G06F 3/165; G06F 3/167; G08B 13/196; G08B 3/10
(Continued)

(56) References Cited

U.S. PATENT DOCUMENTS 4,967,046 A  10/1990  Priesemuth
5,237,408 A  8/1993  Blum et al.
(Continued)

FOREIGN PATENT DOCUMENTS

CN  104794834  7/2015
CN  105612564  5/2016
(Continued)

OTHER PUBLICATIONS

"Notice of Allowance", U.S. Appl. No. 17/400,887, dated Dec. 27, 2021, 7 pages.
(Continued)

*Primary Examiner* — Ishrat I Sherali
(74) *Attorney, Agent, or Firm* — Colby Nipper PLLC

(57) ABSTRACT

In aspects, a visitor interaction system is described for interacting with visitors. The visitor interaction system can obtain video data, identify an approach of a person, and determine an identity of the person. Further, the visitor interaction system can determine that the person belongs to a respective visitor group of a plurality of visitor groups. Each of the plurality of visitor groups corresponds to a response model that includes a plurality of response actions. At least one of the response actions includes an autonomous response action. The visitor interaction system can also identify a response model corresponding to the respective visitor group and initiate an autonomous response action associated with the response model. The visitor interaction system can then send a report message to the user via a client device.

20 Claims, 21 Drawing Sheets

(51) Int. Cl.
  *G06F 3/16* (2006.01)
  *G06V 20/40* (2022.01)
  *G06V 40/10* (2022.01)
  *G06V 40/20* (2022.01)

(58) Field of Classification Search
  USPC ........................................................ 382/103
  See application file for complete search history.

(56) References Cited

U.S. PATENT DOCUMENTS

| | | |
|---|---|---|
| D339,543 S | 9/1993 | Martin |
| 6,046,745 A | 4/2000 | Moriya et al. |
| 6,144,375 A | 11/2000 | Jain et al. |
| D450,059 S | 11/2001 | Itou |
| 6,366,296 B1 | 4/2002 | Boreczky et al. |
| 6,400,378 B1 | 4/2002 | Snook |
| 6,424,370 B1 | 7/2002 | Courtney |
| 6,476,858 B1 | 11/2002 | Ramirez Diaz et al. |
| 6,496,598 B1 | 12/2002 | Harman |
| 6,535,793 B2 | 3/2003 | Allard |
| 6,571,050 B1 | 5/2003 | Park |
| 6,600,784 B1 | 7/2003 | Divakaran et al. |
| 6,611,653 B1 | 8/2003 | Kim et al. |
| 6,628,835 B1 | 9/2003 | Brill et al. |
| 6,643,416 B1 | 11/2003 | Daniels et al. |
| 6,647,200 B1 | 11/2003 | Tanaka |
| D483,281 S | 12/2003 | Cobigo |
| 6,665,423 B1 | 12/2003 | Mehrotra et al. |
| 6,697,103 B1 | 2/2004 | Fernandez et al. |
| 6,741,977 B1 | 5/2004 | Nagaya et al. |
| D491,956 S | 6/2004 | Ombao et al. |
| 6,792,676 B2 | 8/2004 | Haji et al. |
| 6,816,184 B1 | 11/2004 | Brill et al. |
| D499,740 S | 12/2004 | Ombao et al. |
| D510,584 S | 10/2005 | Tierney |
| 6,970,183 B1 | 11/2005 | Monroe |
| 7,016,415 B2 | 3/2006 | Alvarez |
| 7,023,469 B1 | 4/2006 | Olson |
| 7,142,600 B1 | 11/2006 | Schonfeld et al. |
| D555,661 S | 11/2007 | Kim |
| 7,403,116 B2 | 7/2008 | Bittner |
| 7,421,455 B2 | 9/2008 | Hua et al. |
| 7,421,727 B2 | 9/2008 | Oya et al. |
| 7,433,493 B1 | 10/2008 | Miyashi et al. |
| 7,440,613 B2 | 10/2008 | Xu |
| 7,447,337 B2 | 11/2008 | Zhang et al. |
| D584,749 S | 1/2009 | Smith et al. |
| D590,412 S | 4/2009 | Saft et al. |
| D607,001 S | 12/2009 | Ording |
| 7,629,995 B2 | 12/2009 | Salivar et al. |
| 7,685,519 B1 | 3/2010 | Duncan et al. |
| 7,760,908 B2 | 7/2010 | Curtner et al. |
| 7,765,482 B2 | 7/2010 | Wood et al. |
| D621,413 S | 8/2010 | Rasmiussen |
| D625,323 S | 10/2010 | Matsushima et al. |
| 7,813,525 B2 | 10/2010 | Aggarwal |
| 7,823,066 B1 | 10/2010 | Kuramura |
| 7,920,626 B2 | 4/2011 | Fernandez et al. |
| 7,924,323 B2 | 4/2011 | Walker et al. |
| D638,025 S | 5/2011 | Saft et al. |
| 7,995,096 B1 | 8/2011 | Cressy et al. |
| 8,115,623 B1 | 2/2012 | Green |
| 8,122,038 B2 | 2/2012 | Handy et al. |
| 8,130,839 B2 | 3/2012 | Kawashima et al. |
| 8,200,669 B1 | 6/2012 | Iampietro et al. |
| 8,204,273 B2 | 6/2012 | Chambers et al. |
| 8,284,258 B1 | 10/2012 | Cetin et al. |
| 8,295,597 B1 | 10/2012 | Sharma et al. |
| 8,300,890 B1 | 10/2012 | Gaikwad et al. |
| 8,305,447 B1 | 11/2012 | Wong |
| 8,390,684 B2 | 3/2013 | Piran et al. |
| 8,401,232 B2 | 3/2013 | Fan |
| 8,494,234 B1 | 7/2013 | Bozinovic et al. |
| 8,515,128 B1 | 8/2013 | Hildreth |
| 8,525,665 B1 | 9/2013 | Trundle et al. |
| 8,537,219 B2 | 9/2013 | Desimone et al. |
| D690,757 S | 10/2013 | Bart et al. |
| 8,577,091 B2 | 11/2013 | Ivanov et al. |
| 8,587,653 B1 | 11/2013 | Vidunas et al. |
| 8,613,070 B1 | 12/2013 | Borzycki et al. |
| 8,676,493 B2 | 3/2014 | M et al. |
| 8,688,483 B2 | 4/2014 | Watts et al. |
| 8,707,194 B1 | 4/2014 | Jenkins et al. |
| 8,775,242 B2 | 7/2014 | Tavares et al. |
| 8,780,201 B1 | 7/2014 | Scalisi et al. |
| 8,854,457 B2 | 10/2014 | De Vleeschouwer et al. |
| 8,861,804 B1 | 10/2014 | Johnson |
| 8,872,915 B1 | 10/2014 | Scalisi et al. |
| 8,902,085 B1 | 12/2014 | Ray et al. |
| 8,941,733 B2 | 1/2015 | Albers et al. |
| 8,941,736 B1 | 1/2015 | Scalisi |
| 8,942,438 B2 | 1/2015 | Ivanov et al. |
| 8,953,848 B2 | 2/2015 | Ivanov et al. |
| 8,958,602 B1 | 2/2015 | Lane et al. |
| 8,966,368 B2 | 2/2015 | Kuramura |
| 8,982,141 B2 | 3/2015 | Freyhult |
| 9,014,429 B2 | 4/2015 | Badawy |
| 9,025,836 B2 | 5/2015 | Ptucha |
| 9,064,393 B2 | 6/2015 | He |
| 9,082,018 B1 | 7/2015 | Laska et al. |
| 9,124,858 B2 | 9/2015 | Jang et al. |
| 9,158,974 B1 | 10/2015 | Laska et al. |
| 9,172,911 B2 | 10/2015 | Kristiansen et al. |
| 9,213,903 B1 | 12/2015 | Laska et al. |
| 9,269,243 B2 | 2/2016 | Shet et al. |
| 9,325,905 B2 | 4/2016 | Noyes |
| 9,361,011 B1 | 6/2016 | Burns |
| 9,373,076 B1 | 6/2016 | Appelman et al. |
| D764,958 S | 8/2016 | Scalisi |
| 9,420,331 B2 | 8/2016 | Laska et al. |
| 9,432,631 B2 | 8/2016 | Allegra et al. |
| D765,530 S | 9/2016 | Scalisi |
| 9,449,229 B1 | 9/2016 | Laska et al. |
| 9,479,822 B2 | 10/2016 | Laska et al. |
| 9,516,053 B1 | 12/2016 | Muddu et al. |
| 9,575,178 B2 | 2/2017 | Kanamori et al. |
| D782,495 S | 3/2017 | Laska et al. |
| 9,600,723 B1 | 3/2017 | Pantofaru et al. |
| 9,602,860 B2 | 3/2017 | Laska et al. |
| 9,613,524 B1 | 4/2017 | Lamb et al. |
| 9,621,798 B2 | 4/2017 | Zhang et al. |
| 9,628,286 B1 | 4/2017 | Nguyen et al. |
| D789,363 S | 6/2017 | Jentz et al. |
| D789,364 S | 6/2017 | Jentz et al. |
| D789,365 S | 6/2017 | Jentz et al. |
| D789,366 S | 6/2017 | Jentz et al. |
| D789,367 S | 6/2017 | Jentz et al. |
| 9,674,453 B1 | 6/2017 | Tangeland et al. |
| D793,268 S | 8/2017 | Ye |
| D795,109 S | 8/2017 | Olodort et al. |
| 9,753,994 B2 | 9/2017 | Anderson |
| D800,201 S | 10/2017 | Song |
| D805,570 S | 12/2017 | Shi |
| D806,154 S | 12/2017 | Shi |
| 9,940,523 B2 | 4/2018 | Laska et al. |
| 9,997,053 B2 | 6/2018 | Maneskiold et al. |
| 10,063,815 B1 | 8/2018 | Spivey et al. |
| 10,108,862 B2 | 10/2018 | Laska et al. |
| 10,303,278 B2 | 5/2019 | Cheng et al. |
| 10,309,145 B2 | 6/2019 | Castro et al. |
| 10,380,429 B2 | 8/2019 | Chaudhry et al. |
| 10,410,086 B2 | 9/2019 | Bapat et al. |
| 10,475,311 B2 | 11/2019 | Siminoff |
| 10,599,950 B2 | 3/2020 | Bapat et al. |
| 10,664,688 B2 | 5/2020 | Goulden et al. |
| 10,708,472 B2 | 7/2020 | Jeong et al. |
| 10,965,899 B1 | 3/2021 | Bart |
| 11,115,629 B1 * | 9/2021 | Lemberger ............ G10L 13/00 |
| 11,134,227 B2 | 9/2021 | Goulden et al. |
| 11,356,643 B2 | 6/2022 | Goulden et al. |
| 11,436,906 B1 * | 9/2022 | Peddinti ................ G08B 5/36 |
| 2001/0024517 A1 | 9/2001 | Labelle |
| 2002/0002425 A1 | 1/2002 | Dossey et al. |

(56) References Cited

U.S. PATENT DOCUMENTS

| | | |
|---|---|---|
| 2002/0113813 A1 | 8/2002 | Yoshimine |
| 2002/0126224 A1 | 9/2002 | Lienhart |
| 2003/0063093 A1 | 4/2003 | Howard |
| 2003/0101104 A1 | 5/2003 | Dimitrova et al. |
| 2004/0021647 A1 | 2/2004 | Iwema et al. |
| 2004/0100560 A1 | 5/2004 | Stavely et al. |
| 2004/0109059 A1 | 6/2004 | Kawakita |
| 2004/0123328 A1 | 6/2004 | Coffey et al. |
| 2004/0125908 A1 | 7/2004 | Cesmeli |
| 2004/0133647 A1 | 7/2004 | Ozkan et al. |
| 2004/0143602 A1 | 7/2004 | Ruiz et al. |
| 2004/0153670 A1 | 8/2004 | Casey et al. |
| 2004/0174434 A1 | 9/2004 | Walker et al. |
| 2004/0229569 A1 | 11/2004 | Franz |
| 2005/0047672 A1 | 3/2005 | Ben-Ezra et al. |
| 2005/0057653 A1 | 3/2005 | Maruya |
| 2005/0074140 A1 | 4/2005 | Grasso et al. |
| 2005/0132414 A1 | 6/2005 | Bentley et al. |
| 2005/0151851 A1 | 7/2005 | Schnell |
| 2005/0200486 A1 | 9/2005 | Greer |
| 2005/0246119 A1 | 11/2005 | Koodali |
| 2005/0248443 A1 | 11/2005 | Steinetz et al. |
| 2005/0285734 A1 | 12/2005 | Sheynman et al. |
| 2006/0038663 A1 | 2/2006 | Steinetz et al. |
| 2006/0056056 A1 | 3/2006 | Ahiska et al. |
| 2006/0063517 A1 | 3/2006 | Oh et al. |
| 2006/0072847 A1 | 4/2006 | Chor et al. |
| 2006/0093998 A1 | 5/2006 | Vertegaal |
| 2006/0195716 A1 | 8/2006 | Bittner |
| 2006/0228015 A1 | 10/2006 | Brockway et al. |
| 2006/0239645 A1 | 10/2006 | Curtner et al. |
| 2006/0274949 A1 | 12/2006 | Gallagher et al. |
| 2007/0002141 A1 | 1/2007 | Lipton et al. |
| 2007/0014554 A1 | 1/2007 | Sasaki |
| 2007/0038570 A1 | 2/2007 | Halbritter et al. |
| 2007/0041727 A1 | 2/2007 | Lee et al. |
| 2007/0061862 A1 | 3/2007 | Berger et al. |
| 2007/0132558 A1 | 6/2007 | Rowe et al. |
| 2007/0186238 A1 | 8/2007 | Schrager et al. |
| 2007/0216764 A1 | 9/2007 | Kwak |
| 2007/0220569 A1 | 9/2007 | Ishii |
| 2007/0257986 A1 | 11/2007 | Ivanov et al. |
| 2008/0051648 A1 | 2/2008 | Suri et al. |
| 2008/0122926 A1 | 5/2008 | Zhou et al. |
| 2008/0170123 A1 | 7/2008 | Albertson et al. |
| 2008/0178069 A1 | 7/2008 | Stallings |
| 2008/0184245 A1 | 7/2008 | St-Jean |
| 2008/0192129 A1 | 8/2008 | Walker et al. |
| 2008/0244453 A1 | 10/2008 | Cafer |
| 2008/0270363 A1 | 10/2008 | Hunt et al. |
| 2008/0303903 A1 | 12/2008 | Bentley et al. |
| 2008/0316311 A1 | 12/2008 | Albers et al. |
| 2009/0016599 A1 | 1/2009 | Eaton et al. |
| 2009/0018996 A1 | 1/2009 | Hunt et al. |
| 2009/0033746 A1 | 2/2009 | Brown et al. |
| 2009/0100007 A1 | 4/2009 | Campbell et al. |
| 2009/0141939 A1 | 6/2009 | Chambers et al. |
| 2009/0207257 A1 | 8/2009 | Jung et al. |
| 2009/0232416 A1 | 9/2009 | Murashita |
| 2009/0244291 A1 | 10/2009 | Saptharishi |
| 2009/0262189 A1 | 10/2009 | Marman |
| 2009/0288011 A1 | 11/2009 | Piran et al. |
| 2009/0316956 A1 | 12/2009 | Higuchi et al. |
| 2009/0319829 A1 | 12/2009 | Takayama |
| 2010/0002070 A1 | 1/2010 | Ahiska |
| 2010/0002071 A1 | 1/2010 | Ahiska |
| 2010/0002911 A1 | 1/2010 | Wu et al. |
| 2010/0004839 A1 | 1/2010 | Yokoyama et al. |
| 2010/0008547 A1 | 1/2010 | Yagnik et al. |
| 2010/0033573 A1 | 2/2010 | Malinovski et al. |
| 2010/0042949 A1 | 2/2010 | Chen |
| 2010/0045594 A1 | 2/2010 | Jenks et al. |
| 2010/0066822 A1 | 3/2010 | Steingberg et al. |
| 2010/0133008 A1 | 6/2010 | Gawski et al. |
| 2010/0162114 A1 | 6/2010 | Roth |
| 2010/0210240 A1 | 8/2010 | Mahaffey et al. |
| 2010/0245107 A1 | 9/2010 | Fulker et al. |
| 2010/0304731 A1 | 12/2010 | Bratton et al. |
| 2011/0001605 A1 | 2/2011 | Gal et al. |
| 2011/0167369 A1 | 7/2011 | Van Os |
| 2011/0199488 A1 | 8/2011 | Gorilovskij et al. |
| 2011/0199535 A1 | 8/2011 | Isu et al. |
| 2011/0254972 A1 | 10/2011 | Yaguchi |
| 2011/0255741 A1 | 10/2011 | Jung et al. |
| 2011/0255775 A1 | 10/2011 | McNamer et al. |
| 2011/0291925 A1 | 12/2011 | Israel |
| 2011/0312350 A1 | 12/2011 | Agerholm |
| 2012/0052972 A1 | 3/2012 | Bentley |
| 2012/0098918 A1 | 4/2012 | Murphy |
| 2012/0176496 A1 | 7/2012 | Carbonell et al. |
| 2012/0195363 A1 | 8/2012 | Laganiere et al. |
| 2012/0257000 A1 | 10/2012 | Singhai |
| 2012/0280783 A1 | 11/2012 | Gerhardt et al. |
| 2013/0027581 A1 | 1/2013 | Price et al. |
| 2013/0057695 A1 | 3/2013 | Huisking |
| 2013/0125039 A1 | 5/2013 | Murata |
| 2013/0128022 A1 | 5/2013 | Bose et al. |
| 2013/0145270 A1 | 6/2013 | Piran et al. |
| 2013/0201329 A1 | 8/2013 | Thornton et al. |
| 2013/0242093 A1 | 9/2013 | Cobb et al. |
| 2013/0301939 A1 | 11/2013 | Ochi et al. |
| 2014/0013243 A1 | 1/2014 | Flynn, III et al. |
| 2014/0044404 A1 | 2/2014 | Grundmann et al. |
| 2014/0049371 A1 | 2/2014 | Tung |
| 2014/0056479 A1 | 2/2014 | Bobbitt et al. |
| 2014/0068349 A1 | 3/2014 | Scott et al. |
| 2014/0075370 A1 | 3/2014 | Guerin et al. |
| 2014/0082497 A1 | 3/2014 | Chalouhi et al. |
| 2014/0085088 A1 | 3/2014 | Graphenius |
| 2014/0098227 A1 | 4/2014 | Chen et al. |
| 2014/0142907 A1 | 5/2014 | Gellaboina et al. |
| 2014/0146125 A1 | 5/2014 | Kristiansen et al. |
| 2014/0149078 A1 | 5/2014 | Lee et al. |
| 2014/0160294 A1 | 6/2014 | Naylor |
| 2014/0172906 A1 | 6/2014 | Sud et al. |
| 2014/0198237 A1 | 7/2014 | Noyes |
| 2014/0210646 A1 | 7/2014 | Subramanua |
| 2014/0240504 A1 | 8/2014 | Cho |
| 2014/0300722 A1 | 10/2014 | Garcia |
| 2014/0313142 A1 | 10/2014 | Yairi |
| 2014/0313542 A1 | 10/2014 | Benchorin et al. |
| 2014/0320740 A1 | 10/2014 | Wan et al. |
| 2014/0347475 A1 | 11/2014 | Divakaran et al. |
| 2015/0022660 A1 | 1/2015 | Kavadeles |
| 2015/0029335 A1 | 1/2015 | Kasmir et al. |
| 2015/0046184 A1 | 2/2015 | Cocco et al. |
| 2015/0054949 A1 | 2/2015 | Scalisi |
| 2015/0054981 A1 | 3/2015 | Saiki et al. |
| 2015/0074535 A1 | 3/2015 | Siberstein et al. |
| 2015/0081548 A1 | 3/2015 | Robinet |
| 2015/0098613 A1 | 4/2015 | Gagvani |
| 2015/0109104 A1* | 4/2015 | Fadell ............... G08B 27/005 340/5.7 |
| 2015/0116108 A1 | 4/2015 | Fadell et al. |
| 2015/0138353 A1 | 5/2015 | Yang et al. |
| 2015/0156030 A1 | 6/2015 | Fadell et al. |
| 2015/0156031 A1 | 6/2015 | Fadell et al. |
| 2015/0181088 A1 | 6/2015 | Wu et al. |
| 2015/0194134 A1 | 7/2015 | Dureau et al. |
| 2015/0201152 A1 | 7/2015 | Cho et al. |
| 2015/0222820 A1 | 8/2015 | Costigan et al. |
| 2015/0228167 A1 | 8/2015 | Scalisi et al. |
| 2015/0234571 A1 | 8/2015 | Lee et al. |
| 2015/0235551 A1 | 8/2015 | Maneskiold et al. |
| 2015/0242687 A1 | 8/2015 | Seo |
| 2015/0242994 A1 | 8/2015 | Shen et al. |
| 2015/0279182 A1 | 10/2015 | Kanaujia et al. |
| 2015/0325067 A1 | 11/2015 | Lee |
| 2015/0339702 A1 | 11/2015 | Lin et al. |
| 2015/0341599 A1 | 11/2015 | Carey |
| 2015/0363989 A1 | 12/2015 | Scalisi |
| 2016/0006932 A1 | 1/2016 | Zhang et al. |
| 2016/0006988 A1 | 1/2016 | Zhao |
| 2016/0026862 A1 | 1/2016 | Anderson |

(56) References Cited

U.S. PATENT DOCUMENTS

| | | |
|---|---|---|
| 2016/0027196 A1 | 1/2016 | Schiffer et al. |
| 2016/0041724 A1 | 2/2016 | Kirkby et al. |
| 2016/0042621 A1 | 2/2016 | Hogg |
| 2016/0072831 A1 | 3/2016 | Rieke |
| 2016/0092737 A1 | 3/2016 | Laska et al. |
| 2016/0092738 A1 | 3/2016 | Laska et al. |
| 2016/0103559 A1 | 4/2016 | Maheshwari et al. |
| 2016/0103887 A1 | 4/2016 | Fletcher et al. |
| 2016/0110612 A1 | 4/2016 | Sabripour |
| 2016/0117951 A1 | 4/2016 | Fleisher et al. |
| 2016/0189531 A1 | 6/2016 | Modi |
| 2016/0195716 A1 | 7/2016 | Nakanuma |
| 2016/0219248 A1 | 7/2016 | Reznik et al. |
| 2016/0235344 A1 | 8/2016 | Auerbach |
| 2016/0241818 A1 | 8/2016 | Palanisamy et al. |
| 2016/0274771 A1 | 9/2016 | Seong et al. |
| 2016/0307418 A1 | 10/2016 | Pantus |
| 2016/0316176 A1 | 10/2016 | Laska et al. |
| 2016/0316256 A1 | 10/2016 | Laska et al. |
| 2016/0321257 A1 | 11/2016 | Chen et al. |
| 2016/0321889 A1 | 11/2016 | Gagvani |
| 2016/0335861 A1 | 11/2016 | Shimura |
| 2016/0360116 A1 | 12/2016 | Penha et al. |
| 2016/0366036 A1 | 12/2016 | Gupta |
| 2016/0371534 A1 | 12/2016 | Koul et al. |
| 2017/0019605 A1 | 1/2017 | Wang et al. |
| 2017/0039729 A1 | 2/2017 | Wang et al. |
| 2017/0048495 A1 | 2/2017 | Scalisi |
| 2017/0084132 A1 | 3/2017 | Scalisi |
| 2017/0085843 A1 | 3/2017 | Scalisi et al. |
| 2017/0111494 A1 | 4/2017 | Kidron et al. |
| 2017/0123492 A1 | 5/2017 | Marggraff et al. |
| 2017/0162230 A1 | 6/2017 | Maliuk et al. |
| 2017/0163929 A1 | 6/2017 | Maliuk et al. |
| 2017/0180678 A1 | 6/2017 | Fish et al. |
| 2017/0195130 A1 | 7/2017 | Landow et al. |
| 2017/0195640 A1 | 7/2017 | Pasternak |
| 2017/0257612 A1 | 9/2017 | Emeott et al. |
| 2017/0272706 A1 | 9/2017 | Jeong |
| 2017/0301203 A1 | 10/2017 | Matsuura |
| 2018/0004784 A1 | 1/2018 | Tompkins |
| 2018/0012462 A1 | 1/2018 | Heitz, III et al. |
| 2018/0089328 A1 | 3/2018 | Bath et al. |
| 2018/0096197 A1 | 4/2018 | Kephart |
| 2018/0121035 A1 | 5/2018 | Filippi |
| 2018/0139332 A1 | 5/2018 | Kerzner |
| 2018/0144314 A1 | 5/2018 | Miller |
| 2018/0182148 A1 | 6/2018 | Yanagisawa |
| 2018/0218053 A1 | 8/2018 | Koneru |
| 2018/0219897 A1 | 8/2018 | Muddu et al. |
| 2018/0249134 A1 | 8/2018 | Siminoff et al. |
| 2018/0330169 A1 | 11/2018 | van Hoof et al. |
| 2018/0338120 A1* | 11/2018 | Lemberger ............. G06V 20/41 |
| 2018/0350213 A1 | 12/2018 | Bart et al. |
| 2019/0004639 A1 | 1/2019 | Faulkner |
| 2019/0035187 A1 | 1/2019 | Kim et al. |
| 2019/0087646 A1 | 3/2019 | Goulden et al. |
| 2019/0089934 A1 | 3/2019 | Goulden et al. |
| 2020/0279459 A1 | 9/2020 | Singh et al. |
| 2020/0285841 A1 | 9/2020 | Goulden et al. |
| 2021/0377493 A1 | 12/2021 | Goulden et al. |
| 2021/0383130 A1* | 12/2021 | Deets ..................... G06V 40/10 |
| 2022/0215725 A1 | 7/2022 | Jackson et al. |
| 2022/0247978 A1 | 8/2022 | Goulden et al. |

FOREIGN PATENT DOCUMENTS

| | | |
|---|---|---|
| EP | 1024666 | 8/2000 |
| JP | 2011044171 | 3/2011 |
| JP | 2012048689 | 3/2012 |
| WO | 2007011709 | 1/2007 |
| WO | 2009138037 | 11/2009 |
| WO | 2016/205213 A1 | 12/2016 |
| WO | 2017078793 | 5/2017 |

OTHER PUBLICATIONS

"Clustered/Stacked Filled Bar Graph Generator", http://www.burningcutlery.com/derek/bargraph/, Mar. 24, 2014, 16 pages.

"Configuring Main System—Chapter 1", (GEOVision) 2009—https://videos.cctvcamerapros.com/pdf/geovision/geovision-8-manual-ch1.pdf, 79 pages.

"EP Patent Certificate", EP Patent No. 3022720, Jan. 31, 2018, 1 page.

"Extended European Search Report", EP Application No. 18156967.4, dated Oct. 17, 2018, 12 pages.

"Extended European Search Report", EP Application No. 18172420.4, dated Nov. 26, 2018, 8 pages.

"FI8921W email notification and motion alarm", http://foscam.us/forum/fi8921w-email-notification-and-motion-alarm-t5874.html, Jun. 4, 2013, 2 pages.

"File:savedemo.png", https://wiki.freepascal.org/File:savedemo.png, Apr. 3, 2014, 2 pages.

"Foreign Office Action", CN Application No. 201880033972.7, dated Jan. 28, 2021, 8 pages.

"Graph Maker", https://forum.unity.com/threads/released-graph-maker-ugui-ngui-dfgui-line-graphs-bar-gaphs-pie-graphs-etc.202437, 21 pages.

"Histograms", Retrieved at: https://root.cern.ch/root/htmldoc/guides/users-guide/Histograms.html—on Dec. 20, 2018, 55 pages.

"How to set up motion detection in a Mobotix network camera", https://www.networkwebcams.co.uk/blog/2010/03/03/setting-up-motion-detection-mobotix/, Mar. 3, 2010, 5 pages.

"How to Setup Motion Detection on your D-Link Camera", http://blog.dlink.com/how-to-set-up-motion-detection-on-your-d-link-camera, Apr. 9, 2014, 8 pages.

"International Search Report and Written Opinion", Application No. PCT/US2015/039425, dated Sep. 28, 2015, 12 pages.

"International Search Report and Written Opinion", Application No. PCT/US2018/046811, dated Mar. 14, 2019, 16 pages.

"International Search Report and Written Opinion", Application No. PCT/US2018/032770, dated Nov. 2, 2018, 18 pages.

"IZON App Guide", www.izoncam.com/wp-content/uploads/2014/06/IZON-App-Guide.pdf, Jun. 2014, 30 pages.

"Logitech Alert Video Security System: Getting to Know", https://docplayer.net/19510884-Logitech-alert-video-security-system-getting-to-know.html, 2010, 9 pages.

"Motion Detection Setting up Motion Detection", https://www.ispyconnect.com/userguide-motion-detection.aspx, Dec. 11, 2011, 4 pages.

"Notice of Allowance", U.S. Appl. No. 16/883,932, dated Oct. 14, 2021, 8 pages.

"Prosecution History", U.S. Appl. No. 15/809,924, Jun. 4, 2019 through Apr. 24, 2020, 61 pages.

"Prosecution History from U.S. Appl. No. 15/809,900", Jun. 17, 20019 through May 27, 2021, 133 pages.

"Words of Estimative Probability", https://www.cia.gov/library/center-for-the-study-of-intelligence/csi-publications/books-and-monographs/sherman-kent-and-the-board-of-national-estimates-collected-essays/6words.html, May 25, 2018, 11 pages.

"You Tube, Sky News Live", (screenshot of website illustrating live stream video with timeline having preview thumbnail of past images within the stream) retrieved at: https://www.youtube.com/watch?v=9Auq9mYxFEE, Aug. 10, 2015, 2 pages.

Akhtar, Zahid , "Biometric Template Update Under Facial Aging", Jan. 2015, 7 pages.

Ballan, Lamberto , "Event Detection and Recognition for Semantic Annotation of Video", Nov. 2011, pp. 279-302.

Birk, Yitzhak , "Deterministic Load-Balancing Schemes for Disk-Based Video-on-Demand Storage Servers", Sep. 1995, 10 pages.

Buzan, Dan , "Extraction and Clustering of Motion Trajectories in Video", Apr. 23, 2004, 4 pages.

Camplani, Massimo et al., "Accurate depth-color scene modeling for 3D contents generation with low cost depth cameras", Oct. 2012, 5 pages.

Castellanos Jimenez, , "Event detection in video using motion analysis", Oct. 2010, pp. 57-62.

(56) References Cited

OTHER PUBLICATIONS

Delbruck, Tobi, "Frame-free dynamic digital vision", Mar. 2008, 6 pages.

Ellis, T J. et al., "Model-Based Vision for Automatic Interpretation", Nov. 1990, pp. 62-67.

Franco, Annalisa et al., "Incremental Template Updating for Face Recognition in Home Environments", Aug. 2010, 13 pages.

Gresham, Jim, "Review: iZon wi-fi Video monitor and its companion iOS app", https://www.idownloadblog.com/2012/11/21/stem-izon-review/, Nov. 21, 2012, 17 pages.

Halliquist, , "How do I set up Activity Alerts", http://support.dropcam.com/entries/27880086-How-do-i-set-up-Activity-Alerts, 2013, 3 pages.

Ivanov, Yuri et al., "Toward Spatial Queries for Spatial Surveillance Tasks", Jan. 2006, 9 pages.

Jiang, Yu-Gang et al., "High-Level Event Recognition in Unconstrained Videos", Nov. 2012, pp. 73-101.

Kumar, K. N. K., "Motion activated security camera using raspberry Pi", Apr. 2017, 4 pages.

Li, L et al., "Statistical Modeling of Complex Backgrounds for Foreground Object Detection", Nov. 2004, pp. 1459-1472.

Medioni, Gerard et al., "Event Detection and Analysis from Video Streams", Sep. 2001, 10 pages.

Oh, Jimmy, "Literature Review—Graphical Tool", https://www.stat.auckland.ac.nz/~joh024/LitReviews/LitReview_Graphical Tools.pdf, 23 pages.

Schraml, Stephan et al., "A Spatio-temporal Clustering Method Using Real-Time Motion Analysis on Event-Based 3D Vision", Jul. 2010, 7 pages.

Shim, Young-Bin et al., "A Study on Surveillance System of Object's Abnormal Behavior by Blob Composition Analysis", Mar. 2014, pp. 333-340.

Villier, Marie-Bernadette, "Amplification of the Antibody Response by C3b Complexed to Antigen Through an Ester Link", https://www.jimmunol.org/content/162/6/3647, Mar. 15, 1999, 7 pages.

Yoon, Kyongii et al., "Event Detection from MPEG Video in the Compressed Domain", Jan. 2000, 7 pages.

Zelnik-Manor, Lihi et al., "Event-Based Analysis of Video", Feb. 2001, 18 pages.

Zhou, F, "Aligned Cluster Analysis for Temporal Segmentation of Human Motion", Oct. 2008, 7 pages.

U.S. Appl. No. 17/400,887, filed Aug. 12, 2021, by Goulden et al.

"Non-Final Office Action", U.S. Appl. No. 17/659,718, dated Nov. 20, 2023, 10 pages.

\* cited by examiner

INTERACTING WITH VISITORS OF A CONNECTED HOME ENVIRONMENT

RELATED APPLICATIONS

This application claims priority to U.S. Provisional Application No. 62/945,724, filed Dec. 9, 2019, the entire contents of which is hereby incorporated by reference.

BACKGROUND

Home entryways are sensitive areas often associated with the security and peace of mind of the home's occupants. Homeowners and occupants have an interest in monitoring their entryways for security and convenience. Some existing surveillance systems detect persons in the field of view of a security camera, and some initiate a general alert upon such detection. However, a single type of alert is not appropriate for all detected persons, who may be welcome guests, occupants, unwelcome visitors, or merely persons passing by the entryway.

SUMMARY

Techniques of this disclosure may enable a home monitoring system to provide user assistance for addressing a visitor. The home monitoring system may determine that a visitor is approaching an entryway of the home and, in response, automatically manage interactions with the visitor as necessary or until a user (e.g., home occupant) takes over the interaction. In various instances, the home monitoring system may classify the visitor and, based on the classification, automatically generate responses, thereby interacting with the visitor without requiring real-time input or other assistance from the user. For example, the home monitoring system may initiate two-way communication with the visitor, adjust security settings in the home, alert the authorities, etc.

In this way, a home monitoring system configured in accordance with the techniques of this disclosure may more efficiently address visitors to the home. For example, by automatically assisting visitors, the homeowner may not be required to operate a remote device to interact with the visitor via the home monitoring system, which may save power, reduce processor usage, and reduce bandwidth usage. Further, by classifying visitors into various groups, such a home monitoring system may reduce the number of incorrect automatic interactions, which may also reduce processor usage and power usage.

In some examples, a method includes obtaining video data captured in a field of view by a camera of a visitor interaction system, identifying an approach of a person within the field of view of the camera, and analyzing the video data to determine an identity of the person. The method may further include, automatically and without user intervention: determining, based on the identify of the person, that the person belongs to one of a plurality of predefined visitor groups, each of the predefined visitor groups corresponding to a respective predefined response model that includes a plurality of respective response actions that are executable by the computer system in conjunction with the visitor interaction system, at least one of the respective response actions including an autonomous response action that is executable autonomously, without requiring intervention of a user of the visitor interaction system, identifying a first predefined response model corresponding to the one of the plurality of predefined visitor groups, and initiating, via the computer system in conjunction with the visitor interaction system, a first autonomous response action of the plurality of respective response actions associated with the first predefined response model. Initiating the firm autonomous response action may include presenting a first message to the person via a component of the visitor interaction system, monitoring a first response of the person to the first message, and sending a first report message to the user via a client device registered to the user, the first report message including a representation of the video data, approach data for the approach, and a summary of the first message and the first response.

BRIEF DESCRIPTION OF THE DRAWINGS

Like reference numerals refer to corresponding parts throughout the several views of the drawings.

DETAILED DESCRIPTION

Figure 1:
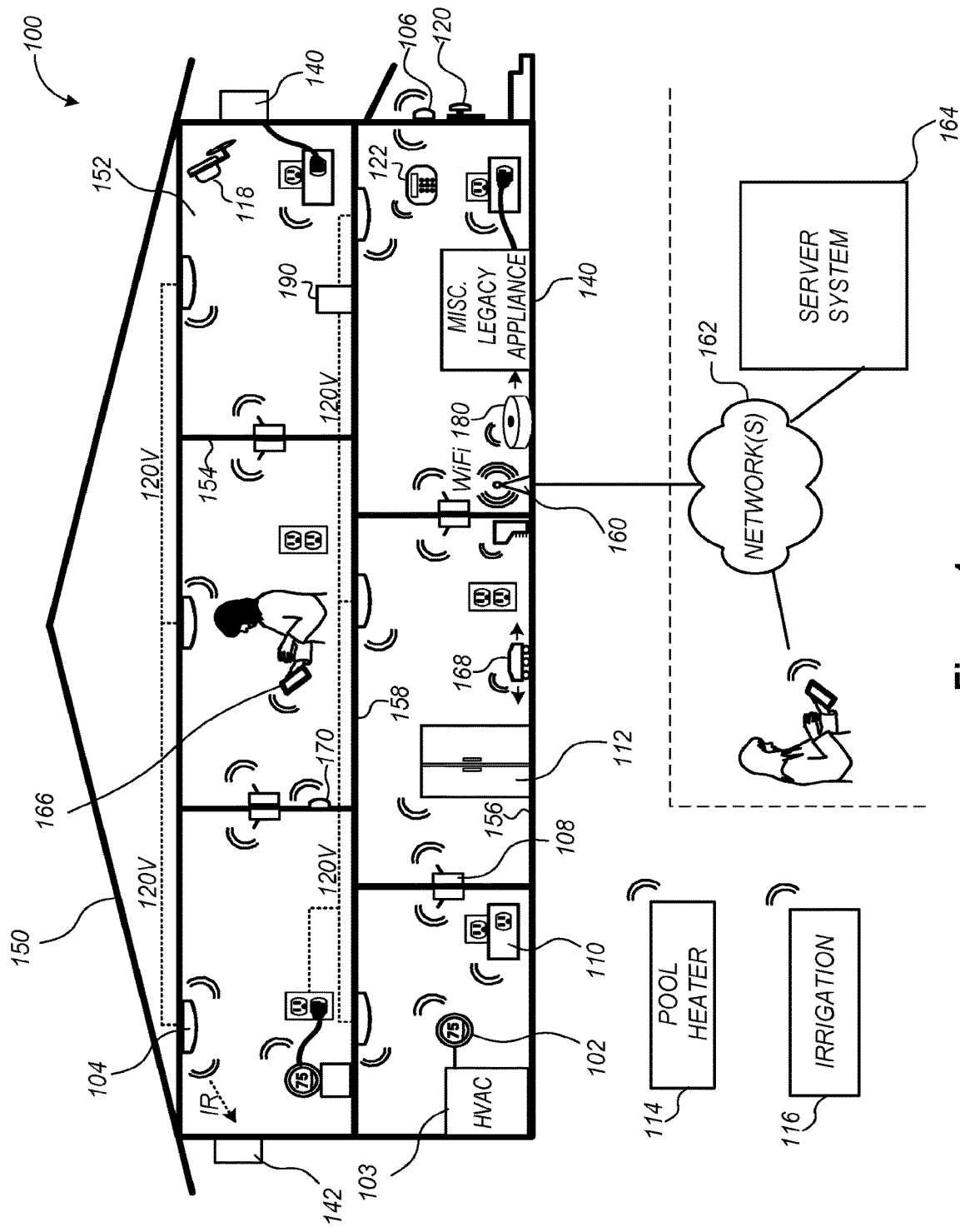
FIG. 1 illustrates an example connected home environment in accordance with some implementations.

This disclosure describes techniques that may enable home monitoring systems to alleviate problems due to the potentially large number of user alerts and notifications that can be generated by such systems. Rather than issuing alerts and notifications that rely solely on a user to decide how to respond to alerts and notices, a home monitoring system may recognize whether a motion event is caused by a visitor approaching the entryway or by a mere passerby, and respond appropriately to the recognized motion event. For example, the home monitoring system may initiate two-way communication with the visitor, adjust security settings in the home, alert the authorities, selectively output a notification for the event, and the like. Moreover, it may be beneficial to be able to recognize contextual information regarding the visitor and provide an appropriate response (from a subset of responses) that are relevant to the specific situation. For example, if a known visitor approaches the entryway, the system can respond appropriately for a known visitor (e.g., a greeting, a message, and/or unlock the door). On the other hand, if an unknown visitor approaches the entryway, the system can respond in a manner different manner that is appropriate for an unknown visitor (e.g., a warning, lock the door, provide instructions for dropping off a package, and/or call the authorities).

In some implementations, a user interface of the user device includes an option to set the level of interaction that the connected home system has with the visitor (e.g., via a virtual assistant). In some embodiments, the virtual assistant is set to always interact with the visitor and respond in an appropriate manner as determined for a given situation (e.g., automated assistant). In some implementations, the virtual assistant is set as an intermediary and interacts with the visitor until the user is able to respond to the visitor or in accordance with responses approved by the user (e.g., supervised assistant). In some embodiments, the virtual assistant is set to interact with the visitor only as permitted by the user (e.g., limited assistant). Use of the virtual assistant to interact with the visitor is also sometimes referred to herein as a talkback interaction. In some implementations, the connected home system provides the user with a summary of the virtual assistant's interaction with the visitor. The virtual assistant uses the response models to provide one or more responses to the user or the visitor.

In some implementations, the user may preprogram one or more of the responses or actions of a response model or identify a response model with responses and actions. In some implementations, the user may preprogram a response or action or a response model by speaking into a speaker device of the connected home environment. In some implementations, the user may preprogram a response or action or response model by using a client device, a visitor interaction system, a server system, or any other suitable computer system associated with the connected home environment.

In some implementations, at least a subset of the responses or actions are communication-based, such as sending a voice or text-to-speech message, initiating a talkback interaction, and/or initiating a prerecorded greeting. A prerecorded greeting or warning message is optionally a recording of a person's voice (e.g., the user's voice) or an artificial voice (e.g., a virtual assistant's voice). In some embodiments, the prerecorded message is a prerecorded computer-generated instruction provided by the assistant. In some implementations, at least a subset of the responses or actions are action-oriented, such as increasing a security level of the connected home environment, locking or unlocking a door, turning on or off a light, calling the authorities, alerting a security company or other person associated with the connected home (e.g., a neighbor), capturing a snapshot or video clip of the visitor (e.g., and sending it to the authorities, or storing it on a user-accessible server system), and/or turning on or off an alarm. In some implementations, a list of presented responses or actions includes at least one communication-based response and at least one action-oriented response. In some implementations, at least a subset of the responses or actions are personalized for known visitors (e.g., sending a personalized greeting or instructions, sending a personal message, taking a message, and/or asking for a passcode). In some implementations, at least a subset of the responses or actions are specific to a type of building (e.g. a house, condominium, apartment building, industrial properties, commercial properties, and/or a workplace). In some implementations, at least a subset of the responses or actions are specific to a connected home user's situation and/or temperament, such as whether the connected home user is home (e.g., alone) or away, or whether the user does not currently feel safe (e.g., has been receiving threats). For example, if the connected home user is currently feeling unsafe the system may provide more security-oriented actions, whereas if the connected home user is feeling safe the system may provide more greetings-based actions.

In some implementations, the visitor interaction system includes a do-not-disturb mode, during which alerts are limited. In some implementations, alerts are limited by muting (or decreasing the volume of) a doorbell sound effect inside the home, while still sending alerts or other notifications (e.g., messages) to a client device. In some implementations, independent of whether an internal doorbell sound is played, an external doorbell sound is played to give the visitor feedback that the doorbell has been pressed. In some implementations, the system provides visual feedback to the user (e.g., a spinning wheel or a preprogrammed message on a display mounted near, or integrated with, the doorbell). In some implementations, alerts are limited by silencing alerts sent to the client device. In some implementations, while in do-not-disturb mode, the visitor interaction system (e.g., through an assistant) asks the visitor if the visit is important. If so, the system sends a corresponding alert to the user and, optionally, ceases limiting alerts. If not, the system informs the visitor that the user is unavailable and asks the visitor to leave a message for the user. It is appreciated that the system will not inform a visitor that the user is busy or not at home if security-related contextual information makes it imprudent to do so. In some implementations, after determining that the user is busy, the visitor interaction system captures an image or video clip of the visitor for reporting to the user. In some implementations, if the visitor's face has not remained in the camera's field of view long enough to capture a desired image or video clip (e.g., an image or video clip showing an unobstructed frontal view of the visitor's face), the system requests that the visitor remain in front of the door for a moment (e.g., until the system has had sufficient time to capture an image or video clip). In some implementations, when the user engages the visitor interaction system after a visitor occurred, the system provides a report to the user regarding the visit.

FIG. 1 is an example connected home environment 100 in accordance with some implementations. The connected home environment 100 includes a structure 150 (e.g., a house, office building, commercial buildings, garage, or mobile home) with various integrated devices. It will be appreciated that devices may also be integrated into a connected home environment 100 that does not include an entire structure 150, such as an apartment, condominium, or office space. Further, the connected home environment 100 may control and/or be coupled to devices outside of the actual structure 150. Indeed, several devices in the connected home environment 100 need not be physically within the structure 150. For example, a device controlling a pool heater 114 or irrigation system 116 may be located outside of the structure 150.

It is to be appreciated that the term "connected home environment" may refer to a connected environment for homes, such as a single-family house, but the scope of the present teachings is not so limited. The present teachings are also applicable, without limitation, to duplexes, townhomes, apartments, multi-unit apartment buildings, hotel rooms, hotels, retail stores, office buildings, industrial buildings, and, more generally, any living space, commercial property, or work space.

It is also to be appreciated that while the terms user, customer, installer, homeowner, occupant, guest, tenant, landlord, repair person, and the like may be used to refer to the person or persons acting in the context of particular situations described herein, these references do not limit the scope of the present teachings with respect to the person or persons who are performing such actions. Thus, for example, the terms user, customer, purchaser, installer, subscriber, occupant and homeowner may often refer to the same person in the case of a single-family residential dwelling, who buys, installs and configures connected home monitoring devices, lives in the dwelling, subscribes to monitoring services, and receives alerts and notifications and interacts with the connected home environment associated with the dwelling as a user of application executed on a client device. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the connected home environment 100 include intelligent, multi-sensing, network-connected devices that integrate seamlessly with each other in a connected home network (e.g., 202 FIG. 2A) and/or with a central server or a cloud-computing system to provide a variety of useful connected home functions. The connected home environment 100 may include one or more intelligent, multi-sensing, network-connected thermostats 102 (hereinafter referred to as "connected thermostats 102"), one or more intelligent, network-connected, multi-sensing hazard detection units 104 (hereinafter referred to as "connected hazard detectors 104"), one or more intelligent, multi-sensing, network-connected entryway interface devices 106 and 120 (hereinafter referred to as "connected doorbells 106" and "connected door locks 120"), and one or more intelligent, multi-sensing, network-connected alarm systems 122 (hereinafter referred to as "connected alarm systems 122").

In some implementations, the one or more connected thermostats 102 detect ambient climate characteristics (e.g., temperature and/or humidity) and control a HVAC system 103 accordingly. For example, a respective connected thermostat 102 includes an ambient temperature sensor.

The one or more connected hazard detectors 104 may include thermal radiation sensors directed at respective heat sources (e.g., a stove, oven, other appliances, a fireplace, etc.). For example, a connected hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The connected doorbell 106 and/or the connected door lock 120 may detect a person's approach to or departure from a location (e.g., an outer door), control doorbell/door locking functionality (e.g., receive user inputs from a portable electronic device 166 to actuate bolt of the connected door lock 120), announce a person's approach or departure via audio or visual means, interact with a person that approaches or departs via audio or visual means, respond to a detected event, and/or control settings on a security system (e.g., to activate or deactivate the security system when occupants go and come). In some implementations, the connected doorbell 106 includes some or all of the components and features of the camera 118. In some implementations, the connected doorbell 106 includes a camera 118. In some implementations, the connected doorbell 106 includes a camera 118 that is embedded in the connected doorbell 106. In some implementations, the connected doorbell 106 includes a camera that is mounted on or near the connected doorbell 106. In some implementations, the connected doorbell 106 includes a camera 118 that is not mounted in, on, or near the connected doorbell 106, but is instead mounted in proximity to the connected doorbell 106. In some implementations, the connected doorbell 106 includes two or more cameras 118 (e.g., one camera facing the entryway, and another camera facing approaching visitors). In some implementations, the connected doorbell 106 has a camera (also sometimes referred to herein as doorbell camera 106) which is separate from a video camera 118. For the purposes of this disclosure, video-related references to connected doorbell 106 refer to one or more cameras associated with connected doorbell 106.

The connected alarm system 122 may detect the presence of an individual within close proximity (e.g., using built-in IR sensors), sound an alarm (e.g., through a built-in speaker, or by sending commands to one or more external speakers), and send notifications or messages to entities or users within/outside of the connected home network 100. In some implementations, the connected alarm system 122 also includes one or more input devices or sensors (e.g., keypad, biometric scanner, NFC transceiver, microphone) for verifying the identity of a user, and one or more output devices (e.g., display, speaker). In some implementations, the connected alarm system 122 may also be set to an "armed" mode, such that detection of a trigger condition or event causes the alarm to be sounded unless a disarming action is performed.

In some implementations, the connected home environment 100 includes one or more intelligent, multi-sensing, network-connected wall switches 108 (hereinafter referred to as "connected wall switches 108"), along with one or more intelligent, multi-sensing, network-connected wall plug interfaces 110 (hereinafter referred to as "connected wall plugs 110"). The connected wall switches 108 may detect ambient lighting conditions, detect room-occupancy states, and control a power and/or dim state of one or more lights. In some instances, connected wall switches 108 may also control a power state or speed of a fan, such as a ceiling fan. The connected wall plugs 110 may detect occupancy of a room or enclosure and control supply of power to one or more wall plugs (e.g., such that power is not supplied to the plug if nobody is at home).

In some implementations, the connected home environment 100 of FIG. 1 includes a plurality of intelligent, multi-sensing, network-connected appliances 112 (hereinafter referred to as "connected appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the connected home network, such as by indicating what type of appliance it is, and it may automatically integrate with the controls of the connected home. Such communication by the appliance to the connected home may be facilitated by either a wired or wireless communication protocol. The connected home may also include a variety of non-communicating legacy appliances 140, such as old conventional washer/dryers, refrigerators, and the like, which may be controlled by connected wall plugs 110. The connected home environment 100 may further include a variety of partially communicating legacy appliances 142, such as infrared ("IR") controlled wall air conditioners or other IR-controlled devices, which may be controlled by IR signals provided by the connected hazard detectors 104 or the connected wall switches 108.

In some implementations, the connected home environment 100 includes one or more network-connected cameras 118 that are configured to provide video monitoring and security in the connected home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 are each configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

In some implementations, the connected home environment 100 includes one or more network-connected doorbells 106 that are configured to provide video monitoring and security in a vicinity of an entryway of the connected home environment 100. The doorbells 106 are optionally used to determine the approach and/or presence of a visitor. Specific individuals are optionally identified based, for example, on their appearance (e.g., height, face) and/or movement (e.g., their walk/gait). A connected doorbell 106 optionally includes one or more sensors (e.g., IR sensors, motion detectors), input devices (e.g., microphone for capturing audio), and output devices (e.g., speaker for outputting audio). In some implementations, a connected doorbell 106 is configured to operate in a high-light mode (e.g., a day mode) and in a low-light mode (e.g., a night mode). In some implementations, a connected doorbell 106 includes one or more IR illuminators for providing illumination while the camera is operating in the low-light mode. In some implementations, a connected doorbell 106 includes one or more lights (e.g., one or more LEDs) for illuminating the doorbell in low-light conditions and/or giving visual feedback to a visitor. In some implementations, a connected doorbell 106 includes additional features and/or components such as weatherproofing and/or solar ray compensation. In some implementations, connected doorbell 106 is battery powered and runs in a low power or a high power mode. In some implementations, in the low power mode, connected doorbell 106 detects an approaching visitor using a low power sensors such as a passive infrared (PIR) sensor which is always on or periodically on. In some implementations, after the visitor approach is detected, connected doorbell 106 switches to the high power mode to carry out further processing functions (described below).

In some implementations, the connected home environment 100 additionally or alternatively includes one or more other occupancy sensors (e.g., the connected doorbell 106, connected door locks 120, touch screens, IR sensors, microphones, ambient light sensors, motion detectors, connected nightlights 170, etc.). In some implementations, the connected home environment 100 includes radio-frequency identification (RFID) readers (e.g., in each room 152 or a portion thereof) that determine occupancy based on RFID tags located on or embedded in occupants. For example, RFID readers may be integrated into the connected hazard detectors 104.

In some implementations, the connected home environment 100 includes one or more devices outside of the physical home but within a proximate geographical range of the home. For example, the connected home environment 100 may include a pool heater monitor 114 that communicates a current pool temperature to other devices within the connected home environment 100 and/or receives commands for controlling the pool temperature. Similarly, the connected home environment 100 may include an irrigation monitor 116 that communicates information regarding irrigation systems within the connected home environment 100 and/or receives control information for controlling such irrigation systems.

By virtue of network connectivity, one or more of the connected home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smartphone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control connected devices in the connected home environment 100 using a network-connected computer or portable electronic device 166. In some examples, some or all of the occupants (e.g., individuals who live in the home) may register their device 166 with the connected home environment 100. Such registration may be made at a central server to authenticate the occupant and/or the device as being associated with the home and to give permission to the occupant to use the device to control the connected devices in the home. An occupant may use their registered device 166 to remotely control the connected devices of the home, such as when the occupant is at work or on vacation. The occupant may also use their registered device to control the connected devices when the occupant is actually located inside the home, such as when the occupant is sitting on a couch inside the home. It should be appreciated that instead of or in addition to registering devices 166, the connected home environment 100 may make inferences about which individuals live in the home and are therefore occupants and which devices 166 are associated with those individuals. As such, the connected home environment may "learn" who is an occupant and permit the devices 166 associated with those individuals to control the connected devices of the home.

In some implementations, in addition to containing processing and sensing capabilities, devices 102, 104, 106, 108, 110, 112, 114, 116, 118, 120, and/or 122 (collectively referred to as "the connected devices") are capable of data communications and information sharing with other connected devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the connected devices serve as wireless or wired repeaters. In some implementations, a first one of the connected devices communicates with a second one of the connected devices via a wireless router. The connected devices may further communicate with each other via a connection (e.g., network interface 160) to a network, such as the Internet 162. Through the Internet 162, the connected devices may communicate with a server system 164 (also called a central server system and/or a cloud-computing system herein). The server system 164 may be associated with a manufacturer, support entity, or service provider associated with the connected device(s). In some implementations, a user is able to contact customer support using a connected device itself rather than needing to use other communication means, such as a telephone or Internet-connected computer. In some implementations, software updates are automatically sent from the server system 164 to connected devices (e.g., when available, when purchased, or at routine intervals).

In some implementations, the network interface 160 includes a conventional network device (e.g., a router), and the connected home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., connected devices of the connected home environment 100). Each of these connected devices optionally communicates with the hub device 180 using one or more radio communication networks available at least in the connected home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smartphone, household controller, laptop, tablet computer, game console or similar electronic device. In some implementations, a user of such controller application can view status of the hub device or coupled connected devices, configure the hub device to interoperate with connected devices newly introduced to the home network, commission new connected devices, and adjust or view settings of connected devices, etc. In some implementations the hub device extends capabilities of low capability connected device to match capabilities of the highly capable connected devices of the same type, integrates functionality of multiple different device types—even across different communication protocols, and is configured to streamline adding of new devices and commissioning of the hub device. In some implementations, hub device 180 further includes a local storage device for storing data related to, or output by, connected devices of connected home environment 100. In some implementations, the data includes one or more of: video data output by a camera device, metadata output by a connected device, settings information for a connected device, usage logs for a connected device, and the like.

In some implementations, connected home environment 100 includes a local storage device 190 for storing data related to, or output by, connected devices of connected home environment 100. In some implementations, the data includes one or more of: video data output by a camera device (e.g., a camera included with connected doorbell 106), metadata output by a connected device, settings information for a connected device, usage logs for a connected device, and the like. In some implementations, local storage device 190 is communicatively coupled to one or more connected devices via a connected home network (e.g., connected home network 202, FIG. 2A). In some implementations, local storage device 190 is selectively coupled to one or more connected devices via a wired and/or wireless communication network. In some implementations, local storage device 190 is used to store video data when external network conditions are poor. For example, local storage device 190 is used when an encoding bitrate of the camera included with connected doorbell 106 exceeds the available bandwidth of the external network (e.g., network(s) 162). In some implementations, local storage device 190 temporarily stores video data from one or more doorbells (e.g., connected doorbell 106) prior to transferring the video data to a server system (e.g., server system 164).

Figure 2A:
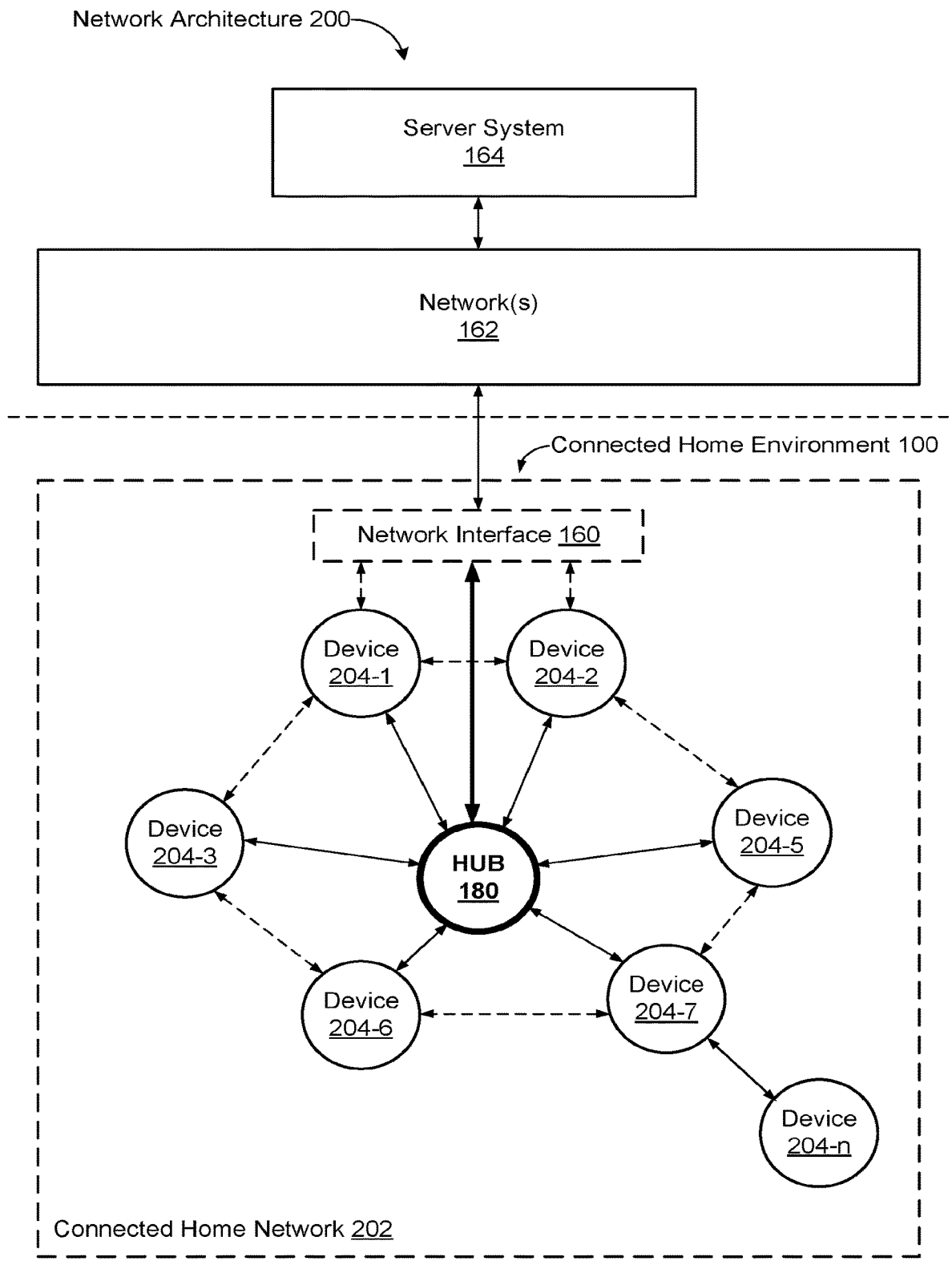
FIG. 2A illustrates a block diagram illustrating a representative network architecture that includes a connected home network in accordance with some implementations.

FIG. 2A is a block diagram illustrating a representative network architecture 200 that includes a connected home network 202 in accordance with some implementations. In some implementations, the connected devices 204 in the connected home environment 100 (e.g., devices 102, 104, 106, 108, 110, 112, 114, 116, 118, 120, and/or 122) combine with the hub device 180 to create a mesh network in connected home network 202. In some implementations, one or more connected devices 204 in the connected home network 202 operate as a connected home controller. Additionally and/or alternatively, hub device 180 operates as the connected home controller. In some implementations, a connected home controller has more computing power than other connected devices. In some implementations, a connected home controller processes inputs (e.g., from connected devices 204, electronic device 166, and/or server system 164) and sends commands (e.g., to connected devices 204 in the connected home network 202) to control operation of the connected home environment 100. In some implementations, some of the connected devices 204 in the connected home network 202 (e.g., in the mesh network) are "spokesman" nodes (e.g., 204-1) and others are "low-powered" nodes (e.g., 204-9). Some of the connected devices in the connected home environment 100 are battery powered, while others have a regular and reliable power source, such as by connecting to wiring (e.g., to 120V line voltage wires) behind the walls 154 of the connected home environment. The connected devices that have a regular and reliable power source are referred to as "spokesman" nodes. These nodes are typically equipped with the capability of using a wireless protocol to facilitate bidirectional communication with a variety of other devices in the connected home environment 100, as well as with the server system 164. In some implementations, one or more "spokesman" nodes operate as a connected home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes are incapable of bidirectional communication. These low-power nodes send messages, but they are unable to "listen". Thus, other devices in the connected home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the connected devices serve as low-power and spokesman nodes to create a mesh network in the connected home environment 100. In some implementations, individual low-power nodes in the connected home environment regularly send out messages regarding what they are sensing, and the other low-powered nodes in the connected home environment—in addition to sending out their own messages—forward the messages, thereby causing the messages to travel from node to node (i.e., device to device) throughout the connected home network 202. In some implementations, the spokesman nodes in the connected home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire connected home network 202, as well as over the Internet 162 to the server system 164. In some implementations, the mesh network enables the server system 164 to regularly receive data from most or all of the connected devices in the home, make inferences based on the data, facilitate state synchronization across devices within and outside of the connected home network 202, and send commands to one or more of the connected devices to perform tasks in the connected home environment.

As described, the spokesman nodes and some of the low-powered nodes are capable of "listening." Accordingly, users, other devices, and/or the server system 164 may communicate control commands to the low-powered nodes. For example, a user may use the electronic device 166 (e.g., a smartphone) to send commands over the Internet to the server system 164, which then relays the commands to one or more spokesman nodes in the connected home network 202. The spokesman nodes may use a low-power protocol to communicate the commands to the low-power nodes throughout the connected home network 202, as well as to other spokesman nodes that did not receive the commands directly from the server system 164.

In some implementations, a connected nightlight 170 (FIG. 1), which is an example of a connected device 204, is a low-power node. In addition to housing a light source, the connected nightlight 170 houses an occupancy sensor, such as an ultrasonic or passive IR sensor, and an ambient light sensor, such as a photo resistor or a single-pixel sensor that measures light in the room. In some implementations, the connected nightlight 170 is configured to activate the light source when its ambient light sensor detects that the room is dark and when its occupancy sensor detects that someone is in the room. In other implementations, the connected nightlight 170 is simply configured to activate the light source when its ambient light sensor detects that the room is dark. Further, in some implementations, the connected nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., connected device to connected device) within the connected home network 202 as well as over the Internet 162 to the server system 164.

Other examples of low-power nodes include battery-operated versions of the connected hazard detectors 104. These connected hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, connected hazard detectors 104 may send messages that correspond to each of the respective sensors to the other devices and/or the server system 164, such as by using the mesh network as described above.

Examples of spokesman nodes include connected doorbells 106, connected thermostats 102, connected wall switches 108, and connected wall plugs 110. These devices are often located near and connected to a reliable power source, and therefore may include more power-consuming components, such as one or more communication chips capable of bidirectional communication in a variety of protocols.

In some implementations, the connected home environment 100 includes service robots 168 (FIG. 1) that are configured to carry out, in an autonomous manner, any of a variety of household tasks.

As explained above with reference to FIG. 1, in some implementations, the connected home environment 100 of FIG. 1 includes a hub device 180 that is communicatively coupled to the network(s) 162 directly or via the network interface 160. The hub device 180 is further communicatively coupled to one or more of the connected devices using a radio communication network that is available at least in the connected home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each connected device to meet the data format requirements of the network interface 160 or the network(s) 162, but also converts information received from the network interface 160 or the network(s) 162 to meet the data format requirements of the respective communication protocol associated with a targeted connected device. In some implementations, in addition to data format conversion, the hub device 180 further processes the data received from the connected devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of connected devices, control application(s) running on representative electronic device(s) (such as a smartphone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected devices and/or the control application, or different combinations thereof.

Figure 2B:
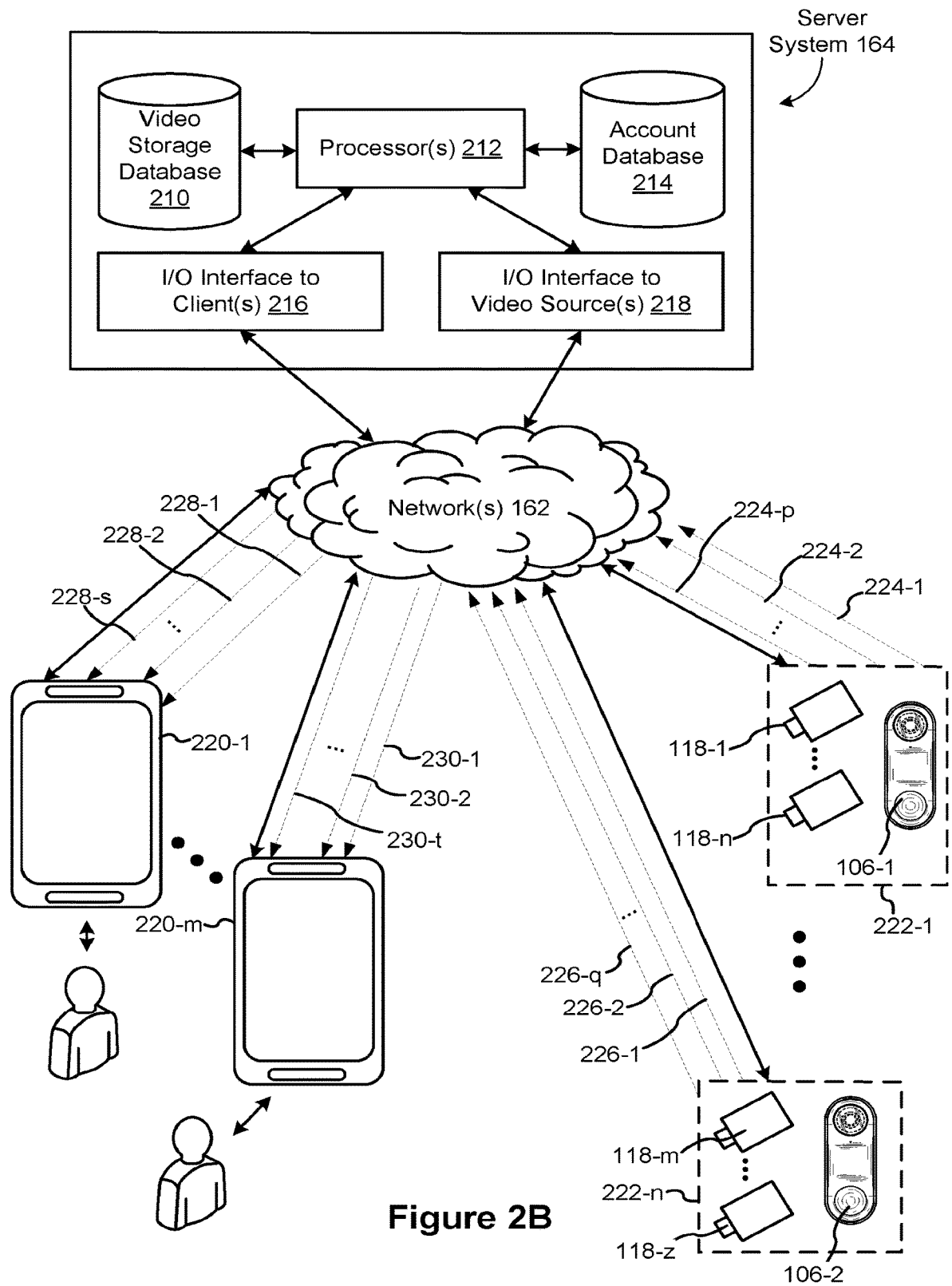
FIG. 2B is a representative operating environment in which a server system interacts with client devices and connected devices in accordance with some implementations.

FIG. 2B illustrates a representative operating environment in which a server system 164 provides data processing for monitoring and facilitating review of events (e.g., motion, audio, security, etc.) in video streams captured by video cameras 118 or a camera of connected doorbell 106. As shown in FIG. 2B, the server system 164 receives video data from video sources 222 (including cameras 118 or connected doorbell 106) located at various physical locations (e.g., inside or in proximity to homes, restaurants, stores, streets, parking lots, and/or the connected home environments 100 of FIG. 1). Each video source 222 may be bound to one or more reviewer accounts, and the server system 164 provides video monitoring data for the video source 222 to client devices 220 associated with the reviewer accounts. For example, the portable electronic device 166 is an example of the client device 220. In some implementations, the server system 164 is a video processing server that provides video processing services to the video sources and client devices 220.

In some implementations, each of the video sources 222 includes one or more video cameras 118 or doorbell cameras 106 that capture video and send the captured video to the server system 164 substantially in real-time. In some implementations, each of the video sources 222 includes one or more doorbell cameras 106 that capture video and send the captured video to the server system 164 in real-time (e.g., within 1 second, 10 seconds, 30 seconds, or 1 minute). In some implementations, each of the doorbells 106 include a video camera that captures video and sends the captured video to the server system 164 in real-time. In some implementations, a video source 222 includes a controller device (not shown) that serves as an intermediary between the one or more doorbells 106 and the server system 164. The controller device receives the video data from the one or more doorbells 106, optionally performs some preliminary processing on the video data, and sends the video data and/or the results of the preliminary processing to the server system 164 on behalf of the one or more doorbells 106 (e.g., in real-time). In some implementations, each camera has its own on-board processing capabilities to perform some preliminary processing on the captured video data before sending the video data (e.g., along with metadata obtained through the preliminary processing) to the controller device and/or the server system 164.

Figure 6:
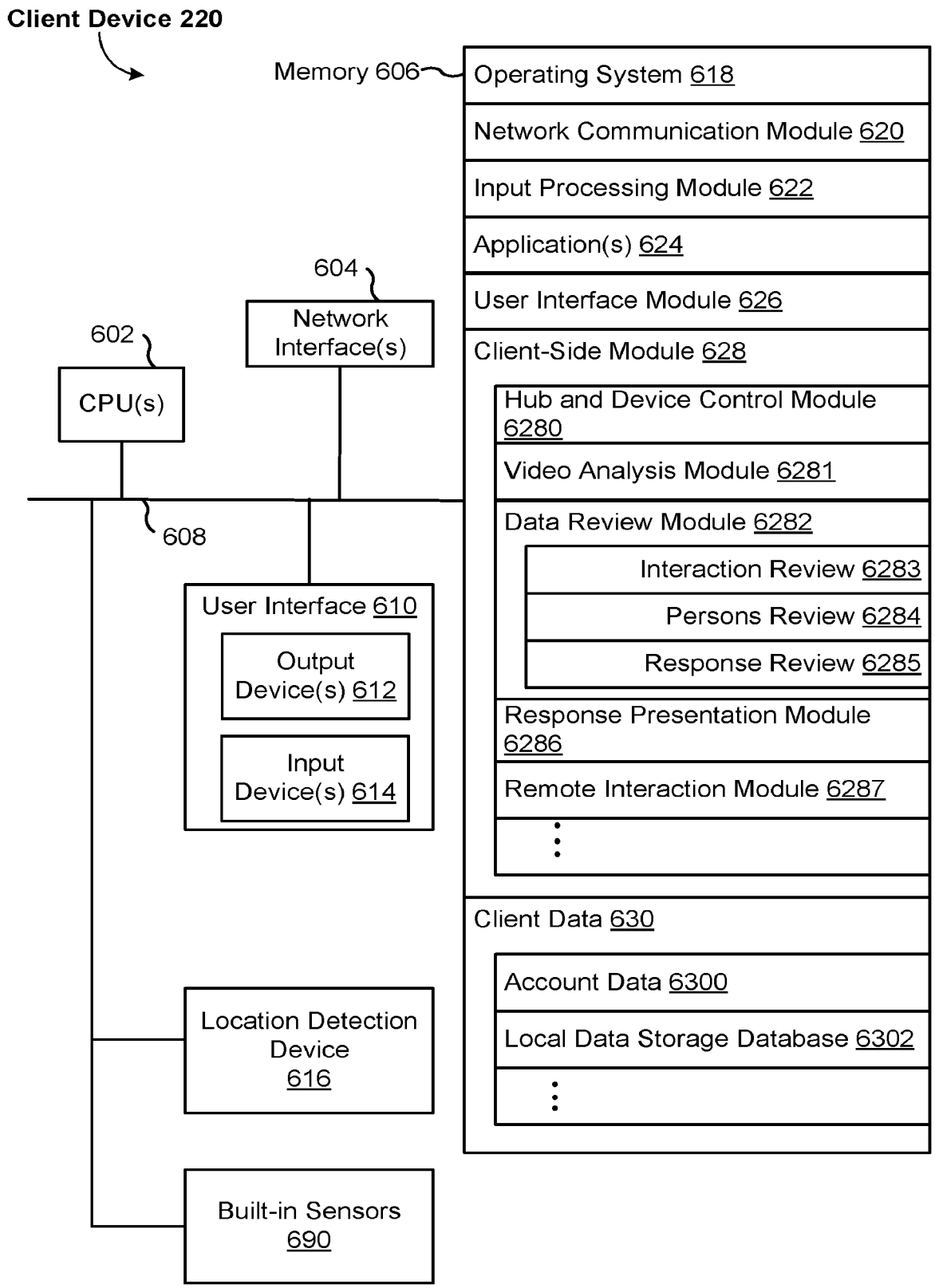
FIG. 6 is a block diagram illustrating a representative client device in accordance with some implementations.

In accordance with some implementations, a client device 220 includes a client-side module, such as client-side module 628 in FIG. 6. In some implementations, the client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules each residing on a respective client device 220. In some implementations, the server-side module also provides server-side functionality for video processing and camera control for any number of the video sources 222, including any number of control devices, cameras 118, and doorbells 106.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources 222 (e.g., groups of one or more doorbells 106, cameras 118, and associated controller devices). The video storage database 210 stores raw video data received from the video sources 222, as well as various types of metadata, such as motion events, event categories, event category models, event filters, and event masks, for use in data processing for event monitoring and review for each reviewer account.

Examples of a representative client device 220 include a handheld computer, a wearable computing device, a personal digital assistant (PDA), a tablet computer, a laptop computer, a desktop computer, a cellular telephone, a smartphone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a handheld computer, a tablet computer, a laptop computer, a desktop computer, or a combination of any two or more of these data processing devices or other data processing devices.

The server-client environment shown in FIG. 2B includes both a client-side portion (e.g., the client-side module) and a server-side portion (e.g., the server-side module). The division of functionality between the client and server portions of operating environment can vary in different implementations. Similarly, the division of functionality between a video source 222 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 222 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the server system 164, a client device 220, and a video source 222 cooperatively.

In some implementations, a video source 222 (e.g., a camera 118 or connected doorbell 106 having an image sensor) transmits one or more streams of video data to the server system 164. In some implementations, the one or more streams include multiple streams, of respective resolutions and/or frame rates, of the raw video captured by the image sensor. In some implementations, the multiple streams include a "primary" stream (e.g., 226-1) with a certain resolution and frame rate, corresponding to the raw video captured by the image sensor, and one or more additional streams (e.g., 226-2 through 226-q). An additional stream is optionally the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream.

In some implementations, one or more of the streams 226 is sent from the video source 222 directly to a client device 220 (e.g., without being routed to, or processed by, the server system 164). In some implementations, one or more of the streams is stored at the connected doorbell 106 (e.g., in memory 406, FIG. 4) and/or a local storage device (e.g., a dedicated recording device), such as a digital video recorder (DVR). For example, in accordance with some implementations, the connected doorbell 106 stores the most recent 24 hours of video footage recorded by the camera. In some implementations, portions of the one or more streams are stored at the connected doorbell 106 and/or the local storage device (e.g., portions corresponding to particular events or times of interest).

In some implementations, the server system 164 transmits one or more streams of video data to a client device 220 to facilitate event monitoring by a user (e.g., streams 228 and 230). In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream, as described in greater detail in U.S. patent application Ser. No. 15/594,518.

Figure 3A:
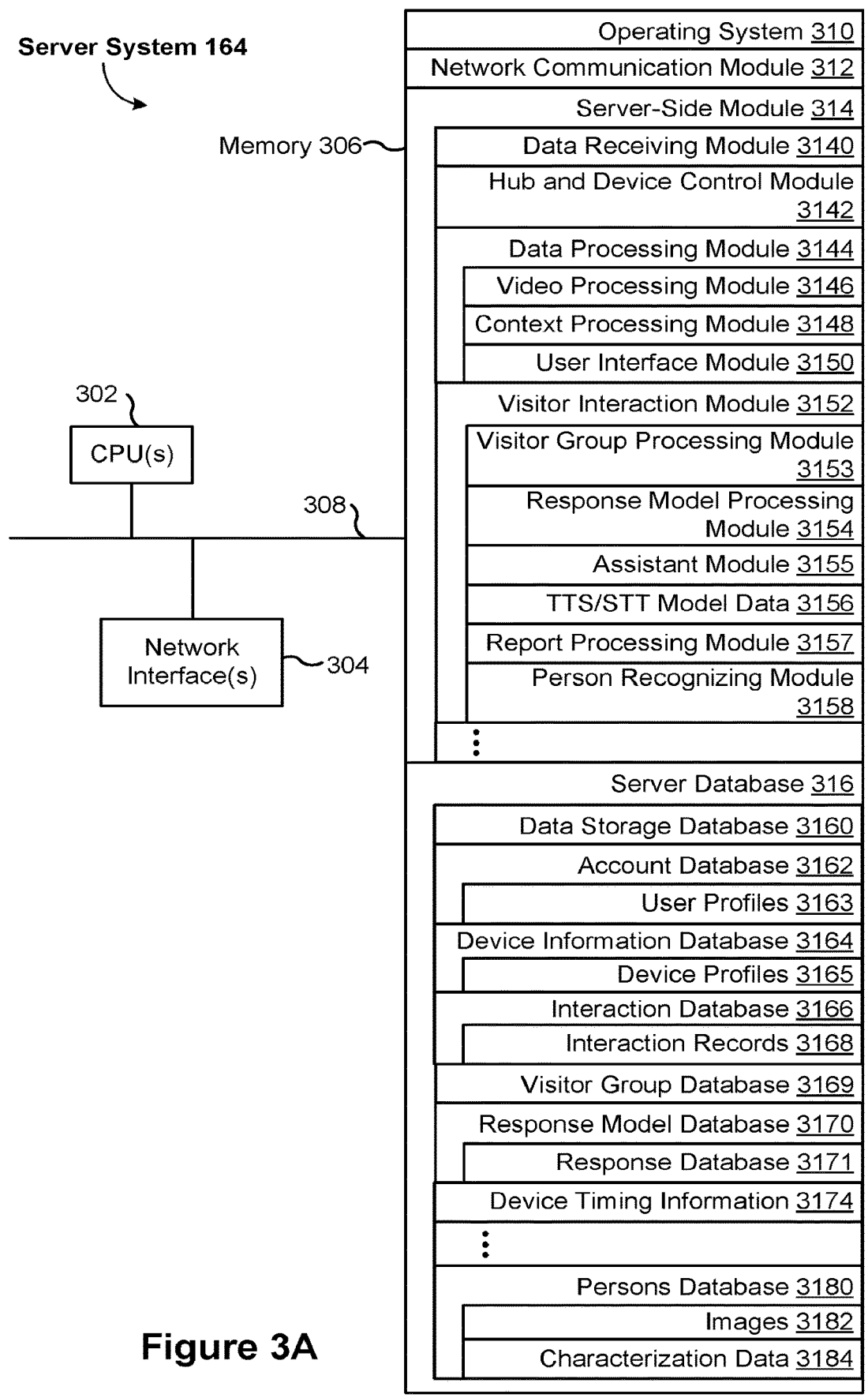
FIG. 3A is a block diagram illustrating a representative server system in accordance with some implementations.

FIG. 3A is a block diagram illustrating the server system 164 in accordance with some implementations. The server system 164 typically includes one or more processing units (CPUs) 302, one or more network interfaces 304 (e.g., including an I/O interface to one or more client devices and an I/O interface to one or more electronic devices), memory 306, and one or more communication buses 308 for interconnecting these components (sometimes called a chipset). The memory 306 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processing units 302. The memory 306, or alternatively the non-volatile memory within memory 306, includes a non-transitory computer readable storage medium. In some implementations, the memory 306, or the non-transitory computer readable storage medium of the memory 306, stores the following programs, modules, and data structures, or a subset or superset thereof:

- an operating system 310 including procedures for handling various basic system services and for performing hardware dependent tasks;
- a network communication module 312 for connecting the server system 164 to other systems and devices (e.g., client devices, electronic devices, and systems connected to one or more networks 162) via one or more network interfaces 304 (wired or wireless);
- a server-side module 314, which provides server-side functionalities for device control, data processing, and data review, including, but not limited to:
  - a data receiving module 3140 for receiving data from electronic devices (e.g., video data from a connected doorbell 106, FIG. 1), and preparing the received data for further processing and storage in the data storage database 3160;

a hub and device control module 3142 for generating and sending server-initiated control commands to modify operation modes of electronic devices (e.g., devices of a connected home environment 100), and/or receiving (e.g., from client devices 220) and forwarding user-initiated control commands to modify operation modes of the electronic devices;

a data processing module 3144 for processing the data provided by the electronic devices, and/or preparing and sending processed data to a connected device (e.g., connected doorbell 106 to respond to a visitor and/or event) and/or a device for review (e.g., client devices 220 for review by a user), including, but not limited to:

a video processor sub-module 3146 for processing (e.g., categorizing, identifying, and/or recognizing) detected interactions, approaches, motion, interaction candidates, entities and/or event candidates within a received video (e.g., a video from connected doorbell 106); and a context processing sub-module 3148 for processing (e.g., categorizing, identifying, and/or recognizing) video and/or audio (e.g., a video from connected doorbell 106) and collect context data;

a user interface sub-module 3150 for communicating with a user (e.g., sending alerts, timeline events, notifications, messages, interaction summaries, transcripts, audio, video, transcriptions (e.g., text-to-speech or speech-to-text) etc. and receiving user edits and zone definitions and the like);

a visitor interaction module 3152 for processing detected interactions, approaches, interaction candidates, entities and/or event candidates as well as the corresponding data (e.g., identity of the person, context information, video, audio, etc.) and/or preparing and sending response models and/or responses to a connected device (e.g., connected doorbell 106 to respond, via an assistant, to a visitor and/or event) and/or a device for review (e.g., client devices 220 for review by a user), including, but not limited to:

a visitor group processor sub-module 3153 for processing (e.g., classifying) detected interactions, approaches, interaction candidates, entities and/or event candidates and determining a visitor group corresponding to detected interactions, approaches, interaction candidates, entities and/or event candidates;

a response model processing module 3154 for processing the determined visitor group, determining a response model corresponding to the determined visitor group, determining responses associated with the determined response model (e.g., based on data generated by the data processing module 3144 and the assistant module 3155), and/or modifying response models and/or associated response models;

an assistant module 3155 for processing (characterizing, identifying, and/or recognizing) interactions between the visitor and the assistant of the connected device (e.g., connected doorbell 106), collecting additional context information from the visitor, and/or responding to the visitor via the connected device;

a Text-to-Speech (TTS)/Speech-to-Test (STT) module 3156 for processing (e.g., translating, transforming, and/or transcribing) interactions between the visitor and the assistant of the connected device (e.g., connected doorbell 106), interactions between the visitor and a user (e.g., connected device communicating with a client device 220 of the user), and/or user input (e.g., provided by the client devices 220 of the user to the server and/or connected device), generating audio and/or text, providing and/or sending the audio and/or text to the visitor, via the assistant of the connected device, and/or the user, via client device;

a report processing module 3157 for processing collected data (e.g., data obtained and/or generated by data processing module 3144 and visitor interaction module 3152), generating reports, such as alerts; timeline events; notifications; messages; interaction summaries; transcripts; audio; video; transcriptions (e.g., text-to-speech or speech-to-text); reports; etc., storing and/or providing the reports to a user, via client device 220;

a person recognizing module 3158 for processing detected interactions, approaches, interaction candidates, entities and/or event candidates and recognizing and/or identifying people and/or entities; and a server database 316, including but not limited to:

a data storage database 3160 for storing data associated with each electronic device (e.g., each doorbell) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub device 180 or connected devices are stored securely;

an account database 3162 for storing account information for user accounts, including user account information such as user profiles 3163, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;

a device information database 3164 for storing device information related to one or more devices such as device profiles 3165, e.g., device identifiers and hub device specific secrets, independently of whether the corresponding hub devices have been associated with any user account;

an interaction database 3166 for storing interaction records 3168 including information such as context information 31686, e.g., contextual data describing circumstances surrounding an approaching visitor;

a visitor group database 3169 for storing predetermined visitor groups, user generated visitor groups, and/or learned visitor groups; and a response database 3170 for storing response models corresponding to respective visitor groups including, but not limited to:

a response database 3171 for storing responses associated with respective response models;

a device timing information database 3167 for storing timing information corresponding to connected devices and/or detected interaction information; and a persons database 3180 for storing information regarding detected and/or recognized persons, such as images (e.g., cropped headshots) 3182 of detected persons and feature characterization data 3184 for the persons.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above.

Figure 3B:
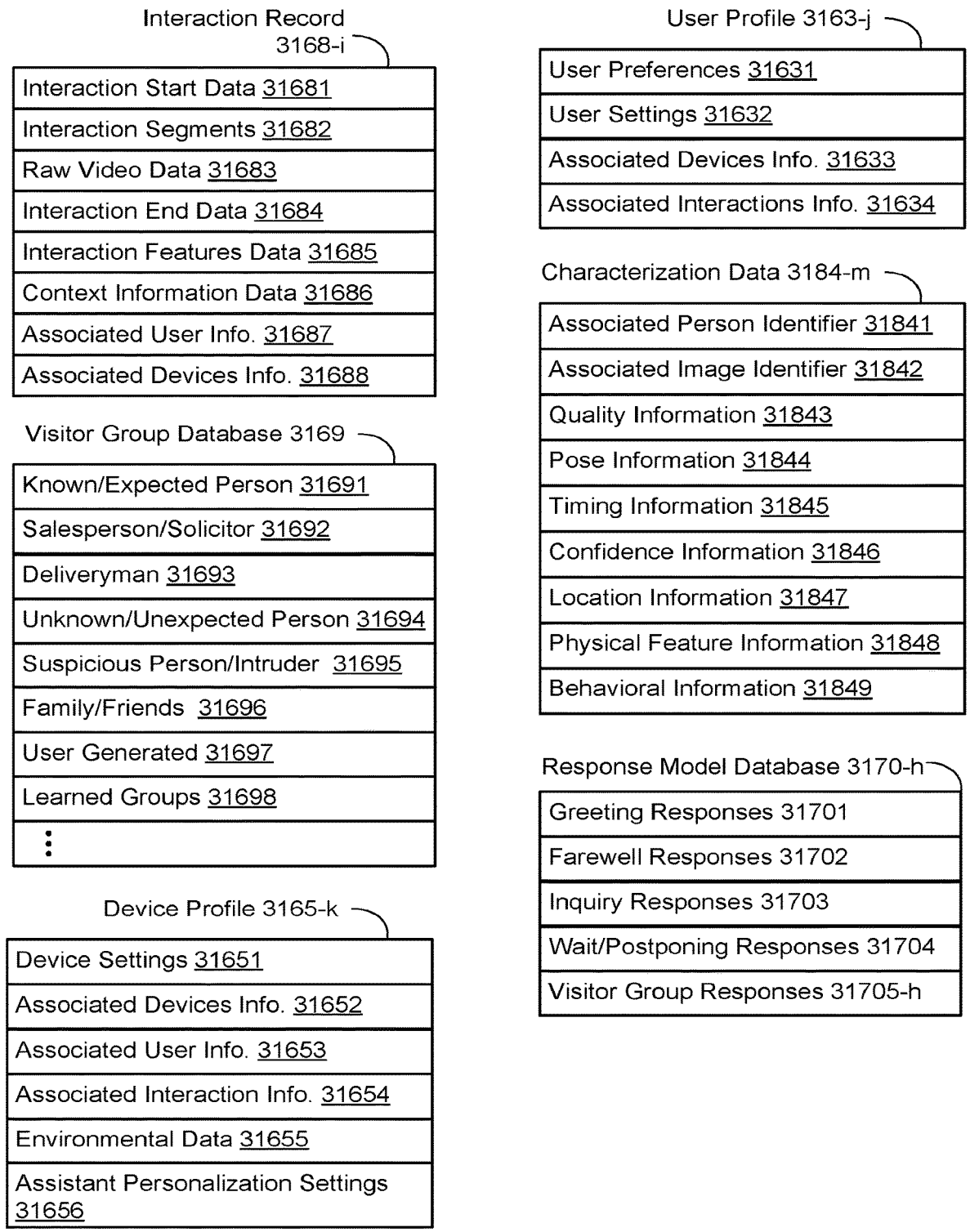
FIG. 3B illustrates various data structures used in some implementations.

FIG. 3B illustrates various data structures used by some implementations, including an interaction record 3168-$i$, a user profile 3163-$j$, a device profile 3165-$k$, and characterization data 3184-$m$. The interaction record 3168-$i$ corresponds to an interaction 'i' and data for the interaction T. In some implementations, the interaction T includes one or more of: a motion event/interaction, a hazard interaction, an audio interaction, and a security interaction. In some instances, the data for a motion event/interaction 'i' includes interaction start data 31681 indicating when and/or how the interaction started, interaction segments data 31682, raw video data 31683, interaction end data 31684 indicating when and/or how the interaction ended, interaction features data 31685, context information data 31686, associated user information 31687, and associated devices information 31688. In some instances, the interaction record 3168-$i$ includes only a subset of the above data. In some instances, the interaction record 3168-$i$ includes additional interaction data not shown such as data regarding interaction/motion masks.

The interaction start data 31681 includes date and time information such as a timestamp and optionally includes additional information such as information regarding the amount of motion present, a motion start location, amount of audio present, characteristics of the audio, and the like. Similarly, the interaction end data 31684 includes date and time information such as a timestamp and optionally includes additional information such as information regarding the amount of motion present, a motion start location, amount of audio present, characteristics of the audio, and the like.

The interaction segments 31682 includes information regarding segmentation of the motion event/interaction T. In some instances, interaction segments are stored separately from the raw video data 31683. In some instances, the interaction segments are stored at a lower display resolution than the raw video data. For example, the interaction segments are optionally stored at 480p or 780p and the raw video data is stored at 1080i or 1080p. Storing the interaction segments at a lower display resolution enables the system to devote less time and resources to retrieving and processing the interaction segments. In some instances, the interaction segments are not stored separately and the segmentation information includes references to the raw video data 31683 as well as date and time information for reproducing the interaction segments. In some implementations, the interaction segments include one or more audio segments (e.g., corresponding to video segments).

The interaction features data 31685 includes information regarding interaction features such as interaction classifications, object masks, motion masks, identified/recognized/tracked motion objects (also sometimes called blobs), information regarding features of the motion objects (e.g., object color, object dimensions, velocity, size changes, etc.), information regarding activity in zones of interest, and the like.

The context information data 31686 includes context information regarding the interaction such as information regarding the visitor (e.g., behavior, clothing, possessions carried, or size characteristics), information regarding approach timing (e.g., time of day, level of brightness), information regarding visitor announcements (e.g., shouting, calling, waving, talking, doorbell press, knocking, and associated timing thereof), information regarding scheduling (e.g., proximity in time to a prescheduled interaction, or proximity in time to a prescheduled status of the connected home environment), information regarding the status or location of one or more users, and the like.

The associated user information 31687 includes information regarding users associated with the interaction such as users identified in the interaction, users receiving notification of the interaction, and the like. In some instances, the associated user information 31687 includes a link, pointer, or reference to a user profile 3163 for to the user. The associated devices information 31688 includes information regarding the device or devices involved in the interaction (e.g., a connected doorbell 106 that recorded the interaction). In some instances, the associated devices information 31688 includes a link, pointer, or reference to a device profile 3165 for the device.

The user profile 3163-$j$ corresponds to a user 'j' associated with the connected home network (e.g., connected home network 202) such as a user of a hub device 204, a user identified by a hub device 204, a user who receives notifications or messages from a hub device 204 or from the server system 164, and the like. In some instances, the user profile 3163-$j$ includes user preferences 31631, user settings 31632, associated devices information 31633, and associated interactions information 31634. In some instances, the user profile 3163-$j$ includes only a subset of the above data. In some instances, the user profile 3163-$j$ includes additional user information not shown, such as information regarding other users associated with the user 'j'.

The user preferences 31631 include explicit user preferences input by the user as well as implicit and/or inferred user preferences determined by the system (e.g., server system 164 and/or client device 220). In some instances, the inferred user preferences are based on historical user activity and/or historical activity of other users. In some instances, the user preferences identify the personalized preferences of the visitor interaction system assistant (e.g., automated, supervised, limed as described below). The user settings 31632 include information regarding settings set by the user T such as notification/message settings, device settings, and the like. In some instances, the user settings 31632 include device settings for devices associated with the user 'j'.

The associated devices information 31633 includes information regarding devices associated with the user 'j' such as devices within the user's connected home environment 100 and/or client devices 220. In some instances, associated devices information 31633 includes a link, pointer, or reference to a corresponding device profile 3165. Associated interactions information 31634 includes information regarding interactions associated with user T such as interactions in which user 'j' was identified, interactions for which user 'j' was notified, interactions corresponding to a connected home environment 100 of user 'j', and the like. In some instances, the associated interactions information 31634 includes a link, pointer, or reference to a corresponding interaction record 3168.

The device profile 3165-*k* corresponds to a device 'k' associated with a connected home network (e.g., connected home network 202) such as a hub device 204, a connected doorbell 106, a client device 220, and the like. In some instances, the device profile 3165-*k* includes device settings 31651, associated devices information 31652, associated user information 31653, associated interaction information 31654, and environmental data 31655. In some instances, the device profile 3165-*k* includes only a subset of the above data. In some instances, the device profile 3165-*k* includes additional device information not shown such as information regarding whether the device 'k' is currently active.

The device settings 31651 include information regarding the current settings of device 'k' such as positioning information, mode of operation information, and the like. In some instances, the device settings 31651 are user-specific and are set by respective users of the device 'k'. The associated devices information 31652 includes information regarding other devices associated with device 'k' such as other devices linked to device i and/or other devices in the same connected home network as device 'k'. In some instances, the associated devices information 31652 includes a link, pointer, or reference to a respective device profile 3165 corresponding to the associated device.

The associated user information 31653 includes information regarding users associated with the device such as users receiving notifications or messages from the device, users registered with the device, users associated with the connected home network of the device, and the like. In some instances, the associated user information 31653 includes a link, pointer, or reference to a user profile 3163 corresponding to the associated user.

The associated interaction information 31654 includes information regarding interactions associated with the device 'k' such as historical interactions involving the device 'k'. In some instances, the associated interaction information 31654 includes a link, pointer, or reference to an interaction record 3168 corresponding to the associated interaction.

The environmental data 31655 includes information regarding the environment of device 'k' such as information regarding whether the device is outdoors or indoors, information regarding the light level of the environment, information regarding the amount of activity expected in the environment (e.g., information regarding whether the device is in a private residence versus a busy commercial property), information regarding environmental objects (e.g., depth mapping information for a camera), and the like.

Figure 8:
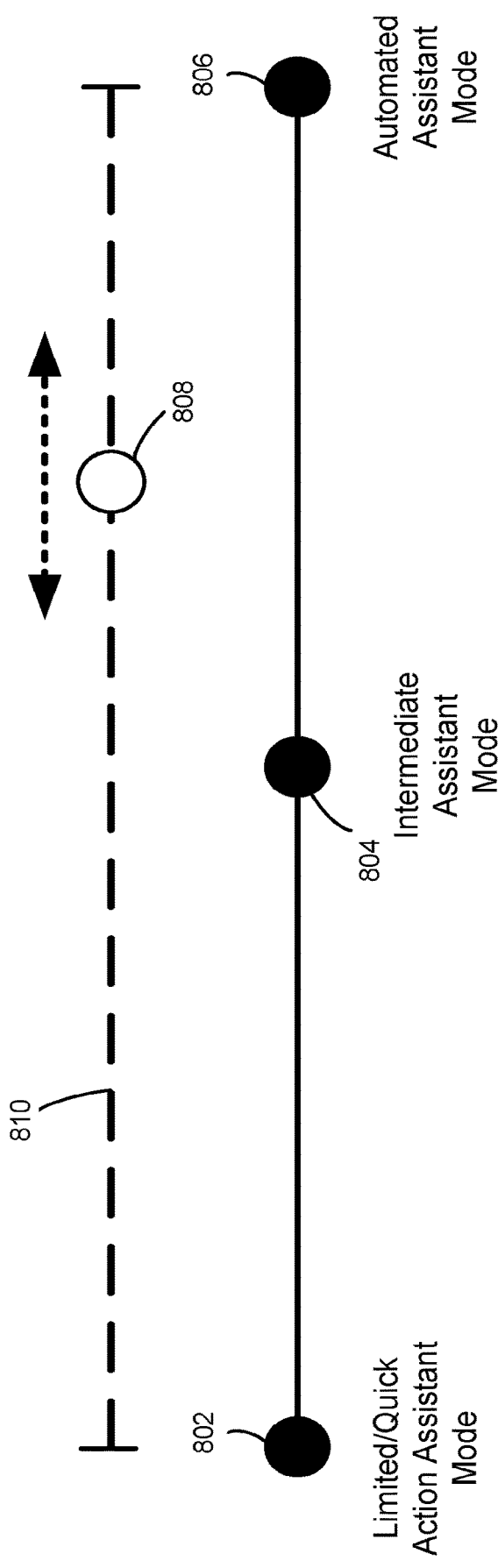
FIG. 8 illustrates personalization of the an assistant in accordance with some implementations.

The Assistant Personalization Settings 31656 includes information regarding the personalization of the assistant of device 'k' such as information regarding whether the device is to be in limited assistant mode, intermediate assistant mode, or automated assistant mode as described in FIG. 8.

The visitor group database 3169 corresponds to different visitor group classifications for visitors and/or person approaching the connected home and/or interacting with a connected device (e.g., connected doorbell 106). In some instances, the 3169 includes at least a known/expected person group 31691, a salesperson/solicitor group 31692, a deliveryman group 31693, an unknown/unexpected person group 31694, suspicious person/intruder group 31695, family/friends group 31696, user generated group 31697, and/or a learned groups 31698. The visitor group is determined for the person and/or visitor based on the identity of the person and/or context information as discussed herein.

The known/expected person group 31691 corresponds to persons and/or visitors that are known to a user, frequently visit the home environment, have a prescheduled meeting time (e.g., preprogrammed in the visitor interaction system and/or determined using one or more connected accounts or networks associated with the user). For example, the known/expected person group 31691 may include cleaning services, dog walkers, babysitters, landscapers, neighbors, scheduled appointments, etc.

The salesperson/solicitor group 31692 corresponds to persons and/or visitors that have products for sale, offering services, political solicitors, religious solicitors and/or variations thereof.

The deliveryman group 31693 corresponds to persons and/or delivering a package, wearing a uniform associated with a package delivery service, etc.

The unknown/unexpected person group 31694 corresponds to persons and/or visitors that are not known to a user (e.g., via user identified person's and/or a persons database 3180), has not visited the connected home environment in the past and/or visits the connected home environment infrequently, do not have a prescheduled meeting time, and/or other variations.

The suspicious person/intruder group 31695 corresponds to persons and/or visitors displaying and/or characterized with suspicious behaviors. Persons and/or visitors lingering, looking through the connected home environment, obscuring their facial features and/or other indicators may be an indicator an intruder or suspicious person.

The family/friends group 31696 corresponds to relatives and/or friends that are known and/or programmed by the user into the visitor interaction system.

The user generated group 31697 corresponds to any group generated by the user that the user would like to identify independently and apply specific rules to or response model for (as discussed below). The user can generate different groups for circumstances, identified people, situations, and/or services as well as the restrictions and/or authorization that the user group would have. For example, user may generate a group for all persons that visit the connected home past midnight and assign particular security responses to a response model.

The learned groups 31698 corresponds to visitor groups generated by the visitor interaction system for visitors and/or person that have consistent and frequent with the connected home environment and/or the user. The learned groups may be based on repeated and/or frequent visits, repeated responses by the user, corrections by the user to determined visitor groups and/or response provided by the user. The learned visitor groups are presented to the user before implemented to allow the user to edit (e.g., responses, classifications of person or visitors, authorization and/or permissions allowed the visitor or person) or delete the visitor group.

The response model database 3170-*h* corresponds to a response model 'h' corresponding to a determined visitor group of the visitor group database 3169. The response model database 3170-*h* is associated with responses to be provided by the connected device via an assistant (e.g., assistant of connected doorbell 106). In some instances, the response model database 3170-*h* includes greeting responses

31701, farewell responses 31702, inquiry responses 31703, wait/postponing responses 31704, visitor group responses 31705-*h*.

The greeting responses 31701 corresponds to initial greetings to a visitor that is present at the door. The greeting response may be "Hi! How could I help you?" "Hello! Welcome to the Smith residence," "Hello" and/or other variations of a greeting. In some implementations, the greeting response includes an inquiry response 31703. The greeting responses 31701 can be made before a visitor group for the visitor or person is determined.

The farewell responses 31702 corresponds to farewells ending the interaction. The farewell responses 31702 include any variation of "goodbye." If the visitor interaction system received a name and/or other information corresponding to the visitor, the information is used to personalize the farewell response (e.g., "Bye Tim!").

The inquiry responses 31703 correspond to responses a visitor interaction system would use to obtain or collect additional information of the visitor/person or the interaction. The inquiry responses 31703 can be made before a visitor group for the visitor or person is determined. For example, the inquiry response 31703 may be "How can I help you?" "Who could I contact for you?" "Who should I say is at the door?" etc. In some implementations, inquiry responses 31703 includes general inquiries such as "would you like to leave a message?"

The wait/postponing responses 31704 corresponds to responses made by the visitor interaction system to ask the visitor and/or person to wait while the user is notified. The wait/postponing responses 31704 may include providing a response to the visitor or person that the user is not able to come to the door at the moment after a predetermined amount of time has passed (e.g., 5 s, 15 s, 30 s, 1 min, 2 min, 5 min).

The visitor group responses 31705-*h* are associated with a respective response model corresponding to a visitor group in visitor group database 3169. The visitor group responses include responses appropriate for a visitor group in order to complete an interaction. For example, the deliveryman group 31693 will correspond to a deliveryman response model associated with deliveryman responses. The deliveryman response can include inquiries and/or directions as responses. For example, in some implementations, the deliveryman responses include "Could you place the package behind the fence?" "Do you need a signature?" "Could you drop off the package with the neighbor" "Could you come back at a later time?" "I will notify the user" etc. The deliveryman response are used to facilitate delivery of the package and each inquiry or response is based on the obtained data (e.g., video, audio, and/or context information).

As additional examples, a salesman response model may include responses for acquiring information for the salesperson, asking what products are for sale, placing an order, processing a payment (e.g., NFC, electronic money transfers, etc.), scheduling a meeting, notifying the salesperson the user is not interested, requesting the salesperson to leave a message, and/or other relevant responses for interacting with a salesman. An unknown/unexpected person response model may include responses for determining the identity of the person, the purpose and/or reason for the person's visit, a requests to leave a message and/or other relevant responses for interacting with a unknown/unexpected. A suspicious person/intruder response model may include responses for alerting the person that they have been detected and/or identified, contacting the police, securing the connected home environments, notifying the user and/or other relevant responses for interacting with a suspicious person/intruder. A known/expected person response model may include responses for unlocking the connected home environments, requesting who they are trying to contact, notify the user, the purpose and/or reason for the person's visit, a requests to leave a message and/or other relevant responses for interacting with a known/expected. The response model database 3170-*h* includes a corresponding response model and associated responses for each visitor group 3169. In particular, the response model database 3170-*h* includes a corresponding response model and associated responses for the known/expected person group 31691, the salesperson/solicitor group 31692, the deliveryman group 31693, the unknown/unexpected person group 31694, the suspicious person/intruder group 31695, the family/friends group 31696, the user generated group 31697, and/or the learned groups 31698.

The responses include communication-based responses or action-based responses; person-specific or responses or actions; location-specific response or actions (e.g., front door, backdoor, window, etc.); building-specific responses or actions; and/or user disposition-specific actions. The actions are performed by an assistant of the visitor interaction system, the visitor interaction system and/or connected device, the user, or a combination thereof.

A non-exhaustive list of responses include communication-based responses, such as providing a message regarding a status of the user; providing a message directing the visitor to perform an action; providing a message directing the visitor to leave a message; providing a preprogrammed customized message to the visitor; providing a user-composed text message to be converted to an audio message for the visitor; providing an audio message spoken by a synthesized voice to the visitor; and/or providing a visual message displayed on a screen to the visitor, action-based response, such as adjusting a security level of the connected home environment; locking or unlocking a door of the connected home environment; adjusting a brightness level of a light of the connected home environment; alerting law enforcement personnel; alerting a preselected contact of the user; recording an image or video of the visitor; and/or turning on an alarm of the connected home environment.

In some implementations, person-specific actions are selected based on a determined visitor group (e.g., known, unknown, expected, suspicious, intruder, deliveryman, salesperson, unexpected, etc.); a detected identity of the visitor; whether a visitor is expected when the motion event/interaction is identified; and/or other context information. In some implementations, a response or action (e.g., a communication-based response) performed by the visitor interaction system (e.g., an assistant) or a user selection of a communication-based response are received during a contemporaneous audio communication between the user, the assistant, and/or the visitor.

The characterization data 3184-*m* corresponds to a person 'm' detected by the connected home environment 100. In some implementations, characterization data for persons designated as strangers is deleted. In some implementations, characterization data for persons is only stored if the person affirmatively and knowingly consent to having their personally identifiable information stored. As shown in FIG. 3B, in accordance with some implementations, the characterization data 3184 includes an associated person identifier 31841, an associated image identifier 31842, quality information 31843, pose information 31844, timing information 31845, confidence information 31846, location information 31847, physical feature information 31848, and behavioral information 31849. In some implementations, the characterization data 3184 includes additional data not shown. In some implementations, the characterization data 3184 includes only a subset of the data shown.

The associated person identifier 31841 includes a label or other identifier for the person represented by the characterization data. In some implementations, the label is applied by a user upon review of the corresponding image. In some implementations, the identifier 31841 is assigned by the system in accordance with a determination that the characterization data 3184 matches, or is similar to, other characterization data associated with the identifier.

The associated image identifier 31842 identifies one or more images from which the characterization data 3184 was generated. In some implementations, there is a one-to-one mapping between the characterization data and the images, while in some other implementations, there is a many-to-one or one-to-many mapping. In some implementations, the associated image identifier 31842 includes a pointer or logical storage address for the one or more images.

The quality information 31843 includes a quality factor for the characterization data 3184. In some implementations, the quality factor is based on one or more of: a blurriness of the image, a resolution of the image, an amount of the person that is visible in the image, how many features of the person are visible in the image, and a distance between the person and the camera that captured the image.

The pose information 31844 identifies a pose of the detected person. In some implementations, the pose information 31844 includes information regarding an angle between the camera that captured the image and the detected person. In some implementations, the pose information 31844 includes information regarding a portion of the person's face that is visible in the image.

The timing information 31845 includes information regarding when the image was captured by the camera. In some implementations, the timing information 31845 indicates the time of day, the day, the month, the year, etc. that the image was captured. In some implementations, the characterization data 3184 includes operating information for the camera indicating the mode of operation and settings of the camera (e.g., indicating whether the camera was in a low-light mode when the image was captured). In some implementations, the timing information 31845 is used in conjunction with a device profile 3165 for the camera to determine operating information for the camera at the time the image was captured.

The confidence information 31846 indicates a confidence that the associated person identifier 31841 is accurate. In some implementations, the confidence information 31846 is based on a similarity between the characterization data 3184 and other characterization data for the associated person. In some implementations, the confidence information 31846 includes a confidence score for the characterization data 3184. In some implementations, in accordance with a determination that the confidence score is below a predetermined threshold, the association to the person is reevaluated and/or the characterization data 3184 and associated image is flagged as potentially having an incorrect associated person identifier 31841. In some implementations, flagged characterization data 3184 is presented to a user for confirmation or reclassification.

The location information 31847 includes information regarding a location for the image and/or the detected person. In some implementations, the location information 31847 indicates a location for the camera that captured the image. In some implementations, the location information 31847 identifies the camera that captured the image. In some implementations, the location information 31847 indicates a room or portion of the connected home environment that was captured in the image. In some implementations, the location information 31847 indicates a GPS or coordinates-based location for the image.

The physical feature information 31848 includes information regarding the physical features of the detected person. In some implementations, the physical feature information 31848 includes characterization of the person's physical features (e.g., nose, ears, eyes, and hair). In some implementations, the physical feature information 31848 includes information regarding the person's speech, gait, and/or posture. In some implementations, the physical feature information 31848 includes information regarding the person's dimensions, such as the distance between the person's eyes or ears, or the length of the person's arms or legs. In some implementations, the physical feature information 31848 includes information regarding of the person's age, gender, and/or ethnicity. In some implementations, the physical feature information 31848 includes information regarding the person's clothing and/or accessories (e.g., whether the person is wearing a hat, glass, gloves, and/or rings).

The behavioral information 31849 includes information regarding the behavior of the detected person. In some implementations, the behavioral information 31849 includes information regarding the detected person's mood and/or mannerisms.

Figure 4:
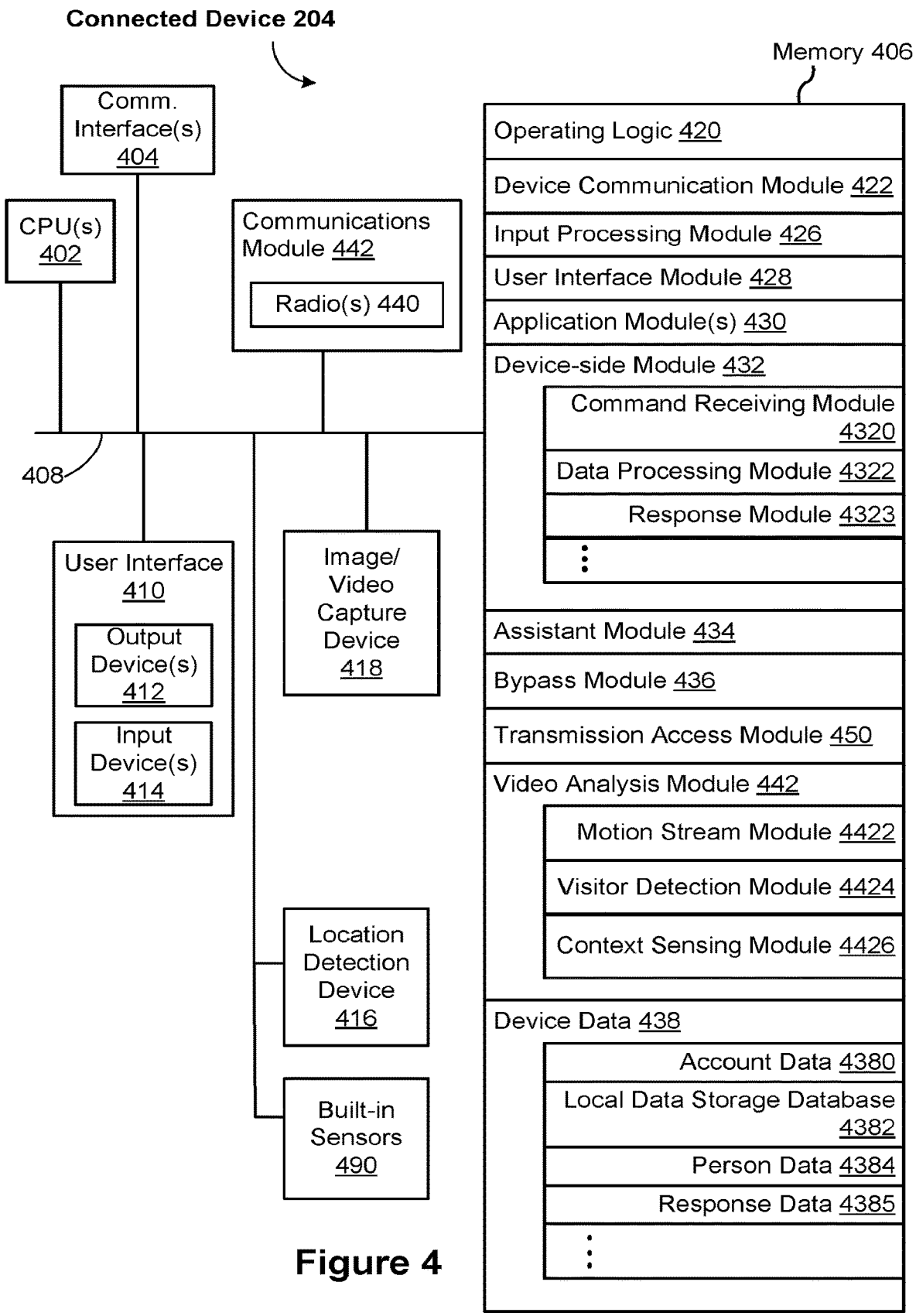
FIG. 4 is a block diagram illustrating a representative connected device in accordance with some implementations.

FIG. 4 is a block diagram illustrating a representative connected device 204 in accordance with some implementations. In some implementations, the connected device 204 (e.g., any devices of a connected home environment 100, FIG. 1) includes one or more processing units (e.g., CPUs, ASICs, FPGAs, microprocessors, and the like) 402, one or more communication interfaces 404, memory 406, communications module 442 with radios 440, and one or more communication buses 408 for interconnecting these components (sometimes called a chipset). In some implementations, the user interface 410 includes one or more output devices 412 that enable presentation of media content, including one or more speakers and/or one or more visual displays. In some implementations, the user interface 410 also includes one or more input devices 414, including user interface components that facilitate user input such as a keyboard, a mouse, a voice-command input unit or microphone, a touch screen display, a touch-sensitive input pad, a gesture capturing camera, a video camera, and/or other input buttons or controls. In some implementations, an input device 414 for a connected doorbell 106 is a tactile or touch-sensitive doorbell button. Furthermore, some connected devices 204 use a microphone and voice recognition or a camera and gesture recognition to supplement and/or replace the keyboard. In some implementations, the connected device 204 includes one or more image/video capture devices 418 (e.g., cameras, video cameras, scanners, photo sensor units).

The built-in sensors 490 include, for example, one or more thermal radiation sensors, ambient temperature sensors, humidity sensors, IR sensors, proximity sensors, range sensors, occupancy sensors (e.g., using RFID sensors), ambient light sensors, motion detectors, accelerometers, and/or gyroscopes.

The radios 440 enable one or more radio communication networks in the connected home environments, and allow a connected device 204 to communicate with other devices. In some implementations, the radios 440 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) custom or standard wired protocols (e.g., Ethernet, HomePlug, etc.), and/or any other suitable communication protocol, including communication protocols not yet developed as of the filing date of this document.

The communication interfaces 404 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 406, or alternatively the non-volatile memory within the memory 406, includes a non-transitory computer readable storage medium. In some implementations, the memory 406, or the non-transitory computer readable storage medium of the memory 406, stores the following programs, modules, and data structures, or a subset or superset thereof:

operating logic 420 including procedures for handling various basic system services and for performing hardware dependent tasks;

a device communication module 422 for connecting to and communicating with other network devices (e.g., network interface 160, such as a router that provides Internet connectivity, networked storage devices, network routing devices, server system 164, etc.) connected to one or more networks 162 via one or more communication interfaces 404 (wired or wireless);

an input processing module 426 for detecting one or more user inputs or interactions from the one or more input devices 414 and interpreting the detected inputs or interactions;

a user interface module 428 for providing and displaying a user interface in which settings, captured data, and/or other data for one or more devices (e.g., the connected device 204, and/or other devices in connected home environment 100) can be configured and/or viewed;

one or more applications 430 for execution by the connected device (e.g., games, social network applications, connected home applications, and/or other web or non-web based applications) for controlling devices (e.g., executing commands, sending commands, and/or configuring settings of the connected device 204 and/or other client/electronic devices), and for reviewing data captured by devices (e.g., device status and settings, captured data, or other information regarding the connected device 204 and/or other client/electronic devices);

a device-side module 432, which provides device-side functionalities for device control, data processing and data review, including but not limited to:

a command receiving module 4320 for receiving, forwarding, and/or executing instructions and control commands (e.g., from a client device 220, from a server system 164, from user inputs detected on the user interface 410, etc.) for operating the connected device 204;

a response module 4323 for providing responses to the server, the user, and/or the visitor, or receiving responses from the server, the user, and/or the visitor; and a data processing module 4322 for processing data captured or received by one or more inputs (e.g., input devices 414, image/video capture devices 418, location detection device 416), sensors (e.g., built-in sensors 490), interfaces (e.g., communication interfaces 404, radios 440), and/or other components of the connected device 204, and for preparing and sending processed data to a device for review (e.g., client devices 220 for review by a user);

an assistant module 434 for processing (characterizing, identifying, and/or recognizing) interactions between the visitor and the connected device (e.g., connected doorbell 106), collecting additional context information from the visitor, providing response to the visitor (e.g., based on audio, video, context information, and/or response models), responding to the visitor; and/or enabling communication and/or interactions between the user and the visitor;

a bypass module 436 for detecting whether radio(s) 440 are transmitting signals via respective antennas coupled to the radio(s) 440 and to accordingly couple radio(s) 440 to their respective antennas either via a bypass line or an amplifier (e.g., a low noise amplifier);

a transmission access module 450 for granting or denying transmission access to one or more radio(s) 440 (e.g., based on detected control signals and transmission requests);

a video analysis module 442 for analyzing captured video data, e.g., to detect and/or recognize approaching visitors and context information, including but not limited to:

a motion stream module 4422 for detecting motion events/interactions in the video data;

a visitor detection module 4424 for detecting an approaching visitor from the motion events/interactions (e.g., for distinguishing motion corresponding to a person approaching an entryway from other types of motion); and a context sensing module 4426 for sensing context data regarding the approaching visitor, e.g., based on behavioral characteristics and timing; and device data 438 storing data associated with devices (e.g., the connected device 204), including, but is not limited to:

account data 4380 storing information related to user accounts loaded on the connected device 204, wherein such information includes cached login credentials, connected device identifiers (e.g., MAC addresses and UUIDs), user interface settings, display preferences, authentication tokens and tags, password keys, etc.;

local data storage database 4382 for selectively storing raw or processed data associated with the connected device 204 (e.g., video surveillance footage captured by a connected doorbell 106);

person data 4384 storing information related to detected persons and other entities, such as characterization information (e.g., characterization information 3184) and associated images; and response data 4385 storing basic response models or responses to provide to detected persons.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 406, optionally, stores a subset of the modules and data structures identified above. Furthermore, the memory 406, optionally, stores additional modules and data structures not described above.

Figure 5:
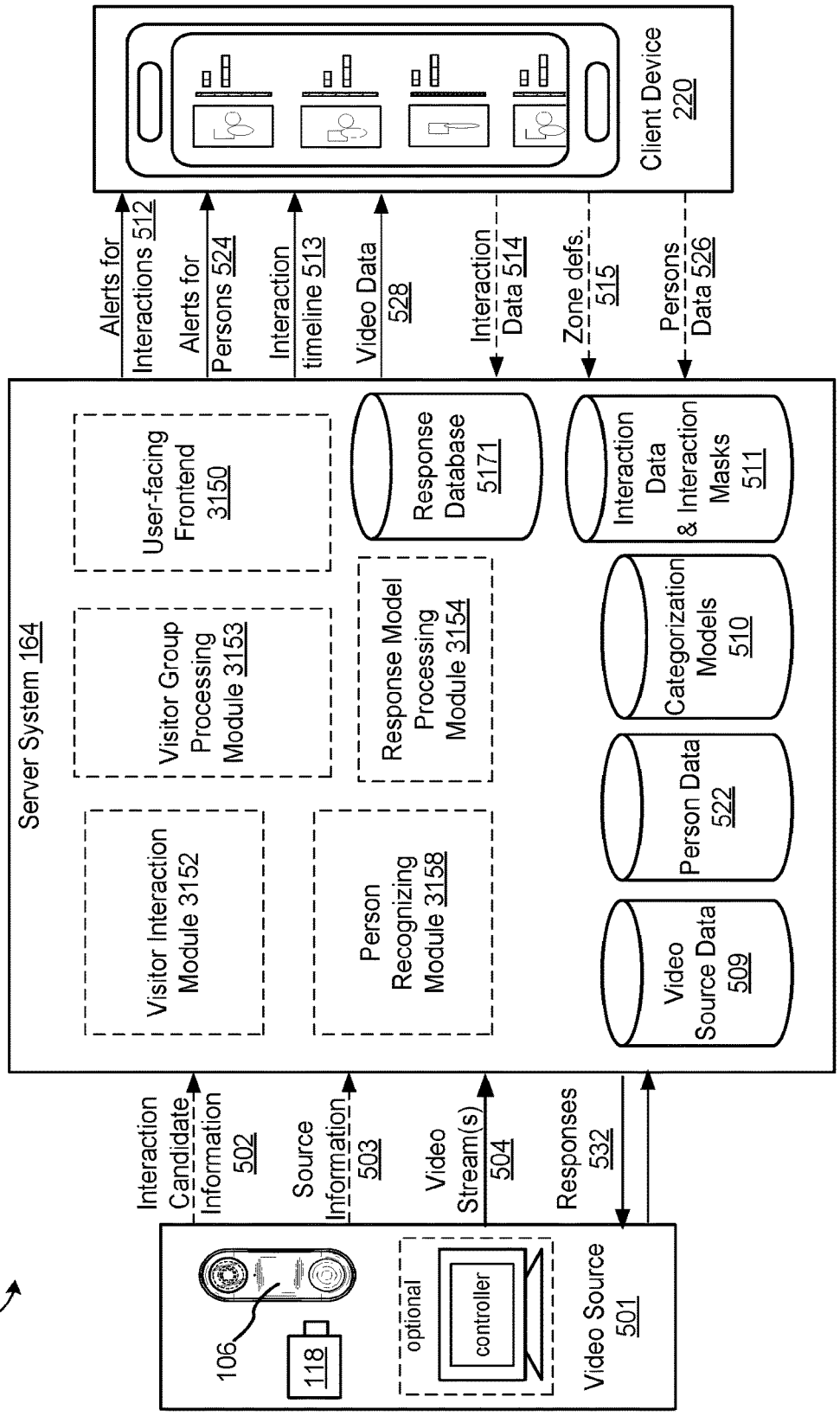
FIG. 5 illustrates representative system architecture for video analysis and classification in accordance with some implementations.

FIG. 5 illustrates a representative system architecture 500. In some implementations, the server system 164 includes functional modules for a visitor interaction module 3152, a visitor group processing module 3153, a person recognizer 3158, a response processor 3154, and a user-facing frontend 3150. The visitor interaction module 3152 obtains the interaction candidates (e.g., by processing the video stream(s) 504 or by receiving interaction start information from the video source 501, or by detecting a user press on a doorbell button of a doorbell camera). In some implementations, the interaction candidates include motion event/interaction candidates. In some implementations, the interaction candidates include a user press on a doorbell button of a doorbell camera. In some implementations, the interaction candidates include audio, electromagnetic, olfactory, and/or visual aspects. In some implementations, the interaction candidates include motion events/interactions, approach detections, and announcement detections. The visitor group processing module 3153 categorizes the interaction candidates into different interaction categories and/or classifications (e.g., based on data from the visitor interaction module 3152, person recognizer, and/or categorization models 510).

The user-facing frontend 3150 generates interaction alerts, messages, and/or notifications, and provides responses determined by response model processing module 3154. The response model processing module 3154 determines the response model and/or responses based on an interaction classified by the visitor group processing module 3153 and/or response database 5171. The user-facing frontend 3150 provides responses to persons and/or detected interactions without user intervention. Additionally, the user-facing frontend 3150 facilitates review of the detected entities and interactions, as well as responses from a response model by a reviewer through a review interface on a client device 220. The user-facing frontend 3150 also receives user edits on the interaction and person categories, user preferences for alerts and interaction filters, zone definitions for zones of interest, responses from a response model, and the like. The visitor group processing module 3153 optionally revises interaction classification models and results based on the user edits received by the user-facing frontend 3150. The person recognizer 3158 optionally revises a person's classifications and/or labels based on the user edits received by the user-facing frontend 3150. The response model processing module 3154 uses obtained video, audio, and/or determined context information to select a response model or response. The response model processing module 3154 modifies response models, selected responses from a response model, or selected response models based on the interaction classification, obtained video, audio, and/or determined context information. Additionally, the response model processing module 3154 modifies the response models and/or the selected responses based on the user edits received by the user-facing frontend, previous user selection of responses, repeated responses under similar situations, user preferences (e.g., granting or denying one or more responses such as unlocking a door without user selection), and accuracy of the responses over time (e.g., responses that did not require user edits).

The server system 164 also includes a video source data database 509, person data 522, categorization models database 510, response database 5171, and interaction data and interaction masks database 511. In some implementations, the person data 522 includes a persons database 3180. In some implementations, person data 522 is preferably stored at a local device of the visitor interaction system such as the connected doorbell 106. In some implementations, each of these databases is part of the server database 316 (e.g., part of data storage database 3160). The interaction categorization models 510 includes characterization data 3184-$m$ in FIG. 3B. The interaction categorization models 510 further includes classifications for visitors (e.g., visitor group classifications). The visitors groups include persons that are known, unknown, expected, unexpected, salespersons and/or solicitors, delivery persons, intruders or other suspicious entities, user generated visitor groups, learned visitor groups (e.g. learned over time and classifications of entities over time).

The response database 5171 includes response models corresponding to the determined interaction categories (e.g., detected and classified interactions and/or entities). The different response models include responses (also referred to as response messages, response actions, or actions) that are provided to the detected interaction (e.g., classified interaction/person) in various situations with or without user selection and/or interaction (as specified by the user preferences). The responses corresponding to a response model are based on a user's pervious interactions and/or user behavior learned over time, based on context information (determined from processing the video stream(s) 504 and/or received from the video source 501), based on user information available via the cloud and/or other connected network, based on user settings, and/or preprogrammed.

For example, a response model corresponding to a deliveryman includes one or more instruction for securely dropping off a package (either defined by the user or based on repeated user behavior/action), scheduling a delivery time, requesting the deliveryman to come at another time, digitally signing, requesting additional information from the deliveryman to expedite the delivery, and/or any other responses related to the delivery of the package and the context. In another example, a response model corresponding to a salesperson group will include responses for scheduling a meeting or appointment, completing a transaction (if authorized by the user), sending the salesperson away, and/or other responses related to the salesperson or the context. Response models for unknown or unexpected persons will include responses for identifying the person, identifying the purpose for their visit, acquiring a name, requesting that the person come back another time, recording a message, and/or obtaining other information that would be useful to the user. A response model corresponding to a suspicious person would include responses for identifying the individual, warning the individual, informing the police, locking the connected home environment 100, notifying nearby neighbors or emergency contacts, and/or other responses to secure the user and their home. A response model corresponding to a known or expected person would include responses for granting access to the residence, interacting with the individual until the user can respond, forwarding a message, and/or a number of different actions. Additional examples of response are models provided above in FIG. 3B.

As described herein, the response models are based on the visitor, their identification, and the context. The responses available are determined based on the visitor, their identification, and the context as well as user preference, past user actions and/or learned behavior. In some implementations, the responses of the response model and/or the response models are modified by the user or through artificial intelligence. The number of responses available are numerous and are appropriately selected based on the detected interaction, context information, and/or person. For example, the response model and/or responses are updated and/or modified based on repeated interactions of the visitor interaction system, responses or actions selected by the user, approved responses by the user, rejected responses by the user, repeated actions taken by the user for one or more persons identified and/or with similar collected context information.

The server system 164 receives one or more video stream (s) 504 from the video source 501 (e.g., a video source 222 from FIG. 2B) and optionally receives interaction candidate information 502, such as preliminary characterization information for detected entities and interactions (e.g., person and interaction metadata from processing performed at the connected doorbell 106), and source information 503 such as device settings for a connected doorbell 106 (e.g., a device profile 3165 for connected doorbell 106). In some implementations, the visitor interaction module 3152 communicates with the video source 501, e.g., to request additional images such as high definition images or metadata for the video stream(s) 504. The server system 164 sends alerts for interactions 512, alerts for detected persons 524, interaction timeline information 513, and/or video data 528 (e.g., video clips corresponding to the detected persons and/or interactions) to the client device 220. Additionally, the server system 164 sends and receives responses 532 (e.g., corresponding to a response mode) to the connected device (e.g., connected doorbell 106) to interact and/or communicate with a detected person and/or interaction. The server system 164 receives the responses and uses them with visitor interaction module 3152 and visitor group processing module 3153 to classify, identify, or interact with the detected person and/or interaction. In some implementations, the server system 164 provides responses 532 the client device 220 via alerts for interactions 512 and/or alerts for detected persons 524. In some implementations, alerts for interactions 512 distinguish visitor approach interactions from other types of motion events/interactions. In some implementations, alerts for interactions 512 distinguish motion events/interactions captured at a connected doorbell 106 from motion events/interactions captured by other connected devices (e.g., cameras 118). The server system 164 optionally receives user information from the client device 220, such as interaction information 514 (e.g., edits to interaction categories), and zone definitions 515, and persons data 526 (e.g., classification of detected persons).

A data processing pipeline processes video information (e.g., a live video feed) received from a video source 501 (e.g., including connected doorbell 106 and an optional controller device) and/or audio information received from one or more connected devices in real-time (e.g., within 10 seconds, 30 seconds, or 2 minutes) to identify and categorize interactions occurring in the connected home environment 100. The server system 164 provides real-time responses and interactions (e.g., via connected doorbell 106) to the identified and classified interactions and/or entities. The server system 164 sends response and/or interaction transaction history to a client device 220 (e.g., including actions for user selection). The server system 164 also sends real-time interaction alerts (e.g., within 10 seconds, 20 seconds, or 30 seconds) and/or a refreshed interaction timeline (e.g., within 30 seconds, 1 minute, or 3 minutes) to a client device 220. The client device 220 is associated with a reviewer account for the connected home environment 100. The data processing pipeline also processes stored information (such as stored video feeds from a video source 501) to reevaluate and/or re-categorize interactions as necessary and/or update the response models, such as when new information is obtained regarding the interaction and/or when new information is obtained regarding interaction categories (e.g., a new activity zone is obtained from the user).

After video and/or audio data is captured at a connected device, the data is processed to determine if any potential interaction candidates or persons are present. In some implementations, the data is initially processed at the connected device (e.g., video source 501, camera 118, or connected doorbell 106). Thus, in some implementations, the connected device sends interaction candidate information, such as interaction start information, to the server system 164. In some implementations, the data is initially processed to determine a response model corresponding to the potential interaction candidates or persons. In some implementations, the data is processed at the server system 164 for interaction start detection. In some implementations, the video and/or audio data is stored on server system 164 (e.g., in video and source data database 509). In some implementations, the video stream is stored on a server distinct from server system 164. In some implementations, after a motion start is detected, the relevant portion of the video stream is retrieved from storage (e.g., from video and source data database 509). Alternatively and/or additionally, in some embodiments, the connected device (e.g., video source 501, camera 118, or connected doorbell 106) provides an initial response (e.g., a greeting) corresponding to a response model to the potential interaction candidate or persons while information is sent to the server system 164.

In some implementations, the interaction identification process includes segmenting the video stream into multiple segments then categorizing the interaction candidate within each segment. In some implementations, categorizing the interaction candidate includes an aggregation of background factors, person detection and identification, motion vector generation for each motion person, person features, and scene features to generate motion features for the interaction candidate. In some implementations, the interaction identification process further includes categorizing each segment, generating or updating an interaction log based on classification of a segment, generating an alert for the interaction based on classification of a segment, categorizing the complete interaction, updating the interaction log based on the complete interaction, and generating an alert for the interaction based on the complete interaction. In some implementations, a classification is based on a determination that the interaction occurred within a particular zone of interest. In some implementations, a classification is based on a determination that the interaction candidate involves one or more zones of interest. In some implementations, a classification is based on audio data and/or audio interaction characterization.

The interaction analysis and classification process may be performed by the connected device (e.g., the video source 501) and the server system 164 cooperatively, and the division of the tasks may vary in different implementations, for different equipment capability configurations, and/or for different network and server load situations. After the server system 164 categorizes or classifies the interaction candidate, the result of the interaction detection and classification may be sent to a review associated with the connected home environment. Similarly, the response model and/or a response may be determined by the connected device (e.g., the video source 501) and the server system 164 cooperatively, and the division of the tasks may vary in different implementations, for different equipment capability configurations, and/or for different network and server load situations. After the server system 164 determines a response (e.g., message or an action corresponding to a response model), the response may be sent to the connected device (e.g., connected doorbell 106) to interact and/or communicate with the detected interactions and/or entities, as well as a reviewer associated with the connected home environment. In some implementations, the response may be sent to the connected device to interact and/or communicate with the detected interactions and/or entities. Alternatively, in other implementations, the reviewer will request authorization or selection of the response before it is sent to the detected interactions and/or entities via a connected device.

In some implementations, the server system 164 stores raw or compressed video data (e.g., in a video source data database 509), interaction classification models (e.g., in an interaction classification model database 510), and interaction masks and other interaction metadata (e.g., in an interaction data and interaction mask database 511) for each of the video sources 501. In some implementations, the video data is stored at one or more display resolutions such as 480p, 780p, 1080i, 1080p, and the like.

In some implementations, the server system 164 stores provided responses (e.g., corresponding to a response model) for each detected interactions and/or entities that has been classified. In some implementations, the provided responses are stored and used to modify a response model and/or the responses over time. For example, the stored response are used to determine if a user agreed with the provided response, the user edited the provided response, the user selected a response belonging to a different response model, consistency in provided responses, outlier responses, etc. The stored response are used in conjunction with an artificial intelligence system or adaptive learning model such that the response models and/or the associated response are updated/modified. In this way, server system 164 is able to learn a user's behavior and/or response history and adjust the response models and responses to classified interactions and/or entities accordingly.

In some implementations, the video source 501 (e.g., the connected doorbell 106) transmits a live video feed to the remote server system 164 via one or more networks (e.g., the network(s) 162). In some implementations, the transmission of the video data is continuous as the video data is captured by the connected doorbell 106. In some implementations, the transmission of video data is irrespective of the content of the video data, and the video data is uploaded from the video source 501 to the server system 164 for storage irrespective of whether any motion event/interaction has been captured in the video data. In some implementations, the video data may be stored at a local storage device of the video source 501 by default, and only video portions corresponding to motion event/interaction candidates detected in the video stream are uploaded to the server system 164 (e.g., in real-time).

In some implementations, the video source 501 dynamically determines at what display resolution the video stream is to be uploaded to the server system 164. In some implementations, the video source 501 dynamically determines which parts of the video stream are to be uploaded to the server system 164. For example, in some implementations, depending on the current server load and network conditions, the video source 501 optionally prioritizes the uploading of video portions corresponding to newly detected motion event/interaction candidates ahead of other portions of the video stream that do not contain any motion event/interaction candidates; or the video source 501 uploads the video portions corresponding to newly detected motion event/interaction candidates at higher display resolutions than the other portions of the video stream. This upload prioritization helps to ensure that important motion events/interactions are detected and alerted to the reviewer in real-time, even when the network conditions and server load are less than optimal. In some implementations, the video source 501 implements two parallel upload connections, one for uploading the continuous video stream captured by the connected doorbell 106, and the other for uploading video portions corresponding to detected motion event/interaction candidates. At any given time, the video source 501 determines whether the uploading of the continuous video stream needs to be suspended temporarily to ensure that sufficient bandwidth is given to the uploading of the video segments corresponding to newly detected motion event/interaction candidates.

In some implementations, the video stream uploaded for cloud storage is at a lower quality (e.g., lower resolution, lower frame rate, higher compression, etc.) than the video segments uploaded for motion event/interaction processing.

As shown in FIG. 5, the video source 501 includes a connected doorbell 106 (which includes an image sensor), and an optional controller device. In some implementations, the connected doorbell 106 includes sufficient on-board processing power to perform all necessary local video processing tasks (e.g., cue point detection for motion event/interaction candidates, video uploading prioritization, network connection management, etc.), and the connected doorbell 106 communicates with the server system 164 directly, without any controller device acting as an intermediary. In some implementations, the connected doorbell 106 captures the video data and sends the video data to the controller device for the necessary local video processing tasks. The controller device optionally performs the local processing tasks for multiple cameras. For example, there may be multiple cameras in one connected home environment (e.g., the connected home environment 100, FIG. 1), and a single controller device receives the video data from each camera and processes the video data to detect motion event/interaction candidates in the video stream from each camera. The controller device is responsible for allocating sufficient outgoing network bandwidth to transmitting video segments containing motion event/interaction candidates from each camera to the server before using the remaining bandwidth to transmit the video stream from each camera to the server system 164. In some implementations, the continuous video stream is sent and stored at one server facility while the video segments containing motion event/interaction candidates are send to and processed at a different server facility.

In some implementations, the source information 503 may include additional information such as a device state (e.g., IR mode, automatic exposure (AE) mode, digital pan tilt zoom (DPTZ) settings, etc.) and/or information regarding the environment in which the device is located (e.g., indoors, outdoors, night-time, day-time, etc.). In some implementations, the source information 503 is used by the server system 164 to perform interaction detection, person recognition, and/or to categorize interaction candidates. In some implementations, the additional source information 503 includes one or more preliminary results from video processing performed by the connected doorbell 106 (e.g., classifications, object/person recognitions, motion masks, etc.).

In some implementations, the video portion after an interaction start incident is detected is divided into multiple segments. In some implementations, the segmentation continues until interaction end information (sometimes also called an "end-of-interaction signal") is obtained. In some implementations, the segmentation occurs within the server system 164 (e.g., by the visitor interaction module 3152). In some implementations, the segmentation includes generating overlapping segments. For example, a 10-second segment is generated every second, such that a new segment overlaps the prior segment by 9 seconds.

In some implementations, each of the multiple segments is of the same or similar duration (e.g., each segment has a 10-12 second duration). In some implementations, the first segment has a shorter duration than the subsequent segments. Keeping the first segment short allows for real-time initial classification and alerts based on processing the first segment. The initial classification may then be revised based on processing of subsequent segments. In some implementations, a new segment is generated if the motion person enters a new zone of interest.

In some implementations, after the interaction processor module obtains the video portion corresponding to an interaction candidate, the visitor interaction module 3152 obtains background factors and performs motion person detection identification, motion vector generation for each motion person, and feature identification. Once the visitor interaction module 3152 completes these tasks, the visitor group processing module 3153 aggregates all of the information and generates a classification for the motion event/interaction candidate. In some implementations, the visitor interaction module 3152 and the visitor group processing module 3153 are components of the data processing module 3144. In some implementations, false positive suppression is optionally performed to reject some motion event/interaction candidates before the motion event/interaction candidates are submitted for interaction classification. In some implementations, determining whether a motion event/interaction candidate is a false positive includes determining whether the motion event/interaction candidate occurred in a particular zone. In some implementations, determining whether a motion event/interaction candidate is a false positive includes analyzing an importance score for the motion event/interaction candidate. The importance score for a motion events/interaction candidate is optionally based on zones of interest involved with the motion event/interaction candidate, background features, motion vectors, scene features, person features, motion features, motion tracks, and the like.

The response model processing module 3154 identifies a response model for the classified interaction or person. The response model includes one or more responses appropriate for the classified interaction and/or person (e.g., visitor group classification). The response model processing module 3154 further determines responses from the response model based on context information and additional information as discussed below. In some embodiments, responses of the response model are selected using artificial intelligence or adaptive learning. For example, the response may be selected based on previous responses of a response model for a classified interaction, changes to the response made by the user, confirmation of the response by the user, the surrounding context information of the interaction, etc. In some embodiments, artificial intelligence or adaptive updates the classification criteria (e.g., context information) for selecting a response model. In some implementations, subsequent responses are determined using the previous response as well as the response received by the classified person or interaction. In some implementations, the responses are based on user information and/or preferences.

In some instances, the responses are based on user information available from cloud services and/or user accounts connected to the server. For example, the responses may be based on user information retrieved from cloud networks, user accounts, and/or other networks connected the server. In other implementations, the responses are based on user settings and/or preprogrammed (e.g., either by the user or as part of the server). Additionally, the visitor interaction system is configured to prevent the access to or the distribution of information corresponding to connected device, identification of individuals in the household, the location of the individuals, connected accounts (e.g., email accounts, cloud networks, etc.), access to accounts or devices, confidential information, and/or other personal information of the user. Specifically, the visitor interaction system prevents unknown or unauthorized individuals from using or accessing the connected home environment. Specific access to certain information requires permission from the user.

In some implementations, the video source 501 has sufficient processing capabilities to perform, and does perform, person detection, person recognition, background estimation, motion person identification, the motion vector generation, and/or the feature identification. Similarly, in some embodiments, the video source 501 has sufficient processing capabilities to perform, and does perform, response model identification and/or initial responses (e.g., greeting).

FIG. 6 is a block diagram illustrating a representative client device 220 associated with a user account in accordance with some implementations. The client device 220, typically, includes one or more processing units (CPUs) 602, one or more network interfaces 604, memory 606, and one or more communication buses 608 for interconnecting these components (sometimes called a chipset). Optionally, the client device also includes a user interface 610 and one or more built-in sensors 690 (e.g., accelerometer and gyroscope). The user interface 610 includes one or more output devices 612 that enable presentation of media content, including one or more speakers and/or one or more visual displays. The user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 616, such as a GPS (global positioning satellite) or other geo-location receiver, for determining the location of the client device.

The memory 606 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from one or more processing units 602. The memory 606, or alternatively the non-volatile memory within the memory 606, includes a non-transitory computer readable storage medium. In some implementations, the memory 606, or the non-transitory computer readable storage medium of the memory 606, stores the following programs, modules, and data structures, or a subset or superset thereof:

- an operating system 618 including procedures for handling various basic system services and for performing hardware dependent tasks;
- a network communication module 620 for connecting the client device 220 to other systems and devices (e.g., client devices, electronic devices, and systems connected to one or more networks 162) via one or more network interfaces 604 (wired or wireless);
- an input processing module 622 for detecting one or more user inputs or interactions from one of the one or more input devices 614 and interpreting the detected input or interaction;
- one or more applications 624 for execution by the client device (e.g., games, social network applications, SMS and/or other messaging applications, connected home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);
- a user interface module 626 for providing and displaying a user interface in which settings, captured data, and/or other data for one or more devices (e.g., connected devices 204 in connected home environment 100) can be configured and/or viewed;
- a client-side module 628, which provides client-side functionalities for device control, data processing and data review, including but not limited to:
    - a hub device and device control module 6280 for generating control commands for modifying an operating mode of the hub device or the electronic devices in accordance with user inputs;
    - a video analysis module 6281 for analyzing captured video data, e.g., to detect and/or recognize persons, objects, animals, and interactions, such as described previously with respect to video analysis module 442;
    - a data review module 6282 for providing user interfaces for reviewing data processed by the server system 164, including but not limited to:
        - an interaction review submodule 6283 for reviewing interactions (e.g., motion and/or audio interactions), and optionally enabling user edits and/or updates to the interactions;
        - a persons review submodule 6284 for reviewing data and/or images regarding detected persons and other entities, and optionally enabling user edits and/or updates to the persons data; and
        - a response review submodule 6285 for reviewing data, response models, and/or responses provided for detected interactions, persons and other entities, context information, classified visitor group; and optionally enabling user edits and/or updates to the responses;
    - a response and/or action presentation module 6286 for providing a subset of responses and actions identified by the server system 164; and
    - a remote interaction module 6287 for interacting with a remote person (e.g., a visitor to the connected home environment 100), e.g., via a connected doorbell 106 and/or the server system 164; and
- client data 630 storing data associated with the user account and electronic devices, including, but not limited to:
    - account data 6300 storing information related to both user accounts loaded on the client device and electronic devices (e.g., of the video sources 501) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
    - a local data storage database 6302 for selectively storing raw or processed data associated with electronic devices (e.g., of the video sources 501, such as a connected doorbell 106), optionally including person data such as the person data 4384 described previously.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, the memory 606, optionally, stores a subset of the modules and data structures identified above. Furthermore, the memory 606, optionally, stores additional modules and data structures not described above.

Figure 7:
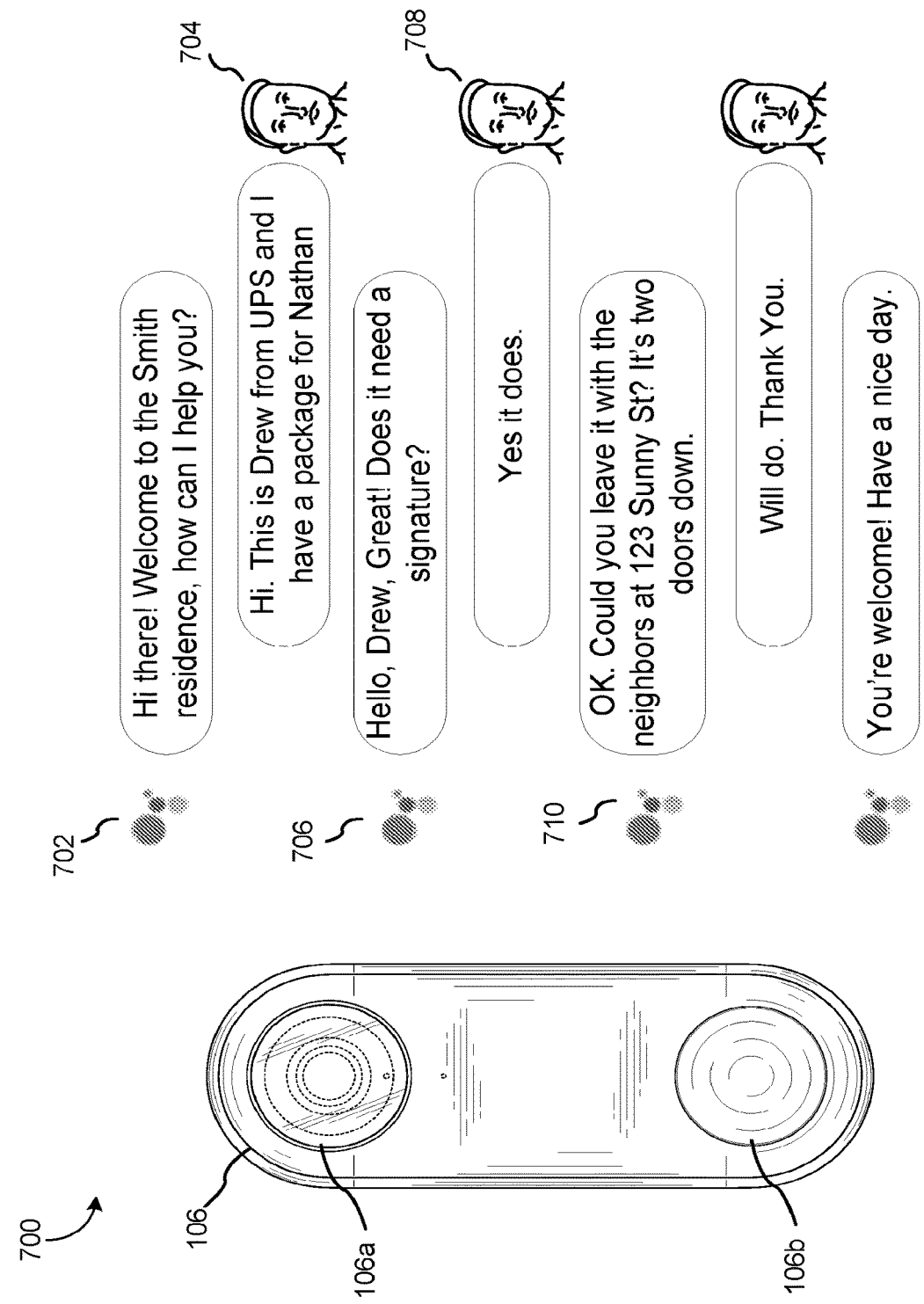
FIG. 7 illustrates an example interaction of the visitor interaction system via an assistant in accordance with some implementations.

FIG. 7 illustrates an example interaction of the visitor interaction system via an assistant in accordance with some implementations. Visitor interaction 700 shows connected doorbell 106 interacting with a person via the assistant without any user interaction. In some implementation, the assistant of the connected doorbell 106 initiates a communication with a person after identifying the approach of the person (e.g., via camera 106*a* of the connected doorbell 106). In some implementations, connected doorbell 106 provides an initial greeting response 702 (e.g., "Hi there! Welcome to the Smith residence, how can I help you?") via the assistant of the connected doorbell 106 (e.g., via speaker 160*b* of the connected doorbell 106). In some implementations, the assistant of the connected doorbell 106 provides responses corresponding to a response model corresponding to a visitor group determined for the person by the visitor interaction system. The visitor group is determined by the visitor interaction system using obtained video data or approach data, as described further below. Alternatively and/or additionally, in some implementations, the visitor interaction system uses a reply from the person as additional context information in determining a visitor group for the person. For example, in some implementations, the person provides a first reply 704 (e.g., "Hi. This is Drew from UPS and I have a package for Nathan"), that is used by the visitor interaction system to determine the visitor group for the person and the corresponding response model (e.g., deliveryman group).

In some implementations, the assistant of the connected doorbell 106 continues to interact with the person by providing additional responses. In some implementations, the additional responses are associated with the response model corresponding to the deliveryman group as determined by the visitor interaction system. In some implementations, the additional responses provided by the assistant of the connected doorbell 106 are determined using the person's replies (e.g., first reply 704) as context information. For example, person's first reply 704 identifying himself as a deliveryman with a package for a user of the visitor interaction system is used as context information to provide a follow up response 706 (e.g., "Hello, Drew, Great! Does it need a signature?"). The visitor interaction system uses the person's replies to determine the additional responses that are needed to complete the interaction. In some implementations, the visitor interaction system provides instructions preprogrammed by the user and/or responses that are determined to be appropriate by the visitor interaction system (e.g., responses determined by user preferences, response based on context information, response learned over time by user provided response, etc.). For example, after the person provides a second reply 708 (e.g., "Yes it does.") confirming that a signature is needed, the visitor interaction system provides to the person, via the assistant of the connected doorbell 106, response instructions 710 (e.g., "OK. Could you leave it with the neighbors at 123 Sunny St? It's two doors down.") to facilitate delivery of the package. The visitor interaction system uses the information available (e.g., obtained via video, context information, connected accounts, connected networks, etc.) to interact with a variety of different visitors to facilitate the user's needs. In this way, a user does not need to be available and is not required to provide input when a person visits the connected home.

In some implementations, the visitor interaction system is connected to any living space, commercial property, and/or work space, as described above in FIG. 1. The visitor interaction system interacts with any number of people who are known or unknown to the system via the assistant of the interface devices 106 (e.g., connected doorbell 106). In some implementations, the response models for the determined visitor group are specific to the building and/or type of entity that the visitor interaction system is connected to. For example, a visitor interaction system connected to a commercial property, such as a retail store, a company office building, etc., may use the assistant as receptionist and interact with visitors based on the determined response model for the visitors. Based on the context information and other collected data, the assistant may provide the visitor with appropriate information or perform appropriate actions such as informing the visitor of business hours if the business is currently closed, provide directions to the visitor for similar stores in the area and their business hours, answer any of the questions related to the business the visitor has; alert law enforcement of visitors determined to be suspicious, unlock doors for known persons of the retail store (e.g., store managers opening the retail store for business), and/or any number of appropriate responses as described herein.

FIG. 8 illustrates personalization of the connected doorbell assistant in accordance with some implementations. In some implementations, a user personalizes the level of interaction that the assistant of the connected doorbell 106 may have with a person or visitor. In some implementations, the assistant of the connected doorbell 106 includes a limited assistant mode 802, an intermediate assistant mode 804, and an automated assistant mode 806. In some implementations, a user sets the assistant personalization by moving an affordance (e.g., "assistant personalization" affordance 808) to a desired mode. In some implementations, the "assistant personalization" affordance 808 moves along a sliding scale 810. In some implementations, in limited assistant mode 802, the assistant of the connected doorbell 106 interacts with a person as identified in U.S. application Ser. No. 15/809,900 and as described briefly below in FIG. 11B. In limited assistant mode 802, the assistant may not interact with the person (with the exception of a greeting response) unless a user provides permission and/or authorizes the assistant to interact with the person. In some implementations, the user is provided a notification/message after an approach is identified (e.g., person approaching connected home) via client device 220. The user may provide permission and/or authorization to the assistant of the connected doorbell 106 via the client device 220. In some implementations, a user provides permission by selecting from responses corresponding to a response model corresponding to the visitor group determined for the person (as described below) or the user may provide their own responses. The assistant of the connected doorbell 106 interacts with the person in accordance to the response provided by the user. Additionally or alternatively, in some implementations, the limited assistant is allowed to ask if a person would like to leave a message (e.g., without user permission). In some implementations, the messages are transcribed (e.g., speech-to-text) and provided to the user for review. In other implementations, the user is provided a video and/or audio of the message and/or the collected approach data of the person.

In some implementations, the intermediate assistant mode 804 interacts with a person semi-autonomously. In some implementations, in intermediate assistant mode 804, the assistant of the connected doorbell 106 interacts with the person until a user is able to take over the interaction. For example, the assistant of the connected doorbell 106 interacts with the person by providing a greeting message and additional responses (e.g., based on a response model corresponding to the determined visitor group for the person) while at the same time a sending a notification/message of the interaction to the user via a client device 220. In some embodiments, the visitor interaction system in intermediate assistant mode 804 uses the additional responses provided by the assistant of the connected doorbell 106 to obtain context information or additional details to provide a user to perform or complete the interaction. In some implementations, a reply from the person may prompt the assistant to provide another notification/message to the user with a specific request. For example, a person's reply may be a request to speak to user or if the user is available. In the intermediate assistant mode 804 the visitor interaction system provides the user another notification/message with additional details as provided by the person. If no response is provided by the user or the user is unable to take over the interaction, the assistant of the connected doorbell 106 provides a response to the person that user is unavailable. In some implementations, the response that user is unavailable is based on the response model corresponding to the determined visitor group for the person. Alternatively or additionally, if the user is able to take over the interaction, the visitor interaction module enables the user to interact with the person via text-to-speech, 2-way talk, and/or by selecting from responses corresponding to a response model for the visitor group determined for the person. Examples of the intermediate assistant mode 804 are provided below in FIGS. 12A and 12B.

In some implementations, the automated assistant mode 806 interacts with a person or visitor without any user input or involvement. In some implementations, in the automated assistant mode 806, the assistant of the connected doorbell 106 interacts with the person until the interaction ends. A user is able to take over the interaction at any point. For example, the assistant of the connected doorbell 106 interacts with the person by providing a greeting message and additional responses based on a response model corresponding to the determined visitor group for the person. In some implementations, the visitor interaction system sends a notification/message of the interaction to the user, via a client device 220, such that the user may take over the interaction if they choose to. In some embodiments, the visitor interaction system in automated assistant mode 806 uses the additional responses provided by the assistant of the connected doorbell 106 to obtain context information or additional details to complete the interaction and/or to report to the user. In the automated assistant mode 806, the assistant of the connected doorbell 106 is able to interact with a person as needed to complete the interaction; however, the assistant of the connected doorbell 106 is limited by the authorization granted by the user. For example, a user may require final authorization before the assistant of the connected doorbell 106 is able to unlock doors for a person in the unknown visitor group. In some implementations, if the user decides to take over the interaction, the visitor interaction module enables the user to interact with the person via text-to-speech, 2-way talk, and/or by selecting from responses corresponding to a response model corresponding to the visitor group determined for the person. Examples of the automated assistant mode are provided below in FIGS. 13A-13C.

Figure 9A:
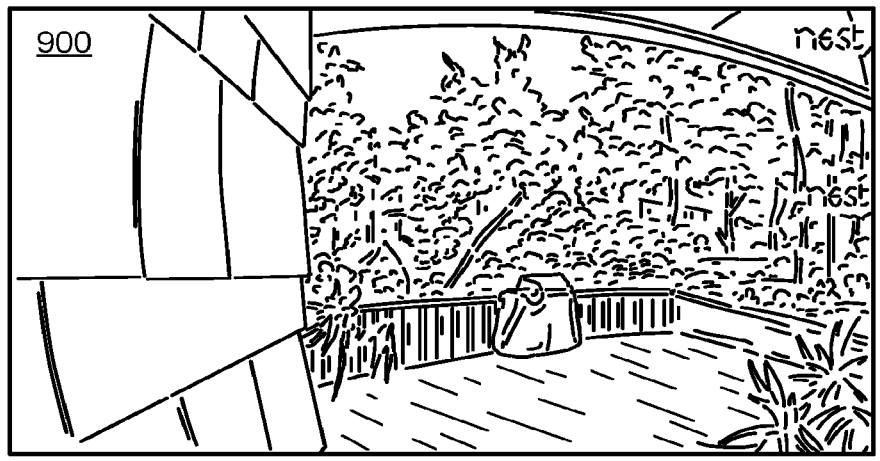
FIGS. 9A-9C illustrate a representative person detection and recognition process in accordance with some implementations.
Figure 9B:
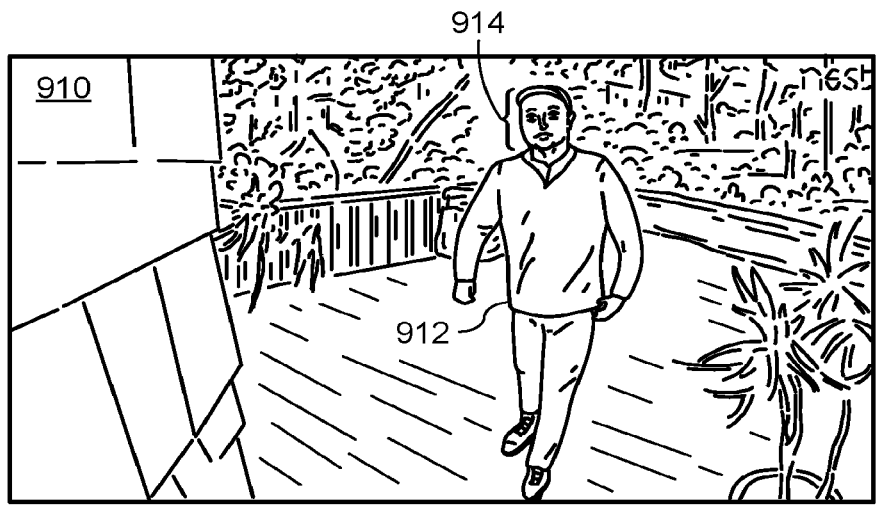
Figure 9C:
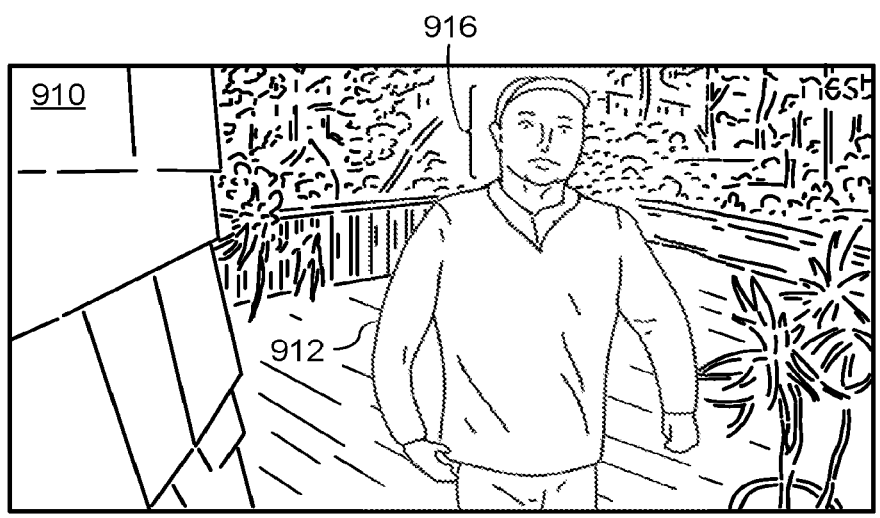

FIGS. 9A-9C illustrate a representative person detection and recognition process in accordance with some implementations. FIG. 9A shows an image 900 corresponding to a field of view of a first camera associated with a connected doorbell 106 of an visitor interaction system. In some implementations, the visitor interaction system includes one or more devices of the connected home environment 100 and/or the server system 164. As shown in FIG. 9A, no potential visitors are present in image 900. FIG. 9B shows an image 910 corresponding to a field of view of a second camera associated with connected doorbell 106. In some implementations, upon initial detection of a person 912 (discussed in more detail below), connected doorbell 106 automatically switches to the second camera as it has a field of view more conducive to visitor detection. In some implementations, however, connected doorbell 106 includes only one camera, and image 900 of the first camera remains after the initial detection of a person. In some implementations, upon detection of a motion event (e.g., person 912 enters the field of view of the camera), the system (e.g., the visitor interaction system, including but not limited to a processor of connected doorbell 106) analyzes the motion event/interaction to determine whether the person 912 is a visitor (e.g., whether the person 912 is approaching the connected doorbell 106). For example, as the person 912 moves in the field of view, the system can measure the height (or another dimension) of the person's face (or other body characteristics, such as the person's torso, shoulder width, and the like). The face height 914 in FIG. 9B increases to a larger face height 916 in FIG. 9C. In this example, based on whether the face height increase satisfies one or more face height increase criterion, the system determines that the person 912 is approaching the entryway, and thereby classifies the person 912 as a visitor. In some implementations, analyzing the motion event additionally or alternatively includes analyzing data from a motion sensor to determine whether the motion data satisfies motion criteria, and/or analyzing data from a proximity sensor (e.g., a PIR sensor) to determine whether the proximity data satisfies proximity criteria. For example, a PIR sensor detects a heat signature, and a processor associated with the visitor interaction system analyzes the heat signature to determine whether the heat signature exceeds a predetermined threshold. In accordance with a detection that the heat signature exceeds the threshold, a person 912 associated with the heat signature is classified as a visitor. As another example, an audio sensor detects an audio signal, and a processor associated with the visitor interaction system analyzes the audio signal to detect an audio event indicative of an approaching person, such as footsteps. In accordance with a detection that an amplitude or decibel level of the audio event (e.g., the volume of the detected footsteps) passes a predetermined threshold, a person 912 associated with the audio event is classified as a visitor. In some implementations, a processor associated with the visitor interaction system determines a direction of movement and/or a distance of a detected person based on a signal from a direction and/or distance sensor, such as a radar sensor. In some implementations, a processor associated with the visitor interaction system uses a combination of any of the aforementioned examples to detect an approaching person and classify the person as a visitor.

Figure 10A:
FIGS. 10A and 10B illustrate representative visitor group classification operations in accordance with some implementations.
Figure 10A:
Figure 10B:
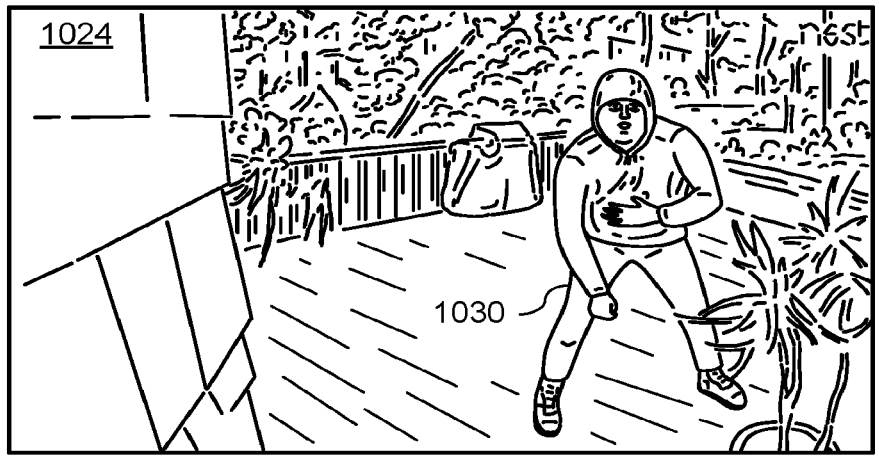
Figure 10B:
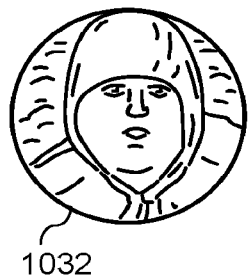

FIGS. 10A and 10B illustrate representative visitor group classification operations in accordance with some implementations. FIG. 10A shows a visitor 1020 in an image 1010 (e.g., corresponding to a doorbell's 106 field of view at a first time), and FIG. 10B shows a visitor 1030 in an image 1024 (e.g., corresponding to a doorbell's 106 field of view at a second time). In some implementations, the visitor interaction system determines a visitor group classification for detected visitors or persons. The visitor group classification group includes predetermined visitor groups such as an expected person group, a salesperson group, a deliveryman group, an intruder group, and/or learned group over time (e.g., see FIG. 3B for visitor group database). In some embodiments, a user generates one or more visitor group classifications. In some implementations, the visitor interaction system generates one or more visitor group classifications based on data collected over time, prior user classifications, and/or user preferences (e.g. learned group). For example, a user may identify a group for a cleaning service and associate the cleaning service group with a response model and responses that the visitor interaction system may provide (e.g., unlocking doors from 2:00 PM to 3:00 PM). In another example, a user may have signed up for a dog walker without registering the dog walker, the visitor interaction system may create a visitor group (e.g. a learned group) with a corresponding response model for the dog walker based on repeated detected visits, past response (e.g., approved or rejected responses), past user responses (e.g., unlocking the doors at 1:00 PM for dog walker), and user schedules (e.g., if connected to the visitor interaction system), and other factors. The user is provided report messages to approve or reject the learned group. In some implementation, visitor interaction system determines a visitor group classification for detected visitors based on captured data in a field of view by a camera including video, audio, and/or context information (discussed below).

For instance, in some implementations, the visitor interaction system determines whether the visitors are known to the system (e.g., based on a facial recognition operation). In some implementations, the visitor interaction system (e.g., via a processor of connected doorbell 106) performs a face cropping operation and performs the facial recognition operation on the cropped images 1022 and 1032. For example, the visitor interaction system, using a processor, crops an image 1022 of person's 1020 face out of image 1010 and sends the cropped image 1022 to a server for facial recognition processing. In some implementations, if multiple faces are detected, the visitor interaction system separately crops each face and sends each face to a server for facial recognition processing. Alternatively, the visitor interaction system crops an area out of image 1010 that includes each detected face and sends the cropped area to the server for facial recognition processing. Alternatively, the visitor interaction system sends the entire frame of image 1010 to the server for facial recognition processing. In some implementations, the camera itself performs the facial recognition processing. In some implementations, the visitor interaction system analyzes the images 1010, 1024 to determine context information for the visitors 1020, 1030. In some implementations, the visitor interaction system uses the determined context information for the visitors 1020, 1030 to determine the visitor group classification and/or response to the user based on the visitor group classification and/or the captured data in a field of view by a camera. Alternatively and/or additionally, in some implementations, the visitor interaction system sends the images 1010, 1024 and/or the images 1022, 1032 to a user of the connected home environment 100 (e.g., as part of a notification, message, or alert).

Visitors who are known to the system (e.g., via stored person data, preprogramed by the user, etc.) are classified to visitor groups that they are associated with. Additionally or alternatively, visitors who are unknown to the system (e.g., have not visited the connected home in the past or whose identity cannot be determined from the available images and/or video) are identified as unknown and classified accordingly. In some implementations, context information along with the identity of the person (e.g. determined by facial recognition) is used to determine a visitor group classification. In some implementations, visitor group classifications are updated and/or modified as additional information (e.g., additional video and/or context information) is obtained. For example, a person visiting the connected home for the first time may not be identified by the visitor interaction system, identified as unknown, and classified in the unknown visitor group; however, the identity of the person and/or the visitor group classification for the person may change as additional information is analyzed and/or available. For instance, the person may have a scheduled meeting time and after identifying themselves are placed in a known visitor group, the person may be holding a package for delivery and placed in the deliveryman group, the person may be holding products for sale (e.g., girl scout cookies) and placed in the salesperson group, etc. Alternatively or additionally, is some implementations, a person and/or visitor cannot be identified is placed in a generic response model to provide greeting and acquire information from the visitor or person until a more definitive visitor group classification can be assigned to the person and/or visitor.

Figure 11A:
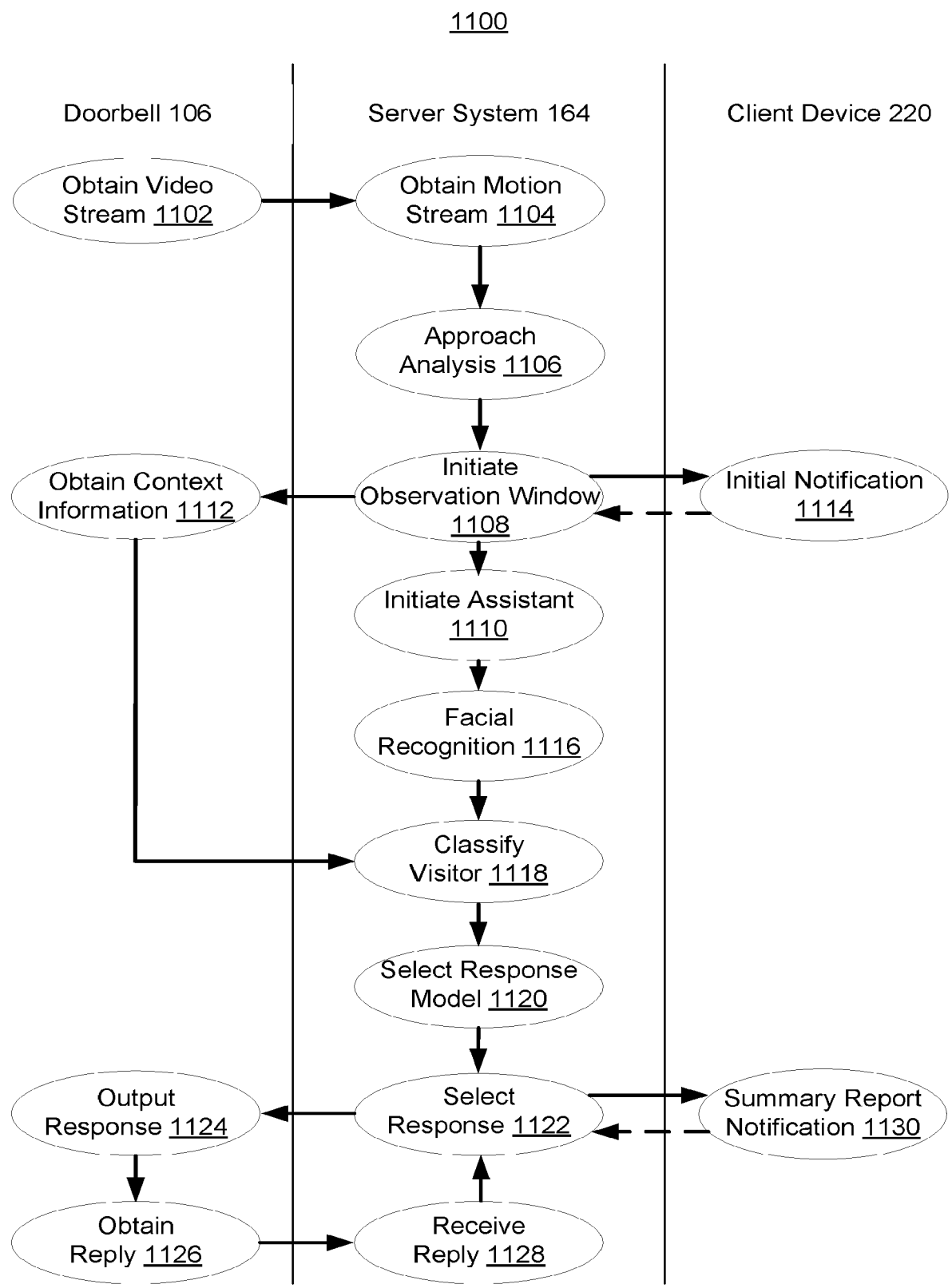
FIGS. 11A and 11B are flow diagrams illustrating methods of detecting, classifying, and/or responding to a visitor to a connected home environment via an assistant of the visitor interaction system in accordance with some implementations.
Figure 11B:
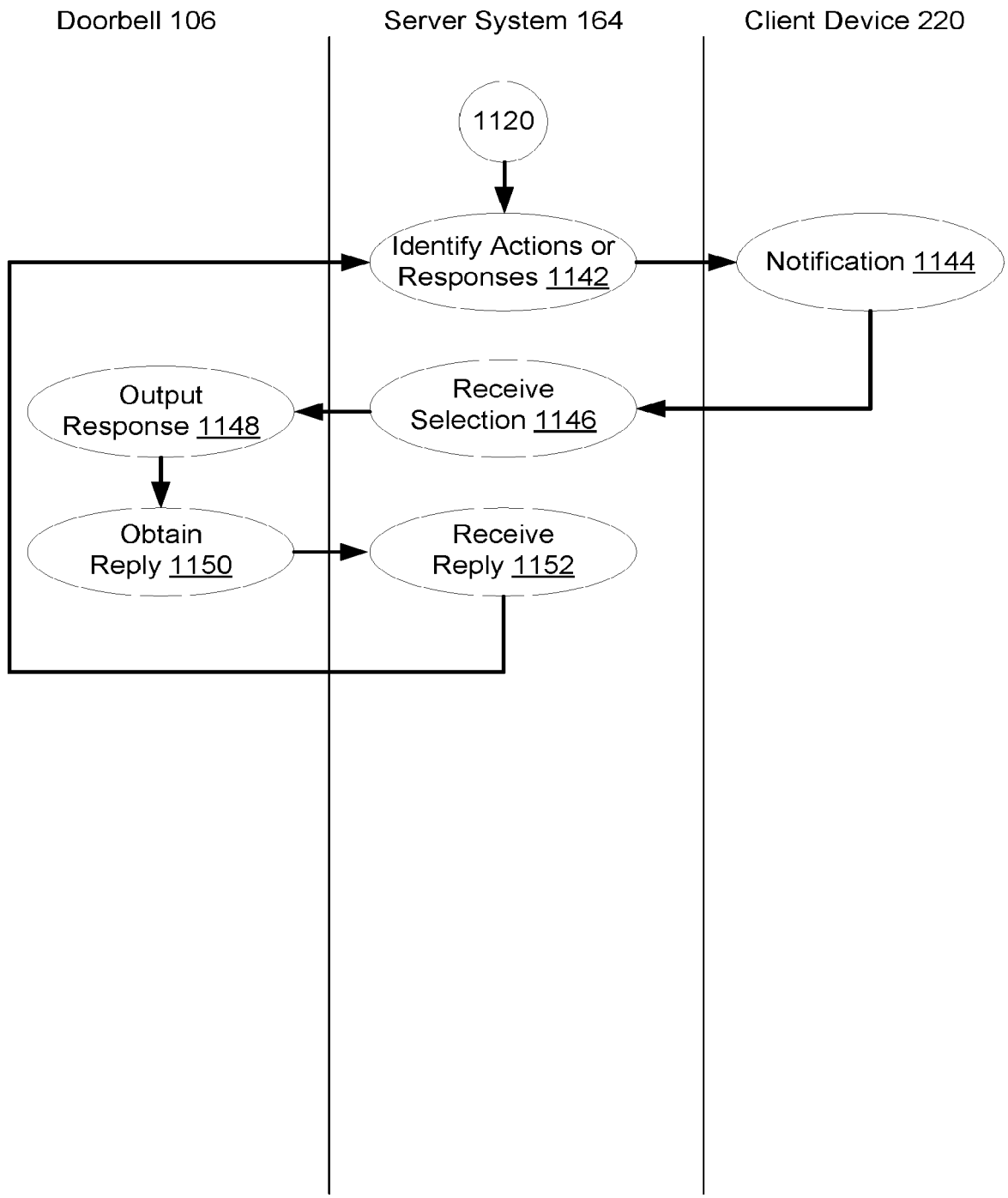

FIGS. 11A and 11B are flow diagrams illustrating methods of detecting, classifying, and/or responding to a visitor to a connected home environment via an assistant of the visitor interaction system in accordance with some implementations. In some implementations, the methods are performed by: (1) one or more connected devices 204 (e.g., a connected doorbell 106); (2) the server system 164; (3) a client device 220; or (4) a combination thereof. In some instances and implementations, the various operations of the methods described herein are interchangeable, and respective operations of the methods are performed by any of the aforementioned devices, systems, or combination of devices and/or systems. For example, the obtaining of a motion stream (1104) is optionally performed by connected doorbell (s) 106 or server system 164. In some implementations, video and/or data streams are sent from a connected doorbell 106 to a client device 220 over a network (e.g., a WLAN) that does not include server system 164. In some implementations, the methods are governed by instructions that are stored in one or more non-transitory computer-readable storage mediums, and that are executed by one or more processors, such as the CPU(s) 302 of server system 164 and/or the CPU(s) 402 of connected device 204 (e.g., a connected doorbell 106). For convenience, the method operations will be described below as being performed by particular component or device, but should not be construed as limiting the performance of the operation to the particular device in all implementations.

FIG. 11A illustrates a method 1100 of detecting and responding to a visitor to a connected home environment via an assistant of the visitor interaction system in accordance with some implementations. The connected doorbell 106 obtains a video stream (1102) from a camera associated with or included in the connected doorbell 106. The server system 164 derives a motion stream (1104) from the video stream of the camera (e.g., via video processor module 3146). In some implementations, the motion stream includes data or metadata derived from the video stream of the camera which is analyzed to detect information regarding an amount of motion in a field of view of the camera. In some implementations, the motion stream and the video stream are both streamed from the camera to the server system 164 for analysis. Alternatively, only the video stream is streamed to the server system 164 for deriving a motion stream and analyzing the motion stream. In some implementations, the video stream and/or the motion stream are streamed to the server system 164 only when an amount of motion satisfying a threshold is detected. In some implementations, the motion stream includes the video stream with metadata including motion data. In some implementations, the motion stream is a separate data stream (e.g., not including video data from the video stream) including motion data corresponding to the video stream. In some implementations, deriving the motion stream from a video stream of the camera includes comparing an amount of detected motion in a field of view of the camera to a threshold. For example, if an amount of detected motion is greater than a predetermined threshold, data associated with the detected motion is included in the motion stream for further analysis; otherwise, data associated with the detected motion is not included in the motion stream. Setting a predetermined motion threshold enables the system to disregard some trivial movements such as leaves blowing in the breeze.

The server system 164 analyzes (1106) the motion stream to determine if a visitor is approaching the entryway. In some implementations, server system 164 analyzes the motion stream by tracking a dimension of a characteristic of the visitor (e.g., the visitor's path, the visitor's proximity to the entryway, a dimension of the visitor's face, a dimension of the visitor's body, and/or any other physical characteristic of the visitor, such as a height or shape of any part of the body, including the body as a whole) over time. For example, if a height or width of the visitor grows over time, or if a dimension of the visitor's face increases over time, the visitor is determined to be approaching the entryway. Additionally or alternatively, if the dimension of the characteristic of the visitor exceeds a threshold, the visitor is determined to be approaching the entryway. For example, if a detected person enters from outside of the field of view of the camera, but is determined to be in close proximity (e.g., within 3 ft, 5 ft, or 10 ft) to the entryway the detected person is deemed to be a visitor. In some implementations, a detected person is deemed to be a visitor in accordance with a determination that the detected person is closer to the entryway than to a public space (e.g., a public sidewalk).

In some implementations, in addition to or as an alternative to analyzing a motion stream, the server system 164 determines if a visitor is approaching the entryway by detecting a presence of a person (sometimes referred to herein as "presence information"). Several example implementations for detecting presence information are described below.

For example, determining that a visitor is approaching the entryway includes obtaining and analyzing presence information indicative of an approaching visitor or a visitor in proximity to the entryway. In some implementations, part or all of the presence information is derived from motion data of one or more motion sensors of the connected home environment, including, for example, PIR sensor, an ultrasonic sensor, a microwave sensor, and/or a tomographic sensor. In some implementations, part or all of the presence information is derived from video data of one or more cameras having a field of view corresponding to the entryway. For example, presence information is derived by determining that an amount of motion detected by a camera or other type of motion sensor meets one or more motion criteria, such as an amount of motion exceeding a threshold. As a further example, presence information is derived by analyzing a plurality of image frames to determine whether a difference in position of an object (e.g., measured in pixels) in the plurality of image frames exceeds a threshold. In some implementations, part or all of the presence information is derived from an audio signal obtained from an audio sensor. For example, an audio signal capturing an audio event (such as a footstep, a verbal announcement, a doorbell sound, or a door knock) is indicative of a visitor's presence.

As another example, determining that a visitor is approaching the entryway includes comparing a dimension of a characteristic of the visitor over time. In some implementations, determining that the visitor is approaching includes tracking one or more dimensions of the visitor over time. For example, determining that a visitor is approaching the entryway includes obtaining a first measurement of a dimension of a characteristic of the visitor (such as an initial height measurement of the visitor's head), obtaining a subsequent measurement of the dimension of the characteristic of the visitor (such as a second height measurement of the visitor's head at a predetermined amount of time after the initial height measurement), and determining whether a difference between the first measurement and the subsequent measurement exceeds a threshold. For example, if the visitor's head height increases between the first and second measurements, the visitor is likely approaching; otherwise, if the visitor's head height does not increase, the visitor is likely not approaching or is standing still.

As another example, determining that a visitor is approaching the entryway includes determining that the visitor is within a threshold distance to the entryway. For example, if a person is detected within a predetermined distance from the entryway, the person is determined to be an approaching visitor. For example, once the visitor is within 15 feet, 10 feet, or 5 feet of the entryway, the observation window is initiated and context information is obtained. In some implementations, initiating the observation window in response to the determination that the visitor is approaching the entryway includes initiating the observation window in response to the determination that the visitor is on a track to the entryway (e.g., has entered a walkway, hallway, or perimeter gate leading to the entryway).

As another example, determining that a visitor is approaching the entryway includes deriving a motion stream. In some implementations, the motion stream is derived from a video stream of the camera. In some implementations, the motion stream is derived from the video stream by detecting information regarding an amount of motion in a field of view of the camera, or by comparing an amount of detected motion in a field of view of the camera to a threshold. In some implementations, the motion stream includes a motion mask for a motion event detected in the video stream.

Upon a determination that a visitor is approaching the entryway, the server system 164 initiates an observation window (1108). In some implementations, a length of the observation window is predefined to correspond to a reasonable amount of time for the visitor to complete the approach to the entryway, amount of time to classify the visitor, or to reach a threshold distance to the entryway. For example, a visitor approaching an entryway located at the end of a long walkway is given more time to reach the entryway (or a threshold distance from the entryway) than a visitor approaching an entryway located at the end of a shorter walkway. In some implementations, the method additionally or alternatively includes initiating the observation window in response to a determination that the visitor is within a threshold distance to the entryway, where the threshold is predetermined based on a layout of the entryway. In some implementations, the visitor interaction system analyzes the layout of the entryway and automatically sets a threshold based on an amount of time it takes for an initially detected person to reach a component of the entryway, such as a door or a gate. Additionally or alternatively, a user manually sets the predetermined threshold using an interface of the visitor interaction system. In some implementations, the observation window is initiated when the visitor is close enough to the entryway to enable an interaction with the visitor interaction system (e.g., a doorbell press or verbal communication). In some implementations, the visitor is determined to have reached the threshold distance to the entryway based on data from a range sensor, such as a PIR sensor or radar.

In conjunction with initiating the observation window (1108), the server system 164 initiates an assistant (1110). The assistant interacts with the visitor in accordance with predetermined interaction settings set by a user as described above in FIG. 8. The predetermined interaction settings include automated assistant mode 806, intermediate assistant mode 804, and/or limited assistant mode 802. The assistant enables the visitor interaction system to provide one or more responses to the visitor via connected doorbell 106. In some embodiments, the one or more responses are based on obtained context information (1112) and/or selected response model (1120), as discussed below.

Upon initiating the observation window, the connected doorbell 106 obtains context information (1112). In some implementations, the connected doorbell 106 is constantly obtaining context information, while in other implementations, the doorbell begins obtaining context information upon initiation of the observation window. In some implementations, context information is based on a detected announcement event (e.g., a doorbell press, a door knock, a keypad entry, or a verbal announcement); a facial recognition analysis; one or more behavior characteristics of the visitor; one or more clothing characteristics of the visitor; a time during which the visitor approaches the entryway (e.g., a time of day or day of the week); a verbal announcement of the visitor; proximity in time to a prescheduled event; proximity in time to a prescheduled status of the connected home environment; a status or location of the user; a detected idling time (e.g. waiting without taking any particular action and/or loitering) by the visitor; total time the visitor is detected; and/or a timing of the detected visitor action compared to a timing of the identification of the motion event involving the visitor approaching the entryway. More details regarding the obtaining of context information are provided below.

In some implementations, the server 164 sends an initial notification (1114) (also referred to as report messages or messages) to the client device 220 via a dedicated application (e.g., a doorbell application), a browser application, a voicemail application, email, and/or a standard short message service (SMS) application (e.g., text notification). In some implementations, the notification (1114) to client device 220 includes one or more of a live stream of the event, a recorded portion of the video stream corresponding to the event, live and/or recorded audio from the event, speech-to-text transcriptions associated with the event and interactions around the event, and/or still images. The initial notification (1114) provides a user of client device 220 an indication that an approach has been detected. In some implementations, the notification includes context information corresponding to obtained information, determined group for the visitor (if available), and/or other available information. In some implementations, the initial notification (1114) provides the user of client device 220 one or more affordances to take over the current visitor interaction, allow and assistant to complete the interaction, provide feedback to the server 164 during the interaction, terminate the interaction (e.g., requesting the visitor to return at another time), and/or ignore the interaction enabling visitor interaction system to operate in accordance with the assistant personalization (e.g., automated 806, intermediate 804, and/or limited 802 mode).

Upon initiating the observation window, the server system 164 performs a facial recognition operation (1116) based on one or more frames of the motion stream sent to the server by connected doorbell 106, and determines, based on an outcome of the facial recognition operation, the identity of the visitor, if known to the visitor interaction system (e.g., illustrated in FIGS. 10A and 10B) and/or a visitor group classification as described herein.

The server system 164 classifies the visitor (1118) according to a result of the facial recognition (1116) and the context information (1112). For example, the visitor is classified as belonging to one or more visitor groups such as known persons, unknown persons, expected persons, unexpected persons, suspicious person, intruder, deliveryman, sales person, user defined groups, learned groups, and the like. In some implementations, the classifications are weighted in accordance with the context information and the facial recognition. In some implementations, the server system further classifies the visitor based on whether the visitor announced the visit (e.g., rang the doorbell or knocked on the door) within a closing of the observation window. In some implementations, the observation window closes at the earlier of: (1) a visitor announcement (e.g., a doorbell press or knocking event); (2) a determined visitor classification (e.g., classified in one or more of the predefined visitor groups) for the visitor; and (3) a predetermined time threshold (e.g., the visitor has lingered for more than the predetermined time threshold without making an announcement). In some implementations, the predetermined time threshold is dynamic, and depends on the context information (e.g., longer observation windows when the context information suggests a higher level of safety or concern, and shorter observation windows when the context information suggests a lower level of safety or concern). In some implementations, the context information includes a determination of whether the visitor made an announcement (e.g., rang the doorbell or knocked on the door) before the observation window expired.

The server systems 164 selects a response model (1120) based on the determined visitor classification (1118). In some implementations, the selected response model (1120) includes one or more responses and/or messages corresponding to the determined visitor classification. For example, in some implementations, the server systems selects a salesperson response model based on a classifying a visitor in the salesperson group, the selected salesperson response model including one or more responses and/or messages for interacting with a salesperson. Alternatively or additionally, in some implementations, the selected response model (1120) is based context information (1112) (e.g., responses and/or messages by the visitor) and/or the facial recognition results before and/or after a visitor has been classified. In other words, the selected response model (1120) may be modified at any point during the interaction with the visitor. For instance, in some implementations, a deliveryman response model is selected based on a visitor carrying a package and/or uniform and interacts with the visitor until the model needs to be changed. In some implementations, the selected response model (1120) provides responses based context information (1112) (e.g., features of the visitor and/or responses or messages provided by the visitor) and/or the facial recognition. For example, in the above example, the visitor may provide "I'm here to deliver a package," and the appropriate response is selected based on the available information (e.g., "Great! Does it need a signature?"). The server system selects a response model (1120) to interact with a visitor of the connected home environment based on the determined visitor classification (1118). In some implementations, a determination of the visitor classification (1118) is not possible before a response is ready to be output (e.g., visitor or person was not identified from the video and/or context information). In those situation, visitor classification (1118) defaults to an unknown person group until the model can be adjusted (e.g., based on context information and/or analyzed video or image).

The server system selects a response (1122) associated with the selected response model 1120. In some implementations, the server system selects a response (1122) in accordance with only the context information (1112) or only the facial recognition result (1116). In some implementations, the server system selects a response (1122) in accordance with the context information (1112) and the facial recognition result (1116). The selected response model (1120) includes one or more visitor group dedicated responses that are appropriate for an interaction. A visitor group dedicated response is defined as "appropriate" if it is determined to be a response likely to be selected and/or has been previously selected by the user based on the context information and the determined visitor classification. An "appropriate" response is therefore relevant, applicable, useful, pertinent, and/or suitable for responding to the visitor depending on the context information and the determined visitor classification. In some implementations, a number of appropriate responses are stored in a database (e.g., database 316, FIG. 3A), and ranked in terms of the applicability, relevance, and/or usefulness of each response to a present situation involving a specific visitor, determined visitor group, and/or specific context information. In these implementations, a response is defined as "appropriate" if it is the highest ranking (e.g., the highest ranked response of the top 3, 5, or 10 responses for a specific situation, visitor group, and/or context information). In other implementations, a response is defined as "appropriate" if its confidence rating is above a predetermined threshold (e.g., above at least a 60% confidence rating). In some implementations, the threshold is determined based on a number of possible responses for a visitor classification and/or the context information as it corresponds to a user of the connected home environment.

In some implementations, the server 164, in conjunction with selecting a response (1122), sends a summary report notification (1130) to the client device 220 (e.g., report messages or messages that include the assistant's interaction with the visitor). In some implementations, the server 164 includes in the summary report notification (1130) the determined visitor classification (1118), the initial response (1122), and/or any received replies (1128). The server 164 sends the summary report notification (1130) to the client device 220 via a dedicated application (e.g., a doorbell application), a browser application, a voicemail application, email, and/or a standard short message service (SMS) application. In some implementations, the summary report notification (1130) sent to the client device 220 includes one or more of a live stream of the event/interaction, a recorded portion of the video stream corresponding to the event, live and/or recorded audio from the event/interaction, speech-to-text transcriptions associated with the event and interactions around the event, and/or still images.

In some implementations, the visitor interaction system autonomously implements one or more actions and the server system 164 identifies one or more appropriate devices for performing the one or more identified actions. In some implementations, the user authorizes the one or more actions and the server system 164 identifies one or more appropriate devices for performing the one or more identified actions. The server system 164 sends the one or more identified actions to the appropriate device(s) to be performed. For example, the server system 164 determines that the appropriate device for an unlock action is a connected door lock and sends the unlock action to the connected door lock. As another example, the server system 164 determines that the appropriate devices for an alert action include a floodlight device in the connected home environment, a remote security device (e.g., a computer at a local police station), and the connected doorbell 106 via the assistant (e.g., to issue a warning to the visitor) and sends the alert action to those devices. Alternatively, in some implementations, the server system 164 sends the one or more identified actions to the appropriate device(s) without requiring user authorization. For example, the server system 164 may have received authorization for a prescheduled event and does not require confirmation; a known event and/or visitor with a corresponding predetermined action approaches the connected home system; and/or an the server system is authorized to perform specific action without requiring authorization from a user.

In some implementations, the user personalization of the assistant requires that the user respond, via client device 220, to a selected response (1122) before the response is output (1124). For example, in limited assistant mode, the visitor interaction system requires that a user select a response (1122) before the response is output (1124). An example of the limited assistant mode is provided below in FIG. 11B.

The connected doorbell 106 outputs (1124) the response to the visitor (e.g., broadcasts a voice message, prompts the visitor to reply, and the like). In some implementations, the server 164 waits a predetermined amount of time (e.g., 5 s, 15 s, 30 s, 1 min, 2 min, 5 min) before outputting (1124) the response. In this way, the user is able to modify, reject, or approve the response before it is provided. After waiting the predetermined amount of time, the server 164 implements the response by outputting (1124) the selected response (1122) at the connected doorbell 106 via the assistant autonomously. In other implementations, based on user settings, a lack of a response from the user, when required, is used as context information and used to update the selected responses (1122). For example, a lack of a response from the user (when required) may result in the selected response (1122) being "Can you please come back at a later time?" In this way, the responses from the server 164 do not exceed the authorization granted by the user and/or make decisions that require user approval. In some implementations, another connected device 204 implements the response (e.g., connected door lock 120 unlocks the door to let the visitor in). The connected doorbell 106 obtains a reply (1126) and sends the reply to the server 164 (e.g., a verbal or text message left by the visitor). The server 164 receives the reply (1128), and initiates a subsequent response (1122) (e.g., asking a follow-up question, provide instructions, make a request, complete the transaction, stall the visitor until the user may come to the door and/or take over the interaction, and/or other responses discussed herein). In some implementations, the subsequent response (1122) is determined using obtained information (e.g., context information) during the interaction. Specifically, the server 164 determined the subsequent response (1122) based on the context information along with the received reply (1128). In some implementations, the subsequent response (1122) modifies the selected response model (1120), the selected response (1122), and/or the responses corresponding to a response model based on the obtained information. Additionally, the server system 164 may store responses and use previously stored response to improve the accuracy of the responses or to better align the response with user preferences or behaviors. In some implementations, the server 164 stores the interaction with the visitor (e.g., output response and/or reply) for later retrieval by the user, to provide an additional notification, summaries, and/or information to the user, to update the response models and/or responses. For example, as described in FIG. 5, provided responses may be stored to make additional adjustments to the response model or the responses of a response mode.

In some implementations, the summary report notification (1130) enables the user to take over the interaction and/or select predetermined responses via client device 220. For example, in some implementations, a user may initiate a subsequent response (1122) through the summary report notification (1130). In some implementations, a user may personalize a response and/or instruct the server 164 provide a particular response to the visitor. For example, the personalize response may include how to deliver a package, what time a visitor should return, and/or how to continue and/or end the interaction with the visitor. FIG. 11A represents both the intermediate assistant model and the automated assistant model. In some implementations, the differences between the intermediate assistant model and the automated assistant model is the amount of user input required (e.g. FIG. 8). Examples of the intermediate assistant mode are provided in FIGS. 12A and 12B and examples of the automated mode are provided in FIGS. 13A-13C.

FIG. 11B illustrates a method 1140 of detecting and responding to a visitor of a connected home environment in limited assistant mode in accordance with some implementations. Limited assistant mode interacts with visitors as identified in previous application U.S. application Ser. No. 15/809,900. In some implementations, limited assistant mode provides a user with appropriate responses as discussed below.

After selecting a response model (1120), the server system 164 identifies actions or responses (1142) for interacting with the visitor via the assistant of the connected doorbell 106. The server system 164 identifies a plurality of appropriate actions or responses (1142) available to a user of the client device 220 for interacting with the visitor via the assistant of the connected doorbell 106. In some implementations, the obtained data and the context information is used with the selected response model (1120) to identify the plurality of appropriate actions or responses (1142).

As discussed above, in some implementations, actions are ranked and ordered based on the ranking. In these implementations, an action is defined as "appropriate" if it at or near the top of the ranking (e.g., one of the top 3, 5, or 10 actions in the ranking). In some implementations, the higher an action is ranked, the more appropriate the action is considered to be. In some implementations, an action is defined as "appropriate" if its rank is above a predetermined threshold (e.g., the ten highest ranked actions), with a subset of appropriate actions (e.g., three actions) being presented to the user. In other implementations, the threshold is determined based on a number of actions that can be presented to the user in a single user interface of the client device (e.g., if the user interface can only display three actions at once, then the three highest ranked actions are determined to be "appropriate"), and all of the appropriate actions are simultaneously presented to the user in the same user interface. In some implementations, a number of actions to be presented to the user is based on an amount of display space available in a response or action area of a user interface of the client device.

Upon identifying a plurality of appropriate actions (1142) available to the user of a client device 220 for interacting with the visitor via the assistant of the connected doorbell 106, the server system 164 presents a notification (1144) of the identified appropriate actions to the user at the client device 220. For examples of the notifications refer to U.S. application Ser. No. 15/809,900.

The server system 164 receives a selection (1146) of an identified action from the user of the client device 220, and implements the action by outputting a response (1148) at the connected doorbell 106 via the assistant. In some embodiments, the connected doorbell 106 records a reply (1150) and sends the reply to the server 164 (e.g., a message left by the visitor). The server 164 receives the reply (1152), identifies actions (1142) (e.g. updated or subsequent actions), and presents the updated actions to the user via a notification (1144) at the client device 220. In some implementations, the server system 164 identifies one or more appropriate devices for the identified action and sends the identified action to the appropriate device(s). For example, the server system 164 determines that the appropriate device for an unlock action is a connected door lock and sends the unlock action to the connected door lock. As another example, the server system 164 determines that the appropriate devices for an alert action include a floodlight device in the connected home environment, a remote security device (e.g., a computer at a local police station), and the connected doorbell 106 via the assistant (e.g., to issue a warning to the visitor) and sends the alert action to those devices. In some implementations, a user's response or lack of response is used as context information for the selected response and/or subsequently selected responses (1142). As described above in FIG. 11A, in some implementations, the updated actions (1142) are determined using the obtained data and/or context information. As further described in FIG. 11A received replies (1152) are used as context information for subsequent responses. Further, the server system 164 may store responses and use previously stored response to modify the response model or the responses of a response mode.

Figure 12A:
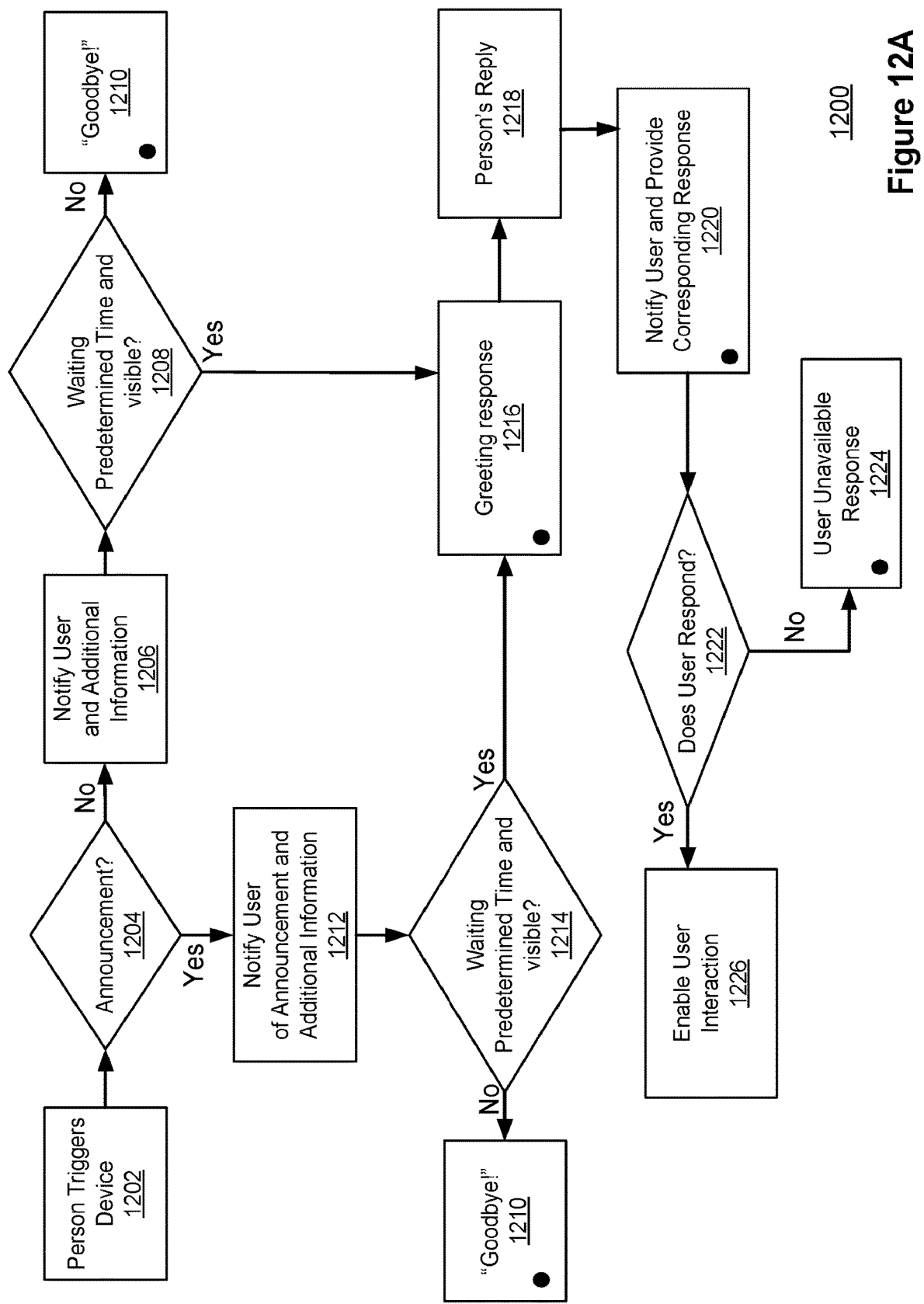
FIGS. 12A and 12B illustrate example flow diagrams of the visitor interaction system interacting with a person in intermediate assistant mode in accordance with some implementations.
Figure 12B:
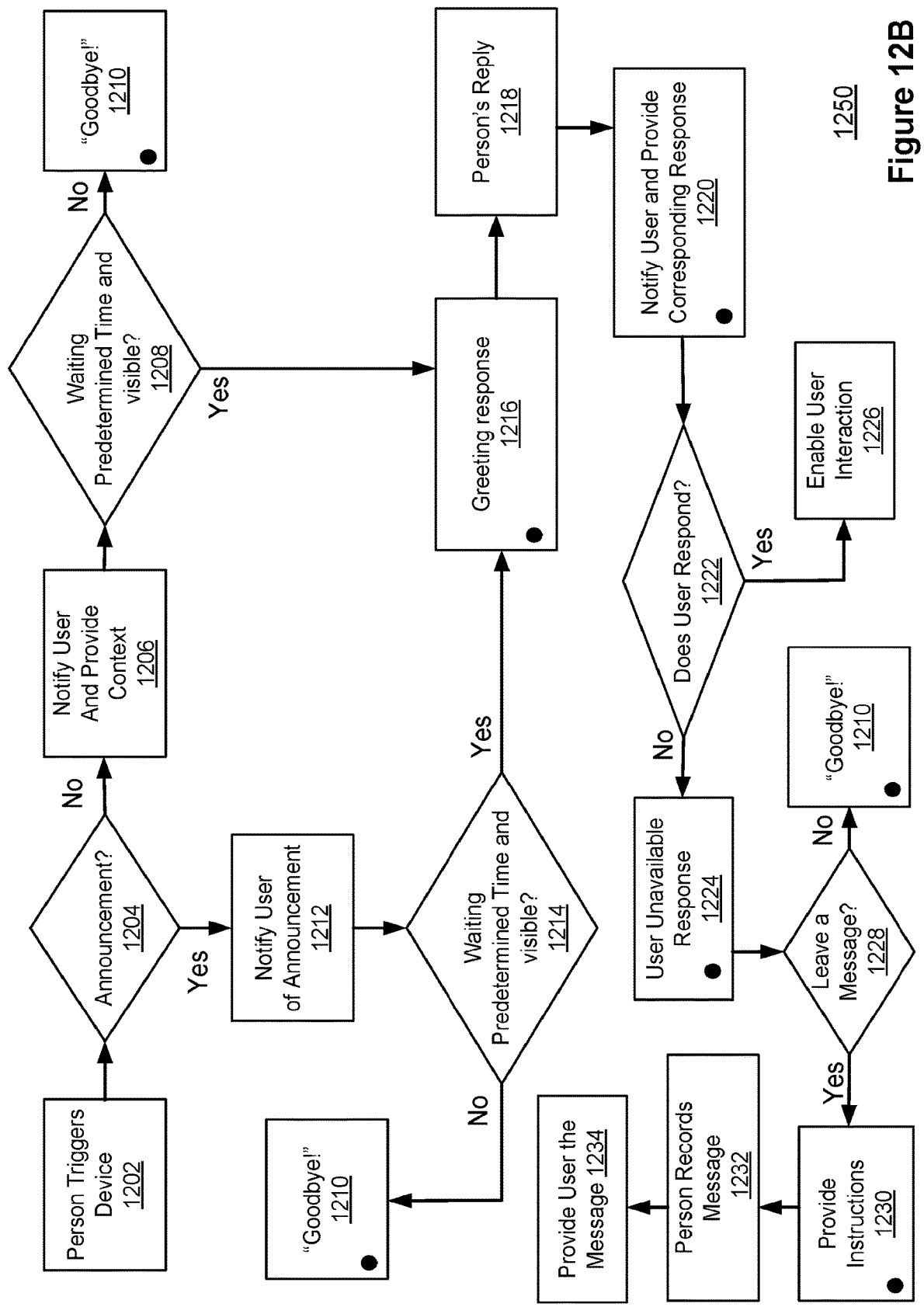

FIGS. 12A and 12B illustrate example flow diagrams of the visitor interaction system interacting with a person in intermediate assistant mode in accordance with some implementations. In some implementations, the methods are performed by: (1) one or more connected devices 204 (e.g., a connected doorbell 106); (2) the server system 164; (3) a client device 220; or (4) a combination thereof. In some instances and implementations, the various operations of the methods described herein are interchangeable, and respective operations of the methods are performed by any of the aforementioned devices, systems, or combination of devices and/or systems. For convenience, the method operations will be described below as being performed by particular component or device, but should not be construed as limiting the performance of the operation to the particular device in all implementations. The black circles within certain operations denote response provided by the assistant of the connected doorbell 106 either autonomously and/or as instructed by a user.

In example flow diagram 1200 of FIG. 12A, a person triggers (1202) the visitor interaction system via a connected device (e.g., connected doorbell 106). The person triggers (1202) the visitor interaction system by coming into a field of view of a camera associated with connected doorbell 106. As described above in FIGS. 9 and 10, the visitor interaction system detects the person using video, audio, and/or sensors. The connected doorbell 106 obtains video, audio and/or sensor data while the person is within the field of view of the camera and provides the obtained data to the visitor interaction system. The visitor interaction system identifies an approach using the obtained data (e.g., audio, video, sensor data). As further discussed in FIGS. 9 and 10, the visitor interaction system identifies the person by analyzing obtained data. Alternatively or additionally, the visitor interaction system analyzes the obtained data to determine context information related to the approach of the person. If possible, the visitor interaction system determines that the person belongs to a visitor groups using the obtained data (e.g., using the identification of the person and/or context information). Once the visitor interaction system determines a visitor group for the person, a corresponding response model for the determined visitor group is selected by the visitor interaction system to interact with the person via the assistant of the connected doorbell 106. The visitor interaction system may determine a visitor group for the person at the initial detection and/or at any time during the interaction with the person. If a visitor group for the person is not determined, the visitor interaction system defaults to an unknown or unexpected person group.

Returning to the example, the visitor interaction system determines if an announcement (1204) is made by the person. An announcement is a knock, a ring of the connected doorbell 106, a shout, and/or other indicators that the person is attempting to contact a user of the connected home. If the person does not provide an announcement, the visitor interaction system notifies (1206) the user that a person was detected approaching the connected home via connected device 220. If additional information is available, the visitor interaction system provides the information to the user in the notification (1206). The additional information includes the determined visitor group (e.g., deliveryman, salesperson, unknown/unexpected person, known/expected person, etc.), context information (e.g., a package, products for sale, a clip board, and/or other context information described herein), video, audio, and/or other information obtained by the visitor interaction system. For example, the notification may include that a deliveryman is at the door or that a person with a package was detected, a salesperson was at the door (e.g., a girls scouts), a person holding a flier and/or other solicitors, a suspicious person was peering through the windows, and/or other available information.

The visitor interaction system determines (1208) whether the unannounced person has waited outside of the connected home a predetermined amount of time (e.g., 5 s, 15 s, 30 s, 1 min, 2 min, 5 min) and is still visible. In some implementations, if it is determined that the unannounced person leaves the connected home before the predetermined amount of time (e.g., 5 s, 15 s, 30 s, 1 min, 2 min, 5 min) has passed, the visitor interaction system provides a goodbye response (1210) and/or returns to an idle state. Alternatively, if it is determined that the unannounced person does wait outside of the connected home the predetermined amount of time (e.g., 5 s, 15 s, 30 s, 1 min, 2 min, 5 min), the visitor interaction system provides a greeting response (1216) and continues the interaction with the person via the assistant of the connected doorbell 106.

Returning to operation (1204), if the person does provide an announcement, the visitor interaction system notifies (1212) the user of the announcement via client device 220. Similar to operation (1206), notification (1212) may include additional information such as the determined visitor group, context information, video, audio, and/or other information obtained by the visitor interaction system. The visitor interaction system determines (1214) whether the announced person has waited outside of the connected home a predetermined amount of time (e.g., 5 s, 15 s, 30 s, 1 min, 2 min, 5 min) and is still visible. If it is determined that the announced person has not waited outside of the connected home the predetermined amount of time (e.g., 5 s, 15 s, 30 s, 1 min, 2 min, 5 min), the visitor interaction system provides a goodbye response (1210), via the assistant of connected doorbell 106, and/or returns to an idle state. Alternatively, if it is determined that the person does wait outside of the connected home the predetermined amount of time (e.g., 5 s, 15 s, 30 s, 1 min, 2 min, 5 min), the visitor interaction system provides a greeting response (1216) and continues the interaction with the person (e.g., via the assistant of connected doorbell 106).

In some implementations, the greeting response (1216) is a greeting message as well as an inquiry on how the person may be assisted. For example, the greeting response (1216) provided by the assistant of connected doorbell 106 may be "Hi, can I help you?" The person provides a reply (1218) that is used by the visitor interaction system to determine an additional response and/or to continue the interaction with the person. The person's reply (1218) may be used as context information in conjunction with the selected response model for the person and obtained data to determine a subsequent response. In some implementations, the person's reply (1218) is a response from a deliveryman (e.g., "I'm here to deliver a package"), a response from salesperson and/or solicitor (e.g., "Is the homeowner home?" or "Would you be interested in . . . ?"), a response from a known person (e.g., "Hi Nathan, can I borrow your lawnmower?"), a response from a friend (e.g., "Is Nathan home?"), and/or any possible replies by a person. In some implementations, no response from the person is used as context information for a subsequent response. For example, a lingering person may be determined to be a high risk situation and the determined visitor group for the person may be adjusted from unknown person to suspicious person.

In intermediate assistant mode 804, the visitor interaction system notifies (1220) the user, via client device 220, of the person's reply (1218) and/or reason for visiting the connected home. In conjunction with notifying (1220) the user, the visitor interaction system provides the person a corresponding response, via the assistant of the connected doorbell 106, based on the context information (e.g., person's reply and/or other obtained data) and the selected response model for the person's determined visitor group (e.g., deliveryman group). In intermediate assistant mode 804, the corresponding response is used to stall and/or keep the person waiting until the user is able to respond. For example, if a deliveryman states that they have a delivery for the user, the visitor interaction system, via the assistant of the connected doorbell 106, asks the deliveryman to wait while the user is notified (e.g., "Please wait while I contact Nathan about the delivery"). The selected response model determines the corresponding response provided to the person.

After notifying (1220) the user, the visitor interaction system waits a predetermined amount of time (e.g., 5 s, 15 s, 30 s, 1 min, 2 min, 5 min) to determine if the user responds (1222). If the user does not respond after waiting the predetermined amount of time (e.g., 5 s, 15 s, 30 s, 1 min, 2 min, 5 min), the visitor interaction system provides (1224) to the person an autonomous response, via the assistant, indicating that the user is unavailable. In some implementations, the user is unavailable response (1224) is a request that the person come back at another time; the person leave contact information, the person schedule a future time to visit. In some implementations, the person is asked if they would like to leave a massage (discussed in FIG. 12B). If the user does respond within the predetermined amount of time (e.g., 5 s, 15 s, 30 s, 1 min, 2 min, 5 min), the visitor interaction system enables (1226) the user to interact with the person. The visitor interaction system enables the user, via client device 220, to interact with the person via quick responses (as discussed above in FIG. 11B, 2-way talk (e.g., facilitating audio and/or video communication between the user and the person), or text-to-speech (e.g., the user provides text via a messaging application and the visitor interaction system converts the text to audio for the person). After the interaction completes, the visitor interaction system returns to an idle state.

FIG. 12B illustrates an alternate embodiment of the visitor interaction system in intermediate assistant mode in accordance with some implementations. In example flow diagram 1250, the visitor interaction system performs the same operations 1202 through 1226. Flow diagram 1250 illustrates the additional steps of the visitor interaction system, via the assistant, asking (1228) the person if they would like to leave a message. After the visitor interaction system provides (1224) to the person an autonomous response indicating that the user is unavailable, the visitor interaction system, via the assistant, asks (1228) the person if they would like to leave a message. If the person provides a "no" response or if the person walks away, the visitor interaction system provides a goodbye response 1210 and/or returns to an idle state. If the person indicates that they would like to leave a message, the visitor interaction system provides to the person, via the assistant, instructions (1230) on how to record a message. In some implementations, the visitor interaction system provides, via the connected doorbell 106, a tone indicating when the person is to start recording their message. Alternatively, in other implementations, the visitor interaction system instructs the person to press a button on the connected doorbell 106 to initiate the recording. The person records (1232) their message, the visitor interaction system subsequently stores the message and returns to an idle state. In some implementations, the persons message is a video and/or audio recording. The visitor interaction system provides (1234) the user, via client device 220, the person's recorded message. In some implementations, the visitor interaction system may provide a transcript of the recorded message (e.g., using speech-to text to transcribe the message), the video recording, and/or the audio recording. In some other implementations, the visitor interaction system provides a full transcript of all of the interactions between the person and the assistant to the user via client device 220.

Figure 13A:
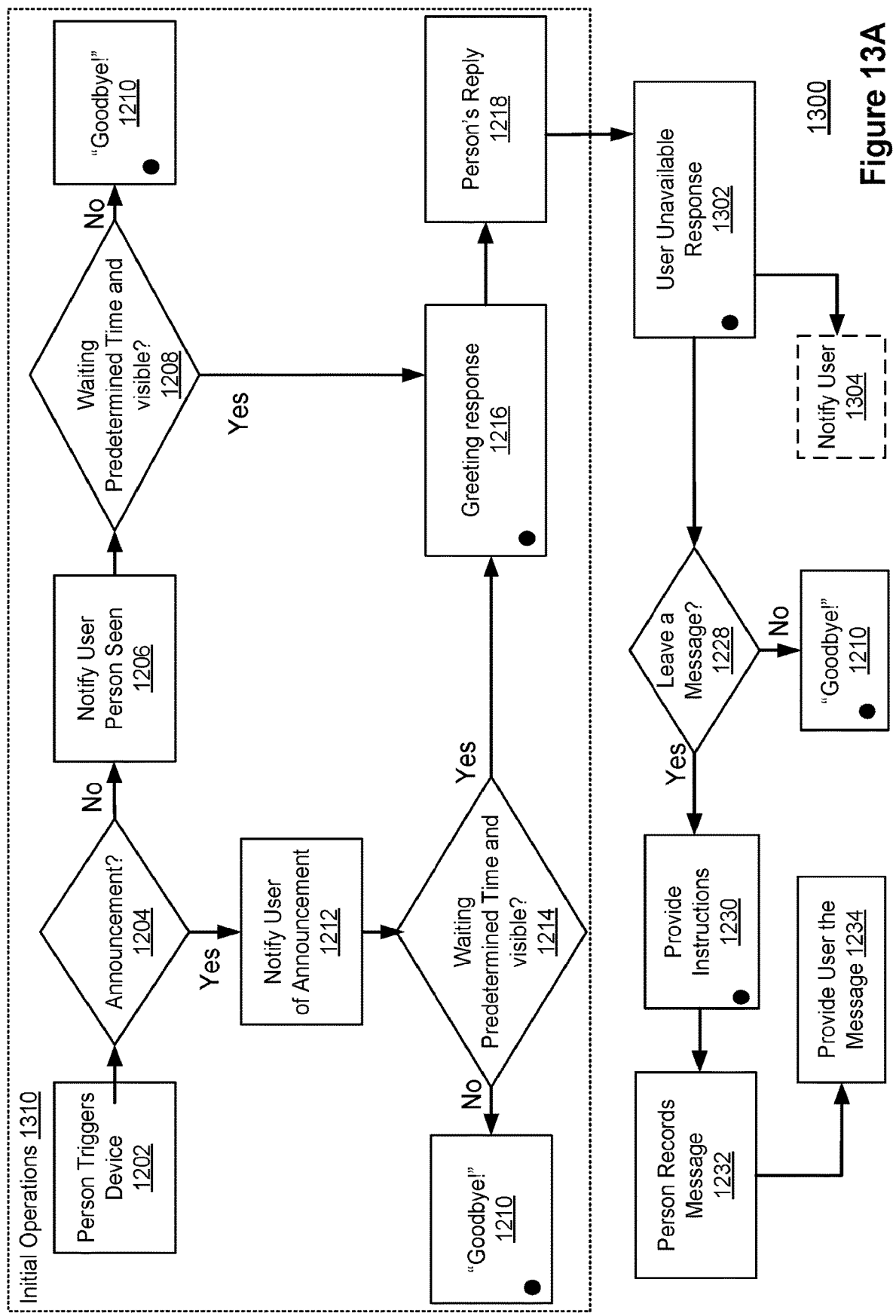
FIGS. 13A-13C illustrate example flow diagrams of the visitor interaction system interacting with a person in automated assistant mode in accordance with some implementations.
Figure 13B:
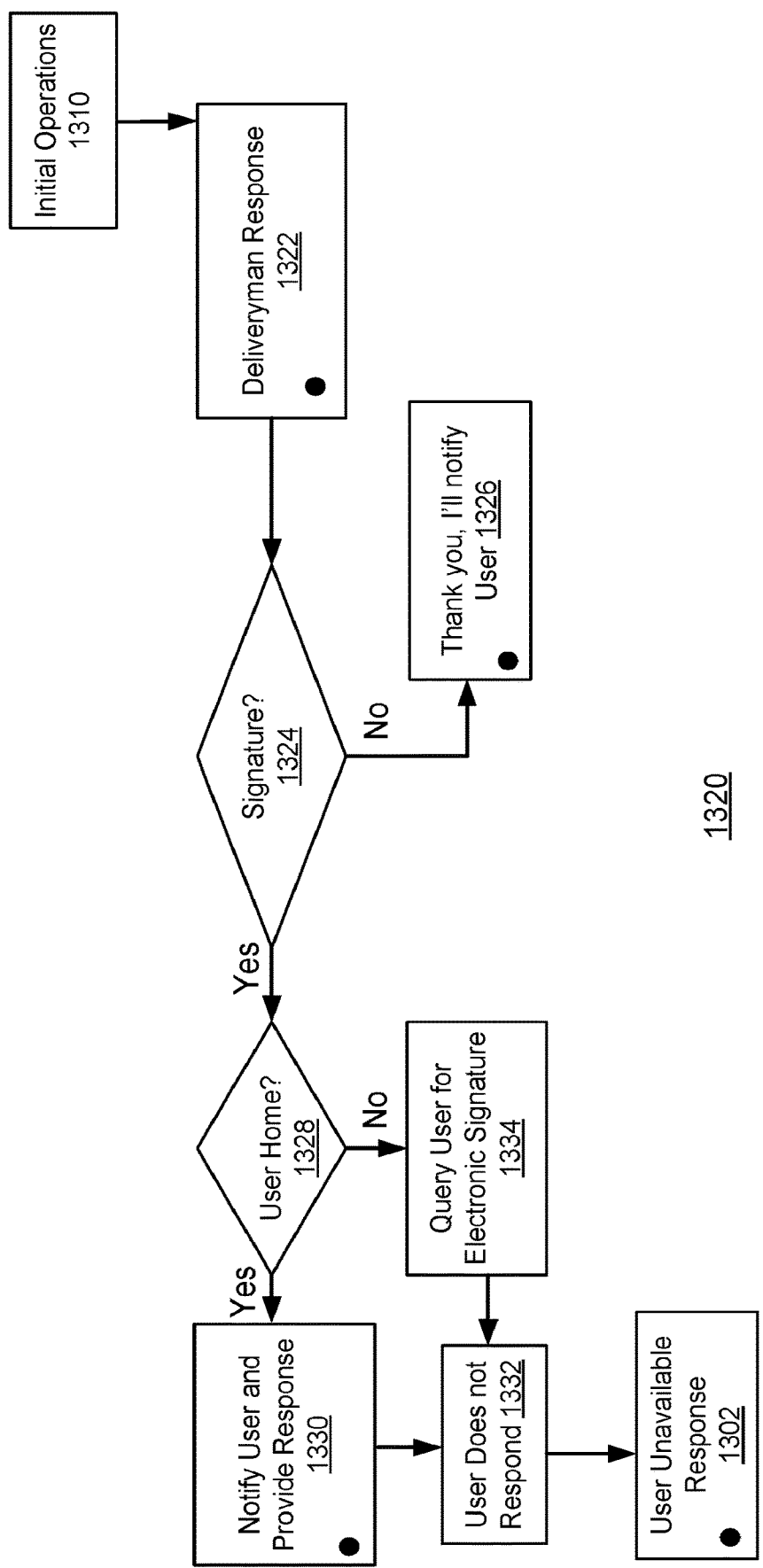
Figure 13C:
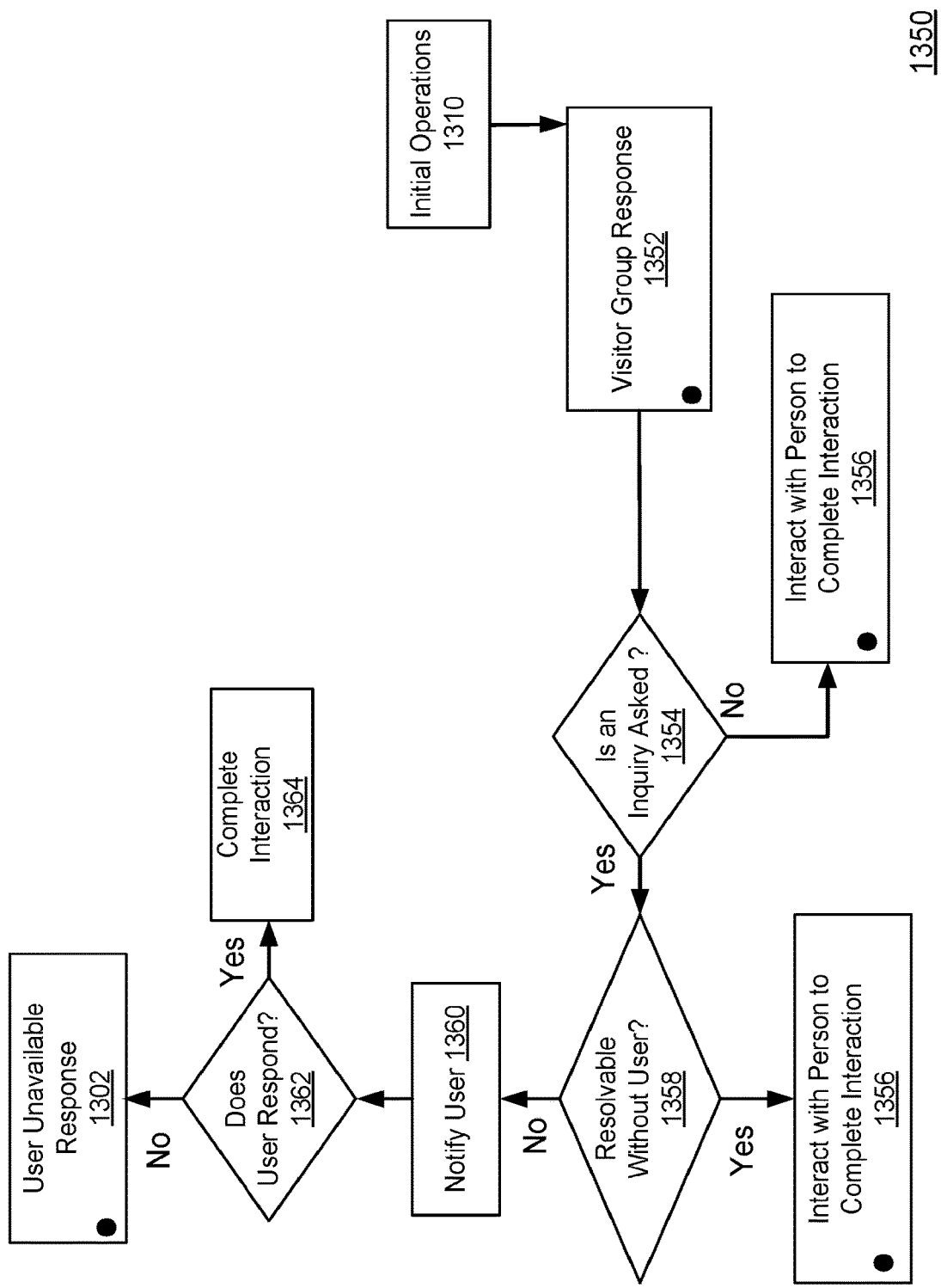

FIGS. 13A-13C illustrate example flow diagrams of the visitor interaction system interacting with a person in automated assistant mode in accordance with some implementations. In some implementations, the methods are performed by: (1) one or more connected devices 204 (e.g., a connected doorbell 106); (2) the server system 164; (3) a client device 220; or (4) a combination thereof. In some instances and implementations, the various operations of the methods described herein are interchangeable, and respective operations of the methods are performed by any of the aforementioned devices, systems, or combination of devices and/or systems. For convenience, the method operations will be described below as being performed by particular component or device, but should not be construed as limiting the performance of the operation to the particular device in all implementations. The black circles within certain operations denote response provided by the assistant of the connected doorbell 106 either autonomously and/or as instructed by a user.

In FIG. 13A, the automated assistant of the visitor interaction system is set to interact with visitors as if the user is unavailable in accordance with some implementations. In example flow diagram 1300, the visitor interaction system performs the same operations 1202 through 1226 (hereinafter referred to as initial operations 1310). Flow diagram 1300 illustrates the automated assistant of the visitor interaction system taking control of the interaction and completing the interaction with the person. At operation (1302), the visitor interaction system provides to the person an autonomous response, via the assistant, indicating that the user (1302) is unavailable. In some implementations, the visitor interaction system provides a notification (1304) to the user via client device 220; however, the visitor interaction system in automated assistant mode does not rely on input from the user to continue interacting with the person. After the visitor interaction system provides to the person, via the assistant, an autonomous response indicating that the user (1302) is unavailable, the visitor interaction system automatically proceeds to asking (1228) the person if they would like to leave a message. The person can decide to leave a message or not in the same way described in operations 1228 through 1232 of FIG. 12B.

In FIG. 13B, the automated assistant of the visitor interaction system is set to interact with a person determined to be in the deliveryman visitor group in accordance with some implementations. In example flow diagram 1320, the visitor interaction system continues after performing initial operations 1310. Flow diagram 1320 illustrates the automated assistant of the visitor interaction system taking control of the interaction with a deliveryman and completing the interaction. At operation (1322), the visitor interaction system provides, via the assistant, an autonomous response (1322) with respect to delivery of the package. The visitor interaction system will provide autonomous response (1322) in conjunction with an inquiry if a signature (1324) is required. The autonomous response provided at (1322) may include a general inquiry about the package (e.g., "Who is the package for?") or may the request if a signature is needed depending on the obtained data and context information available. Although the visitor interaction system is in automated assistant mode, certain actions will require user input, such as signature for a delivery or specific limitations placed on the assistant by the user.

If the deliveryman indicates that a signature is needed at operation (1324), the visitor interaction system determines if a user is home (1328). If it is determined that the user is home, the visitor interaction system sends the user, via client device 220, a notification (1330) that a package needs a signature. In conjunction with the notification (1330) the visitor interaction system provides, via the assistant, an autonomous response to the deliveryman indicating that the user has been notified and should be at the door shortly. The visitor interaction system waits a predetermined amount of time (e.g., 5 s, 15 s, 30 s, 1 min, 2 min, 5 min) to determine (1332) if the user has responded (e.g., signed for the package). If the user has not responded within the predetermined time (1332), the visitor interaction system provides, via the assistant, an autonomous response to the delivery indicating that the user in unavailable (1302). In some implementations, the autonomous response that the user is unavailable (1302) includes a request to come at a later time, a request to schedule a delivery time, and/or other requests that may facilitate delivery of the package. In some other implementations, the visitor interaction system request the deliveryman to complete an alternate form of delivery such as dropping off the package with a neighbor. In some implementations, if it is determined that the user is not home, the visitor interaction system sends the user, via client device 220, a query (1334) for an electronic signature and/or an alternate signature that will authorize release of the package. Similarly, the visitor interaction system waits a predetermined amount of time (e.g., 5 s, 15 s, 30 s, 1 min, 2 min, 5 min) to determine (1332) if the user responds to the query. If the user has not responded within the predetermined time (1332), the visitor interaction system provides an autonomous response, via the assistant, to the delivery indicating that the user in unavailable (1302) as discussed above. Alternatively, if at operation (1324) the deliveryman indicates that a signature is not required and drops off the package, the visitor interaction system responds to the deliveryman indicating that the user will be notified (1326) of the delivery and returns to an idle state.

FIG. 13C illustrates a general flow diagram for interactions of the automated assistant of the visitor interaction system in accordance with some implementations. In example flow diagram 1350, the visitor interaction system continues after performing initial operations 1310. Flow diagram 1350 illustrates the automated assistant of the visitor interaction system taking control and completing interactions with a variety of different visitor groups. At operation (1352), the visitor interaction system provides to the person, via the assistant, an autonomous response (1352) associated with a response model corresponding to a determined visitor group. The determination of the visitor groups is discussed above in FIGS. 9A through 10B. The different visitor groups include deliveryman group, salesperson group, known/expected persons group, unknown/unexpected persons group, user defined groups, learned groups, and/or other groups identified in FIG. 3B. The autonomous responses provided at operation 1352 are based on context information (e.g., obtained data and a persons replies), identification of the person, and/or the selected response mode. For instance, as shown above in FIG. 13B, if the person determined to be in the deliveryman group, an autonomous response is an inquiry regarding delivery of the package. Different visitor groups will have corresponding responses. For example, a salesperson group may include an inquiry of products for sale, a familiar person group may include a request for who they are looking for or how they can be helped, etc.

At operation (1354), the visitor interaction system may ask, via the assistant, an inquiry to the person. For example, as shown in FIG. 13B, the visitor interaction system asked the delivery person if a signature was required. The visitor interaction system may not always have an inquiry based on the visitor group. If the visitor interaction system does not have an inquiry, the visitor interaction system interacts with the person to complete the transaction (1356). For example, if the visitor group is a familiar person group and the appropriate autonomous response is to unlock the doors (e.g., via connected doorbell 106), the visitor interaction system completes the interaction without any additional inquiries. If the visitor interaction system does have an inquiry for the person corresponding to their determined visitor group, the visitor interaction system determines if the following actions can be resolved (1358) without user involvement. If the following action can be resolved without user interaction, then the visitor interaction system, via the assistant, interacts with the person to complete the transaction (1356). For example, if the visitor interaction system asks the person if they would like to leave a message at operation (1354), then completion of recording the message can be performed without user interaction and the visitor interaction system completes the task.

Alternatively, if it determined that the following action cannot be resolved without user interaction, the visitor interaction system notifies (1360) the user, via client device 220, for additional input. The user notification may include a transcription of all of the interaction by the visitor interaction system, audio, video, information on the determined visitor group, context information and/or other information described herein. At operation (1362), the visitor interaction system determines whether the user responds within a predetermined time. If the user responds within the predetermined amount of time (e.g., 5 s, 15 s, 30 s, 1 min, 2 min, 5 min), the visitor interaction system completes (1364) the interaction with user involvement. Alternatively, if the user does not respond within a predetermined amount of time (e.g., 5 s, 15 s, 30 s, 1 min, 2 min, 5 min), the visitor interaction system provides, via the assistant, the person a user is unavailable autonomous response 1302, as described above in FIGS. 13A-13B. FIG. 13C is a general overview of the visitor interaction system in automated mode applicable to all visitor groups. The visitor interaction system uses the obtained data, identity of the person, context information, and the response model corresponding to the determined visitor group to provide the appropriate autonomous response for the situation at hand.

Alternatively, at operation (1354), the person may have an inquiry for the visitor interaction system. Similarly, the visitor interaction system determines if the inquiry can be resolved (1358) without user involvement. If the inquiry can be resolved without user interaction, then the visitor interaction system, via the assistant, interacts with the person to complete the transaction (1356). Alternatively, if the inquiry cannot be resolved without user interaction, then the visitor interaction system performs operations 1360 through 1365 as described above. For example, the visitor interaction system may have confidential or personal information, such as information of individuals in the household, the location of the individuals, access to accounts (e.g., email, cloud networks, schedules, etc.) or devices as well as control of connected device. The visitor interaction system is configured to protect the users information by preventing access to or distribution of sensitive information. Specifically, the visitor interaction system prevents unknown or unauthorized individuals from using or accessing the connected home environment. Specific access to certain information requires permission and/or authorization from the user.

Figures 14A, 14B:
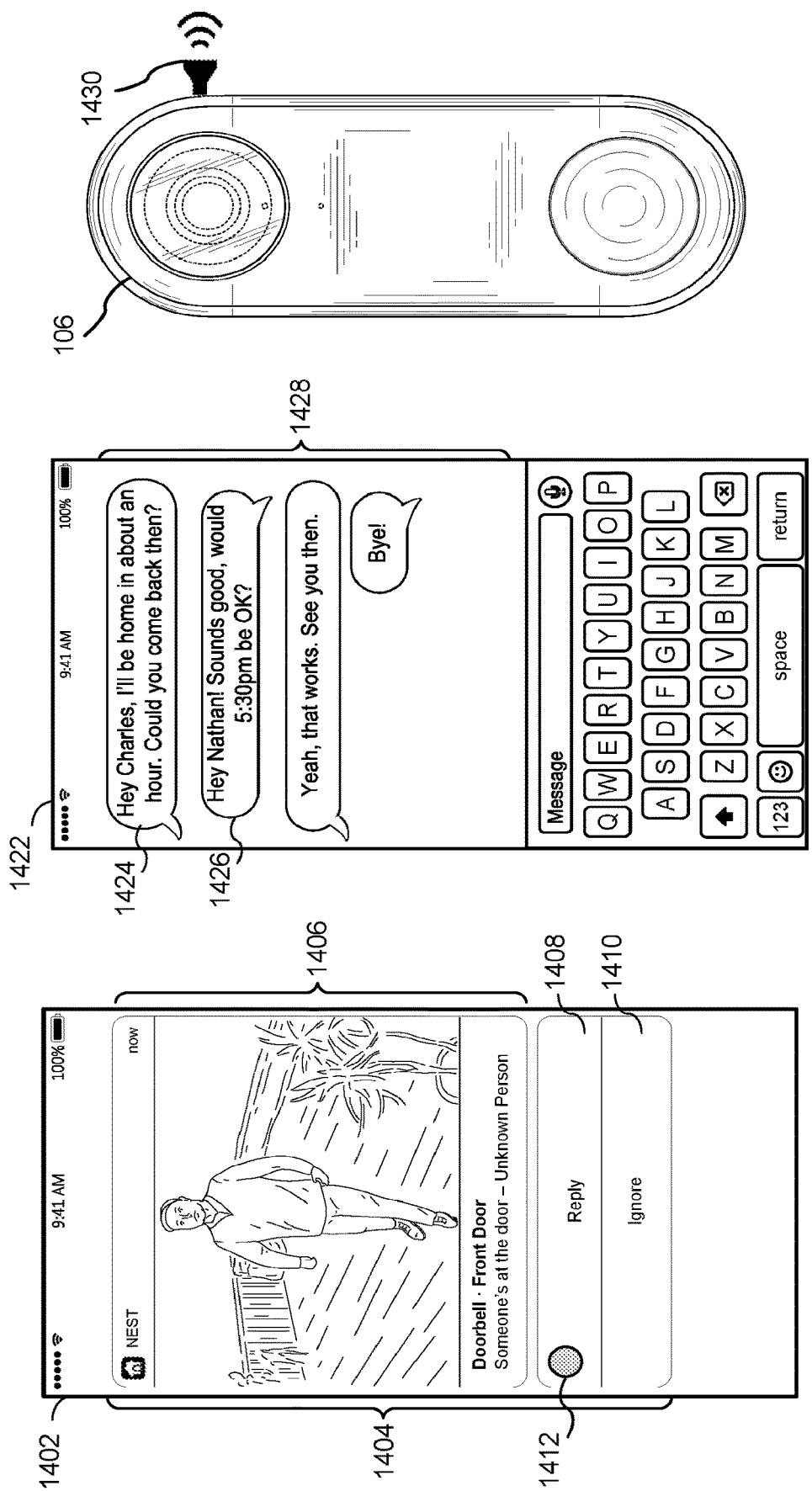
FIGS. 14A and 14B illustrate representative user interfaces for interacting with a visitor via an SMS text application and/or TTS/STT in accordance with some implementations.

FIGS. 14A and 14B illustrate representative user interfaces for interacting with a visitor in accordance with some implementations. In FIG. 14A, user interface 1402 includes a notification 1404 which includes a first section 1406 (e.g., application affordance) including an image of the visitor or an image of the entryway, and relevant information about the entryway (e.g., "Front Door"), the motion event/interaction (e.g., "Someone's at the door."), and an initial classification (e.g., unknown person). In some implementations, the notification includes video data and/or audio corresponding to the visit of the person. Selection of the first section 1406 (e.g., selecting the affordance) opens or launches a dedicated application. The interface further includes a "Reply" affordance 1408 and an "Ignore" affordance 1410. In some implementations, selection of the "Reply" affordance 1408 (e.g., pressing "reply"; user input 1412) allows the user to interact with the visitor. In some implementations, the "Reply" affordance 1408 opens an SMS text application (e.g., FIG. 14B) or other messaging applications and enables the user to interact with the visitor. In some implementations, the SMS text application or other messaging applications provide a text-to-speech and speech-to-text functionality between the visitor and the user, as discussed in FIG. 14B. In other implementations, the SMS text application or other messaging applications provide a transcript between the visitor and the assistant while allowing the user to take over the interaction at any time. In other implementations, the user interacts with the visitor via audio (e.g., calls, prerecorded messages, alarms, etc.), a browser, voicemail, or video. In some implementations, selecting the "Ignore" affordance 1410 allows the assistant to autonomously interact with the visitor (e.g., without user input), ask if the visitor would like to record a message, and/or inform the visitor that the user is unavailable at the moment based on user preferences and/or context information. In other implementations, selecting the "Ignore" affordance 1410 terminates the interaction with no assistant interaction.

FIG. 14B illustrates user interface 1422 that includes an SMS text application. In some implementations, after the user selects the "Reply" affordance 1408, the visitor interaction system presents an SMS text application to enable the user to interact with the visitor. The visitor interaction system enables the user to type a response in the SMS application (e.g., user response 1424 "Hey Charles, I'll be home in about an hour. Could you come back then?") that is converted, using text-to-speech, into audio that is broadcast and/or played for the visitor via the connected device 106 (e.g., broadcast of audio 1430). Similarly, the visitor interaction system obtains audio and/or video from visitor, via connected doorbell 106, and transcribes the audio into text using speech-to-text and provides it to the user via the SMS application (e.g., visitor response 1426 "Hey Nathan! Sounds good, would 5:30 pm be OK?"). Alternatively, the obtained audio and/or video from visitor is broadcast to the user via client device 220. In some implementations, the SMS text application includes a full transcript 1428 of the interaction between the user and the visitor. In this way, the user is able to interact directly with the visitor in a quickly and efficiently using the capabilities of client device 220.

Figures 15A, 15B:
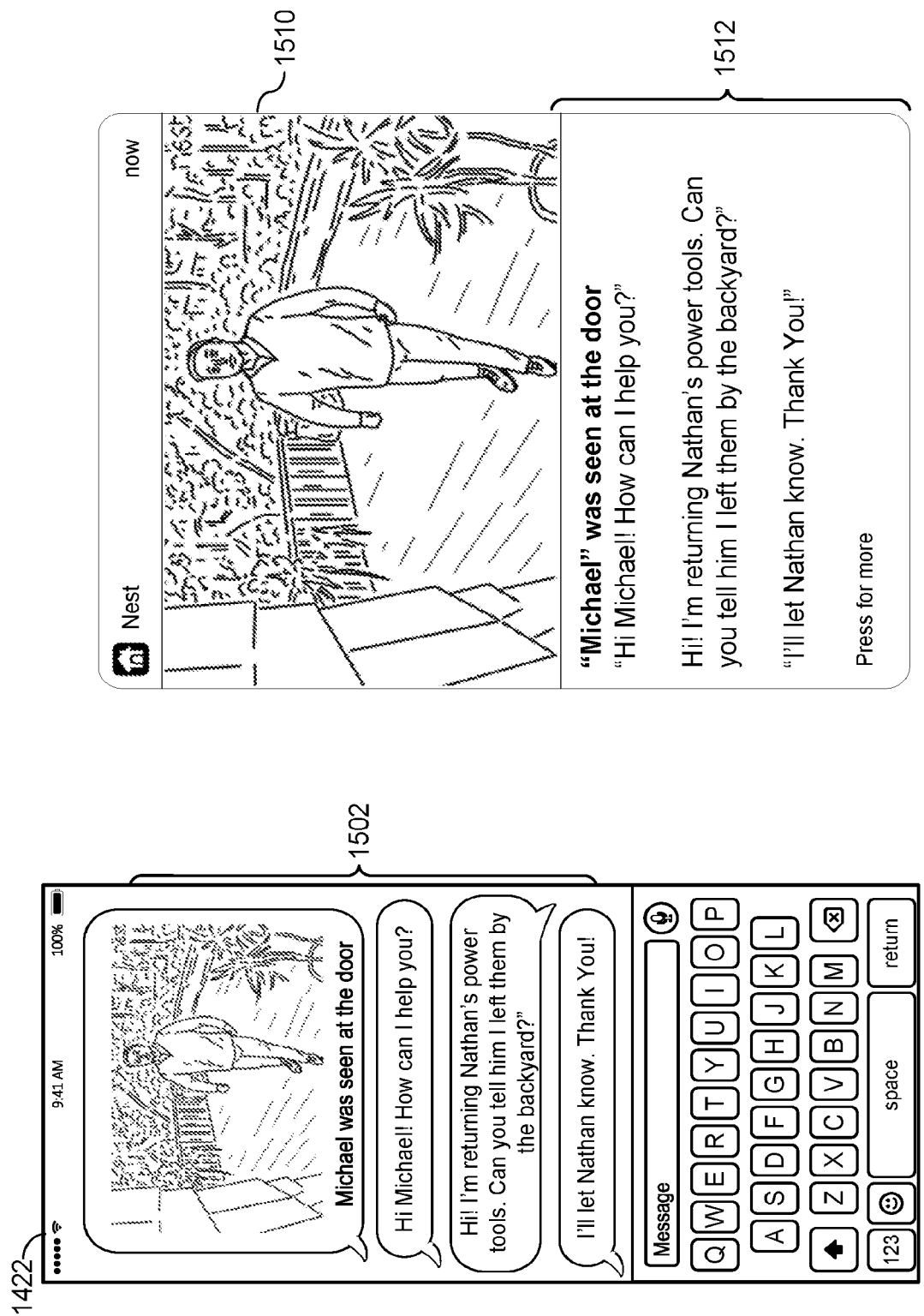
FIGS. 15A and 15B illustrate representative summary notifications including interaction summary report notifications in accordance with some implementations.

FIGS. 15A and 15B illustrate representative summary notifications including interaction summary report notifications (e.g., FIG. 11, summary 1130) in accordance with some implementations. In some implementations, summaries 1502 and 1512 include information identifying the visitor "Michael" (e.g., and/or other information such as "UPS," "Girl Scout," and "Stranger"), as well as content information (e.g., a portion of the visitor's announcement message) and/or activity information (e.g., "left a message," "package delivered", and "assistant let him in"). In some implementations, summary 1502 additionally includes a video clip and/or audio of the visitor. In some implementations, the summary 1502 is provided in an SMS text application as shown in FIG. 15A. The summary 1502 may include a full transcript of interactions between the visitor and the assistant of the connected doorbell 106. For example, summary 1502 is a transcript that includes the assistant greeting Michael and Michael interacting with the assistant. Michael further provides responses that the assistant records and provides to the user. FIG. 15B shows an alternate implementation of the notification summary presented in a notification window 1510. Notification window 1510 include a transcript 1512 of the same interaction between Michael and the assistant described in 15A. In some implementations, the summary incudes message query on a user interface of the client device. The message query identifies notifications or messages in the summary and enables review of the report messages and/or notifications on the user interface of the client device. In other words, a user is able to search a summary report for one or more events or interactions.

In some implementations, a user selection may start (e.g., play) part of the video data corresponding to the visit of the person to play, an audio recording to play, or selected images to be enlarged; zoomed in; rotated; etc. In some implementations, the summary includes each visit recorded by the stream of video data in the field of view. For example, a user is provided an event list that includes all of the detected events. The summary may include information corresponding to each event, such as time of event, start or arrival time, end or leaving time, duration of the event, the determined identity of the person, the determined visitor classification, one or more responses or actions provided to the visitor, etc.

In light of the principles described above with reference to the figures, we now turn to certain implementations.

Some implementations include a method of interacting with visitors at a visitor interaction system. The method includes obtaining video data captured in a field of view by a camera of the visitor interaction system, identifying an approach of a person within the field of view of the camera, and analyzing the video data to determine an identity of the person. The methods further include, automatically and without user intervention, in accordance with the identity of the person, determining that the person belongs to one of a plurality of predefined visitor groups. Each of the predefined visitor groups corresponding to a respective predefined response model that includes a plurality of respective response actions. At least one of the respective response actions including an autonomous response action that is executable autonomously, without requiring intervention of a user of the visitor interaction system. The method further includes identifying a first predefined response model corresponding to the one of the plurality of visitor groups, initiating a first autonomous response action of the plurality of respective actions associated with the first predefined response model. Initiating the first autonomous response action including presenting a first message to the person via a component of the visitor interaction system (e.g., a screen, speaker, display, etc.), monitoring a first response to the first message of the person and sending a first report message to the user via a client device registered to the user. The first report message includes a representation of the video data, approach data for the approach, and a summary of the first message and the first response.

In some implementations, response models and/or response models are based on obtained context information. In some implementations, context information is based on a detected announcement event (e.g., a doorbell press, a door knock, a keypad entry, or a verbal announcement); a facial recognition analysis; one or more behavior characteristics of the visitor; one or more clothing characteristics of the visitor; a time of day during which the visitor approaches the entryway; a verbal announcement of the visitor; proximity in time to a prescheduled event; proximity in time to a pre-scheduled status of the connected home environment; a status or location of the user; and/or a timing of the detected visitor action compared to a timing of the identification of the motion event involving the visitor approaching the entryway.

In some implementations, context information includes a detected announcement event. Example announcement events include a doorbell press, a door knock, a keypad entry, a remote control operation, or any other kind of active interaction between the visitor and the visitor interaction system. In some implementations, context information includes a lack of detected announcement events (e.g., a visitor lingers by the entryway without pressing the doorbell) for more than a predetermined threshold of time. For example, the context information is based on a timing of the one or more detected visitor actions (e.g., how long it took for the visitor to press the doorbell or knock on the door since the visitor was detected or was determined to have been approaching or in proximity to the entryway, or how long the visitor has been lingering without pressing the doorbell or knocking on the door since the visitor was detected or was determined to have been approaching or in proximity to the entryway). In some implementations, the announcement is part of a pre-assigned pattern of events associated with a known visitor (e.g., a personalized knock or doorbell ring pattern). In some implementations, the announcement is a pre-assigned verbal announcement associated with a known visitor. For example, a doorbell press, door knock, or verbal announcement is part of a pre-assigned pattern of doorbell presses or door knocks associated with, or is otherwise associated with, a known visitor. The connected home environment (e.g., a connected doorbell) determines that a particular visitor always knocks at a particular location on the door, in a particular pattern, and with a particular amount of force. In this example, the connected home environment associates such knock attributes with the particular visitor. In another example, a visitor profile for a particular visitor is set (e.g., set manually by a user, or set via machine learning) to associate a particular knock pattern, a particular doorbell ring pattern, or a particular verbal announcement with the particular visitor. For these implementations, an audio sensor (e.g., a microphone) detects an audio signal and the processor performs an audio recognition analysis to determine whether the verbal announcement matches any known announcements stored in memory. In some implementations, the audio recognition analysis determines whether the visitor's voice matches a known voice stored in memory. In some implementations, the audio recognition analysis determines whether the visitor's words match a known pattern of words stored in memory (e.g., "It's Matt," "I'm here for the barbeque," or "The password is Bosco.").

In some implementations, context information includes identity data based on a facial recognition analysis. In some implementations, face images are stored in a database. In some implementations, the user adds new face images to the database by registering automatically cropped images of new faces from new or previously unregistered visitors to the connected home environment. In other implementations, the user adds new face images by registering potential visitors independently of whether they are in a vicinity of the entryway. For example, at a time or location not involving a visit, the user may capture an image of a potential visitor's face so that when the potential visitor visits the connected home environment at a future time, the connected home environment will recognize the potential user and provide appropriate context information based on the facial recognition. In some implementations, in addition or in the alternative to identity data (e.g., "Matt is at the front door."), context information includes a classification of the visitor (e.g., "A known visitor is at the front door," or "An unknown visitor is at the front door.") based on whether the visitor's face is recognized. For example, if the visitor's face is recognized, the context information includes a "known" status, and if the visitor's face is not recognized, the context information includes an "unknown" status for the visitor. Additionally or alternatively, the identity data or classification data includes further description of the visitor based on a result of the facial recognition analysis (e.g., "The pool cleaner is at the front door.").

In some implementations, the context information includes characteristics of the visitor, such as height, gender, age, and the like. In some implementations, the context information includes determined biometrics of the visitor. In some implementations, if a group of visitors approach the entryway together, the context information includes the number of visitors and/or identified interactions between the visitors. In some implementations, the context information includes information regarding whether the visitor is holding any items and/or identification of such items (e.g., a box, crowbar, or food items). In some implementations, the context information includes information regarding any active or recent (e.g., within the last hour, day, or week) security alerts in the vicinity of the connected home (e.g., within a block, a mile, or 10 miles). In some implementations, the context information includes information regarding previous visitors to the connected home (e.g., whether previous visitors were criminals, salesmen, or neighbors).

In some implementations, context information includes one or more behavior characteristics of the visitor. For example, a behavior characteristic includes holding an object (e.g., a package, a clipboard, product for sale, tools (e.g., handymen), cleaning supplies, fliers, or any other object that suggests or identifies a reason for the visitor's presence). As a further example, a behavior characteristic includes lingering in an activity area (e.g., an area defined by a threshold distance from the entry way or from an object such as a delivered package) for a time period greater than a predetermined threshold.

In some implementations, context information includes one or more clothing characteristics of the visitor. For example, a clothing characteristic includes a uniform (e.g., a uniform typically worn by a delivery person). Further examples include clothing categories, such as business clothing, casual clothing, and suspicious clothing (e.g., an article of clothing covering the face, dark clothing during night hours or in dark lighting conditions, and gang-related clothing).

In some implementations, context information includes a time of day during which the visitor approaches the entryway. For example, a level of suspicion may be lower during the day and higher at night. In some implementations, "day" and "night" are differentiated by predetermined times. In some implementations, "day" and "night" are differentiated by sensing an amount of light in the field of view of the entry way. Sensing an amount of light in the field of view is accomplished by, for example, using a light sensor in proximity to the entryway, or by analyzing a brightness level in one or more frames of the motion stream, or by accessing information from an ambient light sensor that is a component of a connected device with a field of view that encompasses the entryway or a an approach to the entryway. In some implementations, visibility-based context information is weighted based on intermediate amounts of brightness (e.g., during dusk and dawn, or during cloudy days).

In some implementations, context information includes audio data, such as a verbal announcement (examples of which are described above). Further examples include background noise from sources other than the visitor (e.g., a barking dog, a police siren, or any other sound that may provide context for the visit).

In some implementations, context information includes a proximity in time to a prescheduled event. For example a dog walker may be scheduled to arrive at a prearranged time to pick up the dog. A delivery person may be scheduled to deliver a package at an expected time. A service person (or any other known person) may be scheduled to arrive during an expected time or timespan (e.g., every Tuesday between 2-4 pm to clean the pool, the first Saturday of each month to service the lawn, or a one-time visit arranged in advance for any other purpose).

In some implementations, context information includes a proximity in time to a prescheduled status of the connected home environment. For example, the connected home environment may be prescheduled to be unoccupied (i.e., the occupants are away), between certain hours (e.g., between 9:00 am and 6:00 pm). As a further example, the connected home environment may be in a do-not-disturb mode (e.g., while a baby is sleeping, or during quiet hours during which the occupants wish to be left alone).

In some implementations, context information includes a status or location of the user. Example user statuses include a do-not-disturb status, an away status, and/or an at-home status. In some implementations, a location sensor of the client device provides user location information to the visitor interaction system. In other implementations, the user manually notifies the visitor interaction system of the user's location and/or status.

In some implementations, context information includes any combination of the above examples. In some implementations, individual subsets of context information are weighted, and the context information is a weighted combination of the individual subsets of context information. For example, brightness information or time-of-day information may be weighted more heavily than identity information (e.g., if the pool cleaner approaches the entryway in the middle of the night, the time-of-day information is more relevant in determining contextual information for the approaching visitor, and is therefore more heavily weighted).

In some implementations, obtaining context information from the connected home environment for the motion event includes obtaining any of the context information described above. In other words, when a motion event is identified or triggered, any of the context information described above is obtained by the visitor interaction system.

In some implementations, context information is continuously obtained and used to identify successive responses or actions for the assistant of the connected doorbell 106 to interact with the visitor and/or provide to the user of the client device.

The visitor interaction system provides appropriate responses for interacting with the visitor via an assistant of the visitor interaction system autonomously without user input based on the response model associated with the determined visitor group and/or context information. Response models and corresponding responses for the determined visitor groups are described above in FIGS. 3A and 3B).

As an example, a visitor interacting with the visitor interaction system may state that she is visiting because she has a study session schedule with Susan, one of the connected home occupants. In this example, the visitor interaction system will verify that the visitor is an expected person (e.g., based on facial recognition, context information) and provide an appropriate response to the visitor via the assistant of the connected doorbell. Concurrently, the device may provide the appropriate response(s) the a user of the connected home. The responses may include unlocking the door, alerting Susan of the visitor, requesting that the visitor wait for someone to answer the door, and notifying the visitor that Susan is unavailable and the study session must be canceled.

In another example, the visitor interaction system detects that a person is holding and/or selling one or more products and uses detected products as context information. The context information may also include the type of products being sold by the person. The visitor interaction system, via the assistant, may provide a customized messages based on the product and/or type of product sold if the product is something the user would like. The customized messages may include a request for contact information for completing the transaction, enabling or perfuming digital payments, placing an order, scheduling a meeting, and other related responses. In some implementations, the context information is collected from the Internet via an Internet search and includes business history, contact information, and valid coupon offers.

In yet another example, context information, such as a person approaching with a box, is used in conjunction with the identity of the person by the visitor interaction system to classify the person as a deliveryman. The visitor interaction system selects a response model corresponding to the deliveryman classification and determines one or more actions or responses. The visitor interaction system may interact directly with the visitor and/or provide a summary as well as additional information to a user of the connected home environment. In this example, the responses and actions enable the user and/or the assistant of the visitor interaction system to (1) instruct the deliveryman to leave the box on the porch, (2) instruct the deliveryman to retry delivery at a later time, (3) ask the deliveryman if a signature is required for delivery, (4) leave the package with a neighbor, or other related response and actions that facilitate secure delivery of the package.

In some implementations, the visitor interaction system protects confidential or personal information of the user from being accessed by outside parties. For example, a visitor or stranger may request information from the visitor interaction system and the visitor interaction system verifies the identify and/or authorization of the visitor prior to distributing information. If it is determined that the visitor does not have authorization to access the requested information, the system refrains from providing the information. In some implementations, the method includes using the response models to generate follow up questions to inquiries received by the visitors. The method utilized the response model, context information, and prior interaction with the visitor to create a follow-up question accordingly. Additionally or alternatively, the visitor interaction system is configured to host a cloud-based assistant system having a plurality of user accounts, and the camera is registered on and linked to one of the plurality of user accounts. The visitor interaction system is able to used information on the cloud based network to keep track of schedules to determine expected and unexpected visits. The cloud network may also be used to authenticate contacts and or user the available information to improve the accuracy of the response based on the users preferences.

In some implementations, the response from the visitor interaction system is based on the level of personalization a user has set for an assistant of the system. The assistant may be set to automated, intermediate, or limited. The automated assistant interacts with visitors and provides responses and/or actions based on a response models for the determined visitor group for the person and/or context information without user input. Alternatively, the user may identify certain responses and/or actions that the user would always want to authorize. The intermediate assistant interacts with the visitor semi-autonomously until the user is able to take over the interaction. Similarly, some responses require user approval before provided to the visitor by the intermediate assistant. The limited assistant acts on behalf of the user only as permitted by the user.

In some implementations, responses provided to the visitor via an assistant of the visitor interaction system include one or more communication-based responses. In some implementations, the visitor interaction system speaks to the visitor using a synthesized voice. In other implementations, the visitor interaction system outputs responses corresponding to a response model corresponding to a determined visitor group or a pre-recorded message to the visitor, recorded in advance by the user. Examples of communication-based responses include communicating a message to the visitor regarding a status of the user (e.g., "Matt is busy," or "Matt will be right there"); communicating a message to the visitor directing the visitor to perform an action (e.g., "Please leave the package," "Come back later," or "Come in and take the dog"). In other examples, communication-based responses include communicating a customized message to an expected or unexpected visitor, such as a response to a salesperson (e.g., "Sorry, we are not interested"), a greeting (e.g., "Welcome, please join us in the backyard"), or a prompt (e.g., "Should I contact the Homeowner?" or "What is the password?"), In some implementations, the communication-based responses include communicating a message to the visitor directing the visitor to leave a message for the user.

In some implementations, if a visitor leaves a message for the user, the visitor interaction system sends the message to the user's device. If the user is monitoring the client device, the user can watch and/or listen to the message as the message is being received. Otherwise, the message is recorded, by the client device or by the visitor interaction system, for future retrieval by the user. In some implementations, the visitor interaction system identifies the user to the visitor by referring to the user's name, or by using a generic placeholder (e.g., "Homeowner"), depending on the obtained context information. For example, if the visitor is known, the visitor interaction system uses the user's name, but if the visitor is unknown, the visitor interaction system refers to the user by a generic placeholder. In some implementations, the visitor interaction system refers to the user by name (e.g., if the user is known). In some implementations, the visitor interaction system refers to the user by other descriptive attributes (e.g., "Hello, person in the red hoody") depending on the context information (e.g., if the user is away, a package is left by the entryway, and an unknown visitor enters an activity area around the packer, the system communicates to the visitor that the visitor is recognized).

In some implementations, customized messages are pre-programmed, allowing the visitor interaction system to provide a response that corresponds to the user's instruction or preferences. In other implementations, a customized message is communicated through the client device in real-time. For example, the user composes a customized message at the client device by directly entering a text message or by using a speech-to-text application of the client device. The user-composed message is then converted to an audio message by a text-to-speech application at the visitor interaction system, and the audio message is communicated to the visitor through a speaker located near the entryway. In some implementations, the visitor's response is recorded and converted to a text message by a speech-to-text application at the visitor interaction system or at the client device, and the text message is presented to the user through a user interface of the client device. In some implementations, the visitor's message is transmitted in an audio format to the client device, and presented to the user as an audio message. In some implementations, if the visitor speaks in a language that the user does not understand, or vice versa, the messages are translated by a translation application at the visitor interaction system or at the client device.

In some implementations, in addition or in the alternative to an audio communication, the visitor interaction system presents a visual communication to the visitor, such as an video message recorded by the user at the client device, a preprogrammed video message, a video call, or a visual representation of the user's text messages. In some implementations, the visual communication is presented to the visitor on a display mounted near the entryway.

In some implementations, responses provided to the visitor via an assistant of the visitor interaction system include one or more action-based actions. Examples of action-based actions include adjusting a security level of the connected home environment (e.g., locking or unlocking a door, adjusting the brightness level of one or more lights in the entryway or one or more lights in other areas of the connected home environment by dimming them or turning them on or off, adjusting an alarm sensitivity level); alerting law enforcement personnel (e.g., calling 911 or other private law enforcement); alerting a preselected contact of the user (e.g., a trusted neighbor or a neighborhood watch contact); capturing image or video data of the visitor and recording it, sending it to the authorities, or sending it to the preselected contact of the user; or turning on an alarm of the connected home environment.

In some implementations, responses provided to the visitor via an assistant of the visitor interaction system include one or more person-specific actions. Examples of person-specific actions include actions that are based on a detected identity of the visitor (e.g., detected based on facial recognition, a personalized doorbell push-button pattern, a personalized keypad passcode, or other examples discussed above); whether the visitor is classified as known or unknown (e.g., "Come around to the back" vs. "Please wait for assistance"); whether the visitor is expected or unexpected (e.g., "Come in and take the dog" vs. "You appear to be early for the dog walking appointment"); or what the visitor is doing (e.g., present in an activity area without announcing, entering an activity area when there is a package, or lingering near the entryway for longer than a threshold). In some implementations, a visitor who is classified as having an unknown identity can still be classified as being an expected visitor based on other factors, such as a uniform (e.g., denoting a pool cleaning or dog walking service) or an object carried by or accompanying the visitor (e.g., pool cleaning equipment, tools, or a dog leash).

In some implementations, responses provided to the visitor via an assistant of the visitor interaction system include one or more location-specific actions. Examples of location-specific actions include actions that depend on a location of the entryway, such as a first subset of actions for a front door (e.g., communication-based greetings) versus a second subset of actions for a back door or an internal door (e.g., action-based security functions, such as sounding an alarm).

In some implementations, responses provided to the visitor via the assistant of the visitor interaction system include one or more building-specific actions. Examples of building-specific actions include actions that are based on whether the connected home environment is a residential house, condo, or apartment (e.g., having home and away hours and various residential-based actions), a workplace (e.g., having open and closed hours and various workplace-based actions), or a commercial property (e.g., retail store having open and closed hours, a receptionist providing information to a visitor, and various commercial-based actions). Further examples of building-specific actions include actions that are based on a relative safety level of the neighborhood or geographic area in which the connected home environment is located (e.g., communication-based greetings for safe areas vs. action-based security functions for unsafe areas).

In some implementations, responses provided to the visitor via the visitor interaction system include one or more user disposition-specific actions. Examples of user disposition-specific actions include actions for users who feel unsafe (e.g., a user who is home alone in an unsafe neighborhood may wish to have automated security functions), and actions for users who merely wish to monitor visitors (e.g., a user who is at work and merely wishes to monitor home deliveries may wish to have communication-based greetings).

As discussed above, the visitor interaction system provides response to the visitor via an assistant of the visitor interaction system. In some implementations, the responses are based on the response model for the visitors determined group and on the obtained context information. In some implementations, the responses are further based on customized user preferences for different situations (e.g., a user may decide to always have the alarm sound when visitors approach past midnight when the user is home alone, as discussed above).

The visitor interaction system is further configured to receive a selection of an identified action and/or other input from the user of the client device whenever the user want to take over an interaction. In some implementations, the system learns from past user selections of appropriate actions and adjusts future automated responses with similar context information accordingly. In some implementations, the system if further configured to perform an action or response during a contemporaneous interaction between the visitor and the user via one-way or two-way audio communications; video communication; establishing TTS and/or STT communication; and/or other forms if interaction as discussed herein. In other words, for instances in which the user is having an audio conversation with the visitor and wishes to have the assistant perform an appropriate action during the conversation, the system is able to perform the action (e.g., unlock the door, or take a picture) without interrupting the audio conversation.

In some implementations, the visitor interaction system is further configured to provide updated responses to the visitor in accordance with new context information observed after an initial response has been provided. For example, an initial response may include a communication-based responses (e.g., a greeting). If the greeting response is provided and the visitor responds with identifying information (e.g., by showing credentials, looking more directly into the camera, or entering a passcode into a keypad), the visitor interaction system will provide an updated communication-based response that replies to the visitor's response. On the other hand, if the visitor fails to respond to a greeting, the visitor interaction system updates its response to action-based responses such as sounding an alarm or calling the authorities.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method comprising:
    obtaining video data captured by a camera of a visitor interaction system;
    determining an approach of a person toward the visitor interaction system;
    determining, based on an analysis of the video data and the approach of the person, an identity of the person;
    determining, based on the identity of the person, that the person belongs to a respective predefined visitor group of a plurality of predefined visitor groups, each of the plurality of predefined visitor groups corresponding to a respective predefined response model of a plurality of predefined response models, one or more predefined response model of the plurality of predefined response models including at least one response action of a plurality of response actions, a respective response action of the plurality of response actions being executable by the visitor interaction system without requiring intervention of a user of the visitor interaction system;
    identifying a respective predefined response model of the plurality of predefined response models corresponding to the respective predefined visitor group of the plurality of predefined visitor groups, one or more respective predefined response model of the plurality of predefined response models for each of the predefined visitor groups being modifiable using one or more previous response actions, the one or more previous response actions including one or more user selected response actions, one or more user rejected response actions, one or more user defined response actions, or one or more repeated response actions;
    initiating, by the visitor interaction system, a first autonomous action of a plurality of respective autonomous actions based on the respective predefined response model; and
    sending a first report message to the user via a client device, the first report message including at least one of a representation of the video data, data relating to the approach of the person, data relating to the identity of the person, the first autonomous action, or a summary of the first message.

2. The method of claim 1, further comprising:
    receiving, responsive to providing the first autonomous action, a first reply from the person;
    determining a second autonomous action, wherein the second autonomous action is based on the first reply and the respective predefined response model;
    initiating the second autonomous action at the visitor interaction system; and
    sending a second report message to the user via the client device, the second report message including at least the second autonomous action.

3. The method of claim 1, wherein determining the approach of the person toward the visitor interaction system is based on obtaining sensor data from one or more sensors, the one or more sensors comprising at least one of a proximity sensor, a radar sensor, or an infrared camera.

4. The method of claim 1, wherein the first autonomous action includes at least one of an audible alert, a spoken message, a request to record a message from the person, a text notification to one or more devices, a call to the police, or an alert to other devices associated with the visitor interaction system.

5. The method of claim 1, wherein the first autonomous action comprises an audio message to be provided by the visitor interaction system, the method further comprising, prior to providing the audio message:
receiving an inquiry from the person;
determining whether the audio message includes confidential information based on the identity of the person; and
responsive to determining that the audio message includes confidential information, refraining from providing the audio message.

6. The method of claim 1, wherein the first autonomous action comprises an audio message to be provided by the visitor interaction system, the audio message including a first question, the method further comprising:
receiving an answer from the person to the first question; and
initiating, based on the respective predefined response model and the answer, a second autonomous action, the second autonomous action comprising at least one of a second question or a statement.

7. The method of claim 1, wherein:
the respective predefined visitor group is an expected person group; and
the first autonomous action includes at least one of the following operations:
unlocking a door lock; or
outputting, by the visitor interaction system and based on the identity of the person, a personal message.

8. The method of claim 1, wherein:
the respective predefined visitor group is a deliveryman group; and
the first autonomous action comprises notifying a user to electronically sign for a package delivery.

9. The method of claim 1, wherein:
determining the identity of the person includes determining that the person is an intruder;
identifying the respective predefined visitor group includes identifying that the respective predefined visitor group is an intruder group; and
initiating the first autonomous action comprises at least one of locking a door, calling police, or notifying the user.

10. The method of claim 1, further comprising:
obtaining context information related to the approach, the context information indicative of a delivery package carried by the person, and wherein:
the respective predefined visitor group is a deliveryman group, the deliveryman group identified based at in part on the delivery package; and
initiating the first autonomous action comprises outputting an audio message to the person via a speaker of the visitor interaction system based on the delivery package.

11. The method of claim 1, further comprising:
obtaining context information related to the approach, the context information indicative of an identified product being sold, and wherein:
the respective predefined visitor group is a salesperson group, the salesperson group identified based at in part on the identified product being sold; and
initiating the first autonomous action comprises outputting an audio message that is customized based on the identified product.

12. A visitor interaction system comprising:
a camera that captures video data;
one or more processors; and
a memory coupled to the one or more processors, the memory storing one or more programs to be executed by the one or more processors, the one or more programs comprising instructions for:
obtaining video data captured by a camera of a visitor interaction system;
determining an approach of a person toward the visitor interaction system;
determining, based on an analysis of the video data and the approach of the person, an identity of the person;
determining, based on the identity of the person, that the person belongs to a respective predefined visitor group of a plurality of predefined visitor groups, each of the plurality of predefined visitor groups corresponding to a respective predefined response model of a plurality of predefined response models, one or more predefined response models of the plurality of predefined response models including at least one response action of a plurality of response actions, a respective response action of the plurality of response actions being executable by the visitor interaction system without requiring intervention of a user of the visitor interaction system;
identifying a respective predefined response model of the plurality of predefined response models corresponding to the respective predefined visitor group of the plurality of predefined visitor groups, one or more respective predefined response model of the plurality of predefined response models for each of the predefined visitor groups being modifiable using one or more previous response actions, the one or more previous response actions including one or more user selected response actions, one or more user rejected response actions, one or more user defined response actions, or one or more repeated response actions;
initiating, by the visitor interaction system, a first autonomous action of a plurality of respective autonomous actions based on the respective predefined response model; and
sending a first report message to the user via a client device, the first report message including at least one of a representation of the video data, data relating to the approach of the person, data relating to the identity of the person, the first autonomous action, or a summary of the first message.

13. The visitor interaction system of claim 12, wherein the one or more programs further comprise instructions for:
receiving, responsive to providing the first autonomous action, from the person a first reply;
determining a second autonomous action, wherein the second autonomous action is based on the first reply and the respective predefined response model;
initiating the second autonomous action at the visitor interaction system; and
sending a second report message to the user via the client device, the second report message including at least the second autonomous action.

14. The visitor interaction system of claim 12, wherein determining the approach of the person toward the visitor interaction system is based on one or more sensors, the one or more sensors comprising at least one of a proximity sensor, a radar sensor, or an infrared camera.

15. The visitor interaction system of claim 12, wherein the first autonomous action includes at least one of an audible alert, a spoken message, a request to record a message from the person, a text notification to one or more devices, a call to the police, or an alert to other devices associated with the visitor interaction system.

16. The visitor interaction system of claim 12, wherein the visitor interaction system comprises an electronic video doorbell.

17. The visitor interaction system of claim 12, wherein the first autonomous action comprises an audio message to be provided by the visitor interaction system, and wherein the one or more programs further comprise instructions for:
   receiving an inquiry from the person;
   determining whether the audio message includes confidential information based on the identity of the person; and
   responsive to determining that the audio message includes confidential information, refraining from providing the audio message.

18. The visitor interaction system of claim 12, wherein the first autonomous action comprises an audio message to be provided by the visitor interaction system, the audio message including a first question, and wherein the one or more programs further comprise instructions for:
   receiving an answer from the person to the first question; and
   initiating, based on the respective predefined response model and the answer, a second autonomous action, the second autonomous action comprising at least one of a second question or a statement.

19. A non-transitory computer readable storage medium storing one or more programs, the one or more programs comprising instructions, which, when executed by a computer system with one or more processors, cause the computer system to perform operations comprising:
   obtaining video data captured by a camera of a visitor interaction system;
   determining an approach of a person toward the visitor interaction system;
   determining, based on an analysis of the video data and the approach of the person, an identity of the person;
   determining, based on the identity of the person, that the person belongs to a respective predefined visitor group of a plurality of predefined visitor groups, each of the plurality of predefined visitor groups corresponding to a respective predefined response model of a plurality of predefined response models, one or more predefined response model of the plurality of predefined response models including at least one response action of a plurality of response actions, a respective response action of the plurality of response actions being executable by the visitor interaction system without requiring intervention of a user of the visitor interaction system;
   identifying a respective predefined response model of the plurality of predefined response models corresponding to the respective predefined visitor group of the plurality of predefined visitor groups, one or more respective predefined response model of the plurality of predefined response models for each of the predefined visitor groups being modifiable using one or more previous response actions, the one or more previous response actions including one or more user selected response actions, one or more user rejected response actions, one or more user defined response actions, or one or more repeated response actions;
   initiating, by the visitor interaction system, a first autonomous action of a plurality of respective autonomous actions based on the respective predefined response model; and
   sending a first report message to the user via a client device, the first report message including at least one of a representation of the video data, data relating to the approach of the person, data relating to the identity of the person, the first autonomous action, or a summary of the first message.

20. The non-transitory computer readable storage medium of claim 19, wherein the one or more programs further comprise instructions for:
   receiving, responsive to providing the first autonomous action, from the person a first reply;
   determining a second autonomous action, wherein the second autonomous action is based on the first reply and the respective predefined response model;
   initiating the second autonomous action at the visitor interaction system; and
   sending a second report message to the user via the client device, the second report message including at least the second autonomous action.

* * * * *